(12) United States Patent
Quan

(10) Patent No.: US 7,492,896 B2
(45) Date of Patent: *Feb. 17, 2009

(54) COPY PROTECTION FOR VIDEO SIGNAL USING ADDED NEGATIVE AMPLITUDE PULSE

(75) Inventor: Ronald Quan, Cupertino, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/800,905

(22) Filed: May 7, 2007

(65) Prior Publication Data

US 2007/0211898 A1 Sep. 13, 2007

Related U.S. Application Data

(60) Division of application No. 11/206,093, filed on Aug. 16, 2005, now Pat. No. 7,352,863, which is a continuation of application No. 09/965,345, filed on Sep. 26, 2001, now Pat. No. 7,085,380, which is a continuation of application No. 09/733,659, filed on Dec. 7, 2000, now Pat. No. 6,501,842, which is a continuation of application No. 09/070,958, filed on May 1, 1998, now Pat. No. 6,285,765, which is a continuation of application No. 08/753,970, filed on Dec. 4, 1996, now Pat. No. 5,748,733, which is a continuation of application No. 08/062,866, filed on May 17, 1993, now Pat. No. 5,583,936.

(51) Int. Cl.
*H04N 7/167* (2006.01)

(52) U.S. Cl. .................. 380/221; 380/204; 380/224; 380/226

(58) Field of Classification Search ........... 380/204, 380/221, 224, 226
See application file for complete search history.

(56) References Cited

U.S. PATENT DOCUMENTS 4,100,575 A 7/1978 Morio et al.

(Continued)

FOREIGN PATENT DOCUMENTS

| DE | 88 12 594.7 U1 | 1/1989 |
| EP | 189 548 A1 | 8/1986 |
| WO | WO-91/16791 A1 | 10/1991 |
| WO | WO-92/09171 A1 | 5/1992 |

OTHER PUBLICATIONS

Elecktor Electronics. (Oct. 14, 1988). "Macrovision Decoder/Blanker," pp. 44-47.

(Continued)

*Primary Examiner*—Benjamin E Lanier
(74) *Attorney, Agent, or Firm*—Morrison & Foerster LLP

(57) ABSTRACT

Enhancements to a video anticopying process that causes an abnormally low amplitude video signal to be recorded on an illegal copy. The enhancements in one version introduce into the overscan portion of the television picture, just prior to the horizontal or vertical sync signals but in active video, a negative going waveform that appears to the television receiver or videotape recorder to be a sync signal, thereby causing an early horizontal or vertical retrace. One version provides (in the right overscan portion of the picture), a checker pattern of alternating gray and black areas which causes the TV set on which the illegal copy is played to horizontally retrace earlier than normal in selected lines with a consequential horizontal shift of the picture information on those lines. This substantially degrades picture viewability. In another version a gray pattern at the bottom overscan portion of the picture causes vertical picture instability. In another version selected horizontal sync signals are narrowed, causing irregular vertical retraces. In another version, a negative-going pulse is added to the back porch region of the horizontal blanking interval. Also provided is apparatus for removing or attenuating these enhancements from the video signal, to allow copying.

6 Claims, 47 Drawing Sheets

U.S. PATENT DOCUMENTS

| | | |
|---|---|---|
| 4,163,253 A | 7/1979 | Morio et al. |
| 4,335,393 A | 6/1982 | Pearson |
| 4,442,461 A | 4/1984 | Shirai et al. |
| 4,475,129 A | 10/1984 | Kagota |
| 4,488,183 A | 12/1984 | Kinjo |
| 4,511,919 A | 4/1985 | Forgey et al. |
| 4,631,603 A | 12/1986 | Ryan |
| 4,695,901 A | 9/1987 | Ryan |
| 4,716,588 A | 12/1987 | Thompson et al. |
| 4,819,098 A | 4/1989 | Ryan |
| 4,928,309 A | 5/1990 | White |
| 4,951,315 A | 8/1990 | Switsen |
| 5,130,810 A | 7/1992 | Ryan |
| 5,133,008 A | 7/1992 | Fujita |
| 5,155,767 A | 10/1992 | Noller |
| 5,157,510 A | 10/1992 | Quan et al. |
| 5,194,965 A | 3/1993 | Quan et al. |
| 5,394,470 A | 2/1995 | Buynak et al. |
| 5,583,936 A | 12/1996 | Wonfor et al. |
| 5,633,927 A | 5/1997 | Ryan et al. |
| 5,748,733 A | 5/1998 | Quan |
| 6,188,832 B1 | 2/2001 | Ryan |
| 6,285,765 B1 | 9/2001 | Quan |
| 6,501,842 B2 | 12/2002 | Quan |
| 7,085,380 B2 * | 8/2006 | Quan .................. 380/204 |
| 2002/0018564 A1 | 2/2002 | Wonfor et al. |

OTHER PUBLICATIONS

"Order Adopting and Approving Report of Special Master" *U.S. District Court, case No. C-99-20011 EAI, Northern District of California,* 13 pgs.

"Report of Special Master" *U.S. District Court, case No. C-99-20011 EAI, Northern District of California,* 15 pgs.

Research Disclosure No. 328, Aug. 1991, Emsworth GB XP217919 "Copy Protection For Video Signals."

* cited by examiner

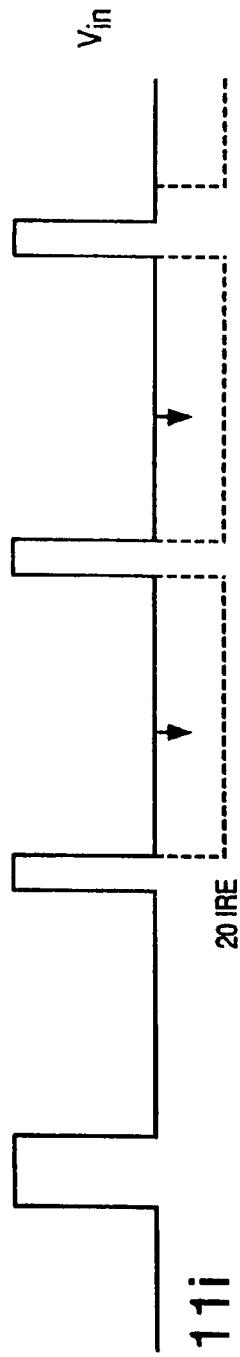
FIG. 11i
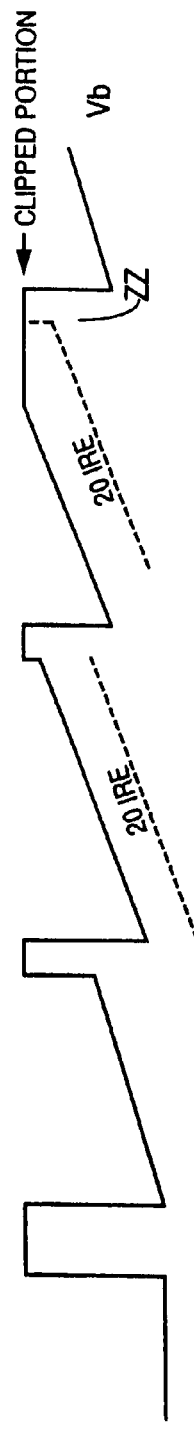
FIG. 11j
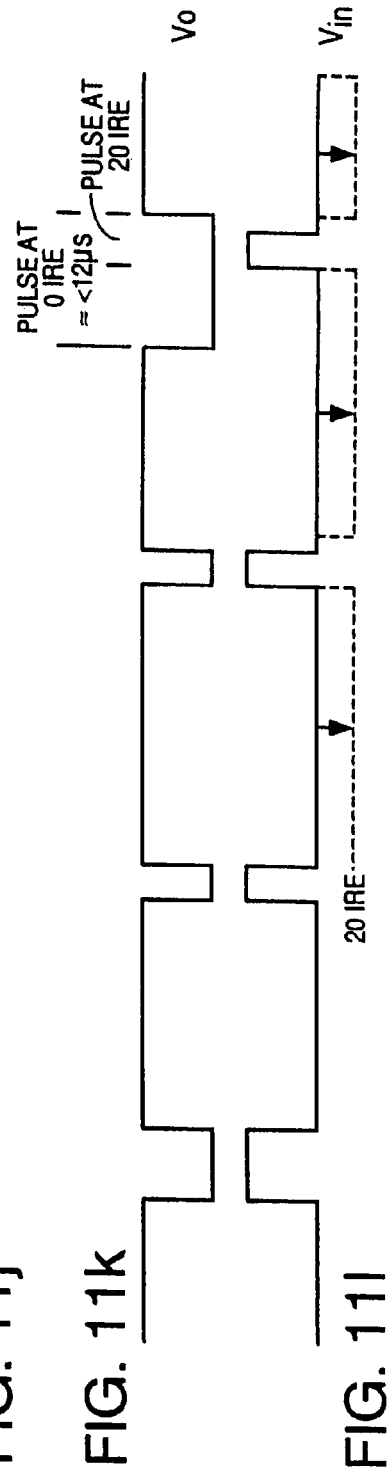
FIG. 11k
FIG. 11l

KEY TO FIG. 13
| FIG. 13a |
| FIG. 13b |

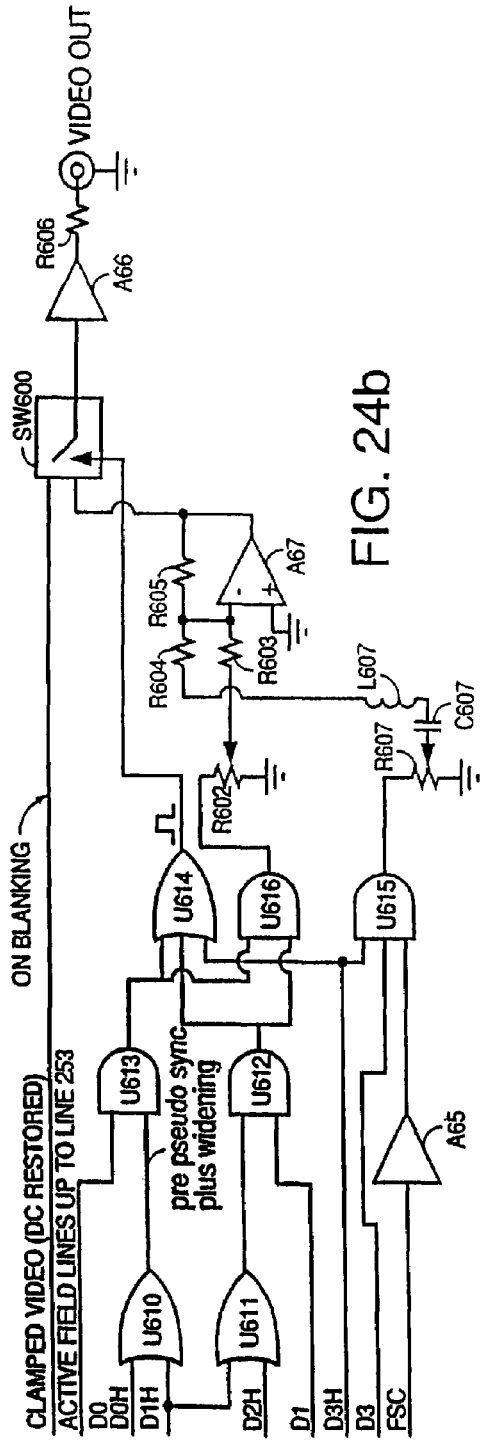
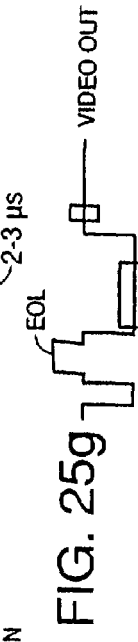
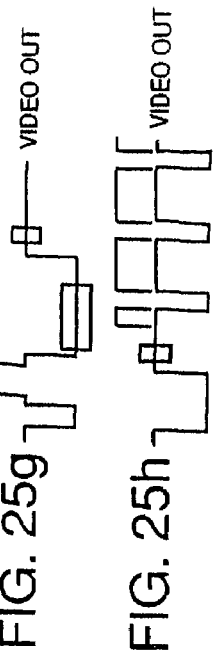
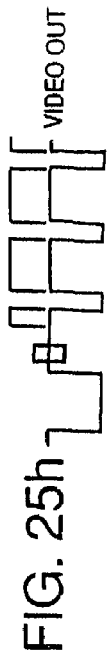
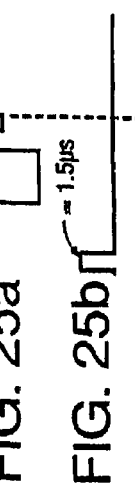
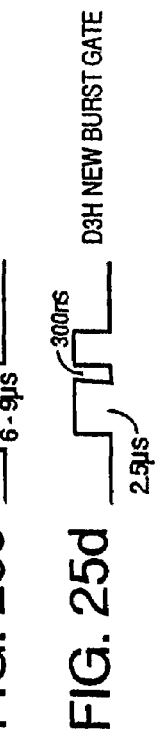
FIG. 24b
FIG. 25e
FIG. 25f
FIG. 25g
FIG. 25h
FIG. 25a
FIG. 25b
FIG. 25c
FIG. 25d FIG. 38a  VIDEO IN 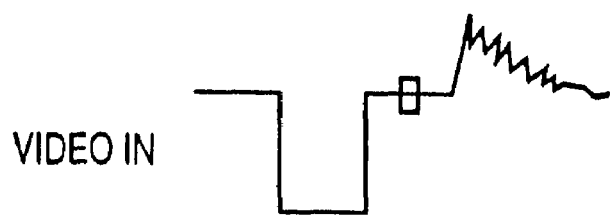
FIG. 38b  OS3 -Tr 
FIG. 38c  OS3 OUT 
FIG. 38d  V₁ 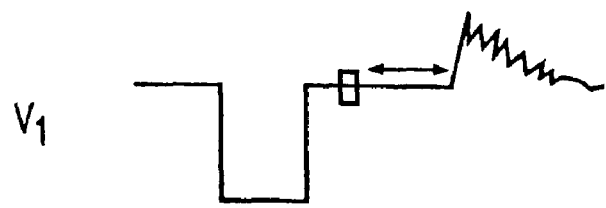
FIG. 38e  VIDEO OUT 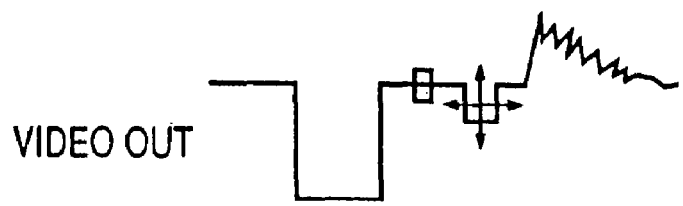
FIG. 39b  VIDEO IN 
FIG. 39c  H PLL OUT 
FIG. 39d  PPS 

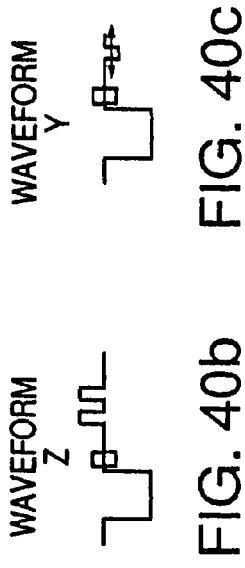
WAVEFORM Z
FIG. 40b
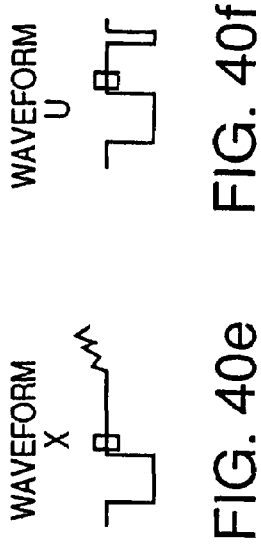
WAVEFORM X
FIG. 40e
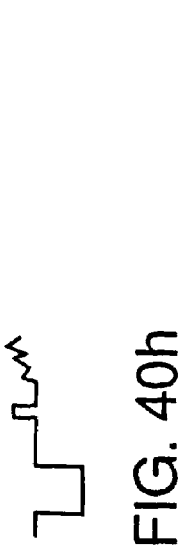
WAVEFORM Y
FIG. 40c
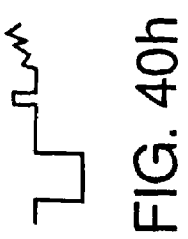
WAVEFORM U
FIG. 40f
FIG. 40h
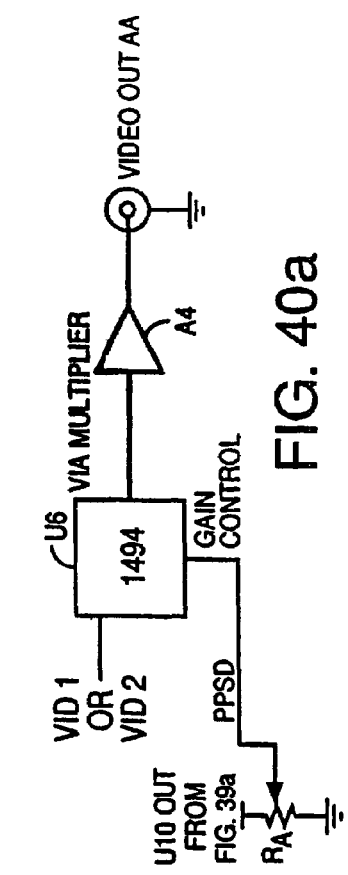
FIG. 40a
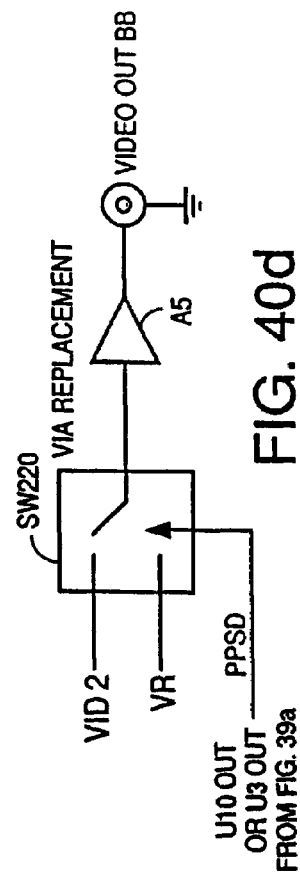
FIG. 40d
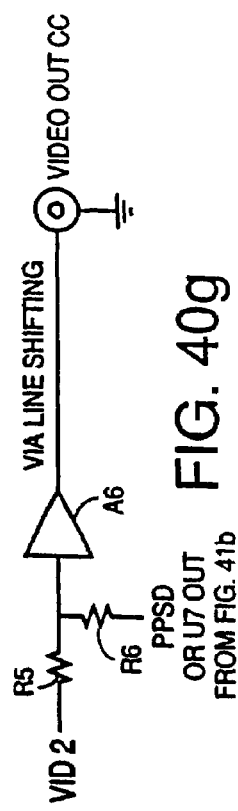
FIG. 40g

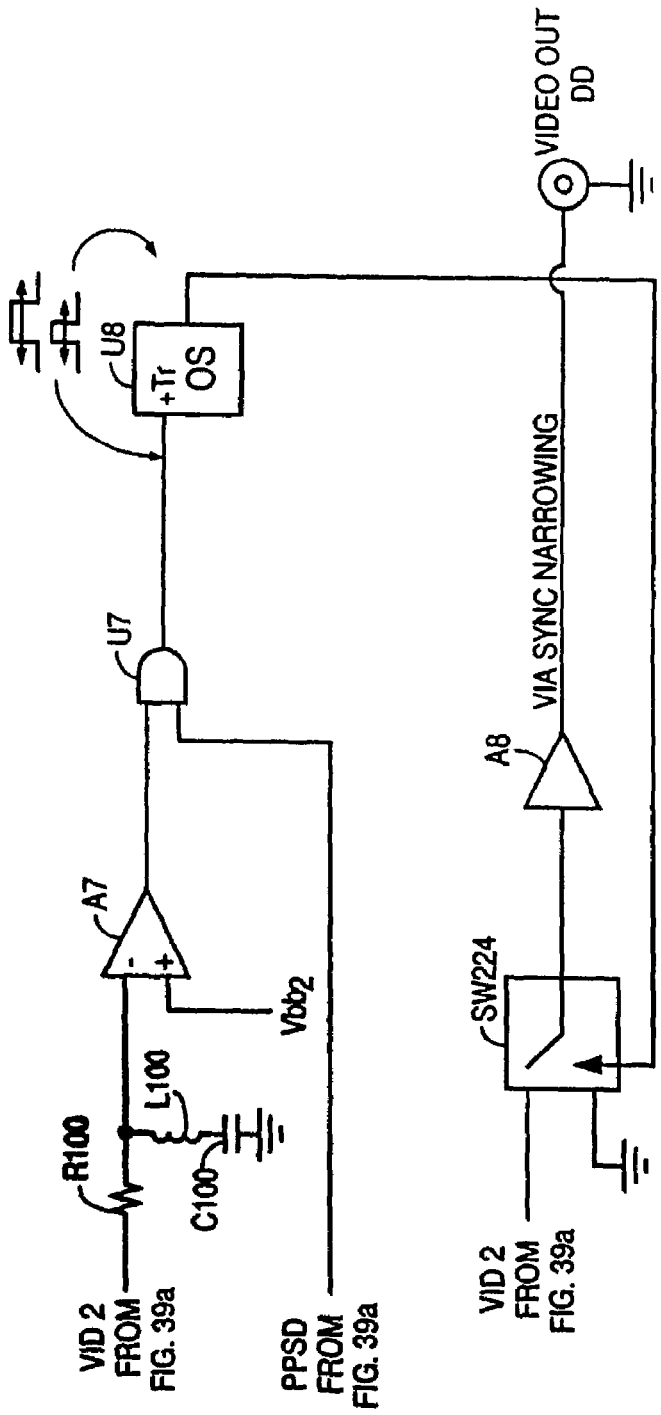
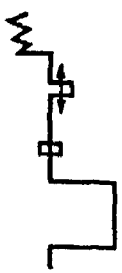
FIG. 41a
FIG. 41b

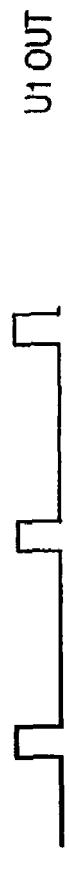
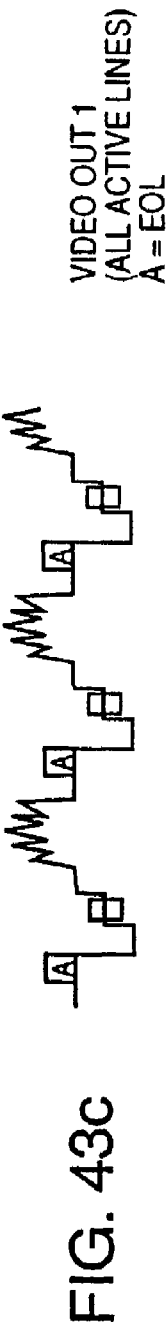
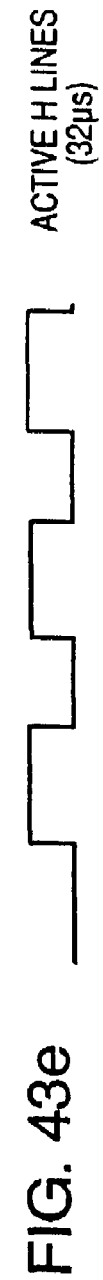
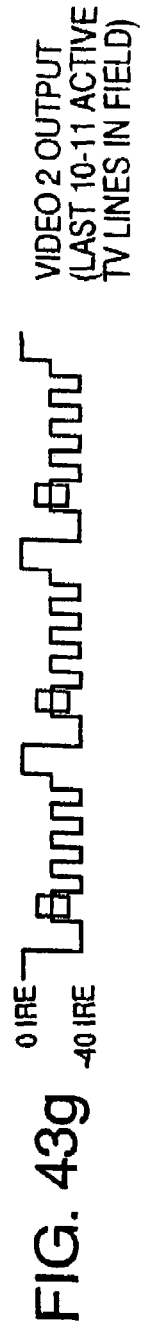
FIG. 43a — VIDEO IN
FIG. 43b — U1 OUT
FIG. 43c — VIDEO OUT 1 (ALL ACTIVE LINES) A = EOL
FIG. 43d — BURST GATE LM 1881
FIG. 43e — ACTIVE H LINES (32μs)
FIG. 43f — A4 OUTPUT −20 IRE / −40 IRE
FIG. 43g — VIDEO 2 OUTPUT (LAST 10-11 ACTIVE TV LINES IN FIELD) 0 IRE / −40 IRE

COPY PROTECTION FOR VIDEO SIGNAL USING ADDED NEGATIVE AMPLITUDE PULSE

CROSS REFERENCE TO RELATED APPLICATIONS

This application is a divisional of application Ser. No. 11/206,093 filed Aug. 16, 2005, which is a continuation application of application Ser. No. 09/965,345, filed Sep. 26, 2001 which in turn is a continuation of application Ser. No. 09/733,659 filed Dec. 7, 2000 now U.S. Pat. No. 6,501,842 which in turn is a continuation of application Ser. No. 09/070,958, filed May 1, 1998 now U.S. Pat. No. 6,285,765, which in turn is a continuation of application Ser. No. 08/753,970 filed Dec. 4, 1996 which in turn is a continuation of application Ser. No. 08/062,866, filed May 17, 1993 now U.S. Pat. No. 5,583,936, all incorporated by reference in their entireties.

FIELD OF THE INVENTION

Enhancements to a video anticopy process, the enhancements causing additional degradation to the picture quality when a copy of a protected recording is played back, and additionally which reduce the viewability of unauthorized recordings of the protected recording.

DESCRIPTION OF THE PRIOR ART

Video anticopy processes are well known. An example is Ryan, U.S. Pat. No. 4,631,603 issued Dec. 23, 1986, incorporated by reference which discloses (see Abstract):

"A video signal is modified so that a television receiver will still provide a normal color picture from the modified video signal while the video tape recording of the modified video signal produces generally unacceptable pictures. This invention relies on the fact that typical videocassette recorder automatic gain control systems cannot distinguish between the normal sync pulses (including equalizing or broad pulses) of a conventional video signal and added pseudo-sync pulses. Pseudo-sync pulses are defined here as any other pulses which extend down to normal sync tip level and which have a duration of at least 0.5 microseconds. A plurality of such pseudo-sync pulses is added to the conventional video signal during the vertical blanking interval, and each of said pseudo-sync pulses is followed by a positive pulse of suitable amplitude and duration. As a result, the automatic gain control system in a videotape recorder will make a false measurement of video level which causes an improper recording of the video signal. The result is unacceptable picture quality during playback."

Column 2, beginning at line 5 states that the added pulse pairs (each pair being a negative-going pseudo-sync pulse followed by a positive-going "AGC" pulse) cause an automatic level (gain) control circuit in a videotape recorder to erroneously sense video signal level and produce a gain correction that results in an unacceptable videotape recording.

Therefore this prior art "basic anticopy process" causes an abnormally low amplitude video signal to be recorded when a copy is attempted. Some of the effects observed when the illegal copy is replayed are horizontal tearing (positional displacement) and vertical displacement of the picture. Whether this occurs or not is often largely dependent on the picture content, i.e. presence of white (light) and black (dark) areas in the picture. Therefore this prior art process, while generally providing excellent copy protection, with some combinations of videotape recorders (such as VCRs) and television sets provides a picture viewable by persons willing to tolerate a poor quality picture.

Also, with certain VCRs and TV sets the various well known prior art copy protection processes provide little picture degradation. Certain markets for prerecorded video material have a high rate of piracy, i.e. illegal copying of videotapes, in spite of copy protection and these viewers apparently are relatively insensitive to the poor quality picture in illegal copies caused by the prior art copy protection processes. Thus there is a need for copy protection process enhancements which degrade the quality of the picture even more than that of the prior art processes.

SUMMARY OF THE INVENTION

In accordance with the present invention, the above-described prior art "basic" copy protection process is enhanced by further modifying the video signal in several ways to ensure that the necessary picture content requirement is met to maximize effectiveness of the basic copy protection process.

The further modifications include blanking a portion of the active video in the overscan area of the picture just prior to the occurrence of the (1) horizontal or (2) vertical synchronization (sync) signals, and inserting into the blanked portion a waveform that (for a video signal having reduced amplitude) is perceived by the TV receiver or videotape recorder as a sync signal, and so causes incorrect synchronization of the VCR or TV receiver. Using this modification especially only on certain video lines or fields causes substantial picture degradation of an unauthorized copy. Another modification narrows the horizontal sync pulses to cause sensing of a spurious vertical sync signal in a TV set and will also affect certain videotape recorders.

In the horizontal modification, the right edge of the picture is replaced by a "checker" pattern appearing (like a checker board) of black and gray rectangles. The width of this checker pattern is chosen to be within the overscan (not viewed) part of the picture when displayed on a standard television receiver. It will be understood that with an abnormally low signal amplitude, when the picture content is light (such as mid gray), the left edge of the black rectangle in certain video lines will trigger an early horizontal retrace as being a negative-going (towards blanking level) transition. When the picture content is dark, the right edge of the gray rectangle (adjacent to a dark picture area), in certain video lines will trigger an early retrace on each line as also being a negative-going transition. (The description of video waveforms herein follows the convention of positive amplitude being white and negative amplitude being black).

The horizontal modification checker pattern in one embodiment is generated at a rate slightly asynchronous to the video field repetition rate, so that the checker pattern appears to slowly move up or down the picture, at a rate of about 1 second for any given point to migrate from the bottom to the top of the picture or vice versa. The checker pattern has no effect on the picture when an original (authorized) cassette is replayed since no signal conditions are present in the TV set which are in any way abnormal.

However, when an illegal (unauthorized or pirated) copy of the cassette is replayed using a videotape recorder, the signal attenuation resulting from the above-described prior art copy protection process, in combination with the checker pattern, causes the television set horizontal retrace to occur early in each video line where either when the black or gray rectangle is present, depending on picture content and the characteristics of the videotape recorder and TV set. The black checkers and gray checkers each may cause a transition of sufficient amplitude depending on the previous active video picture content. If the picture content is light (white), the left edge of the black checker causes a negative-going transition to black; if the picture content is dark, the right edge of the gray checker causes a negative-going transition from gray to the following dark area (typically blanking level). The difference between lines ending in black or gray in turn causes a horizontal displacement to the picture information, i.e. a wiggle, which moves slowly up or down the picture.

The tendency of a television set to retrace (perform the horizontal flyback early) is exploited by providing the light to dark transition (the left edge of the black checker or the right edge of the gray checker) prior to the location in the video line of the genuine horizontal line synchronization (sync) signal. The early retrace so triggered causes the picture information on the succeeding line to be advanced, i.e. displaced horizontally to the right by an amount equal to the distance between the negative transition and the location of the leading edge of the genuine horizontal sync signal. This displacement causes a "tearing" (horizontal repositioning) of picture information.

A somewhat similar modification in the vertical picture sense inserts alternating dark and white bands in place of active video in the last few lines of selected video fields in the lower overscan portion of the picture just prior to the vertical blanking interval, and/or extending into the first few lines of the vertical blanking interval.

This vertical rate modification is implemented in several ways. In one embodiment several of the active video lines (five or so) immediately prior to the vertical sync signal are made to alternate between blanking level and a gray level (typically about 30% of peak white) at a rate of about 1 to 5 cycles per second. This can cause drum servo unlock in the copying videotape recorder, or erroneous vertical retrace in the TV set, causing the picture from the unauthorized copy to exhibit vertical instability (jump up and down) at that particular rate, substantially degrading the quality of the image. In another version, two to five lines of alternating (modulated) white-black-white are inserted at the end of each or alternate video fields, with the same result of loss of vertical lock in a copying videotape recorder or viewing TV set due to interpretation of the inserted pattern as a vertical sync signal when the video signal amplitude has been reduced through AGC response to a copy protection signal.

These vertical modifications in another version are both extended into the first few lines of the subsequent vertical blanking interval.

Addition of pulses to portions of the video signal after normal horizontal or video synchronization pulses cause an abnormal video retrace at this point, thereby being an effective enhancement to the prior art basic anticopy process. Typically these added post-vertical synchronization pulses are at e.g. lines 22-24 of an NTSC television signal.

Thus, the processes in accordance with the invention ensure optimum conditions in terms of picture content for causing the maximum level of subjective degradation (1) to the replayed picture quality of the unauthorized copy and (2) to the recording and playback functions of videotape recorders.

The television set in response to the horizontal and vertical modifications erroneously performs the horizontal or vertical retrace at an abnormal point. In the same way that a TV set will misinterpret the signal, both the recording videotape recorder when the copy is made or the playback videotape recorder when the copy is replayed can also be affected. In this case it is the color circuitry of the videotape recorder which is affected, with resultant picture degradation additional to that caused by the basic anticopy process. This is an additional effect to what has been described so far. This is because of the special way a videotape recorder processes the color information. The picture distortions include inaccurate color rendition and intermittent or permanent loss of color. The objective of the modifications thus is to further destroy the entertainment value of the illegal copy, over and above the degradation of the picture quality caused by the above-described basic prior art copy protection process.

The third modification to the video signal involves narrowing horizontal sync pulses. In combination with a copy protected video signal having reduced signal amplitude when re-recorded (copied), this narrowing causes the sensing of spurious vertical sync signals by a videotape recorder or TV set, causing vertical retrace to take place at other than the beginning of a field and so further degrading picture quality. This modification narrows the width (duration) of the horizontal sync pulses on certain lines (such as lines 250-262) of the video field. These narrowed horizontal sync pulses, when combined with a video signal that is of diminished amplitude, trigger a spurious vertical retrace in many TV sets and videotape recorders, further degrading the displayed picture. Narrowing the horizontal sync pulses where the checker patterns exist (lines 10-250) also enhances the checker pattern distortion when an illegal copy is made.

It has been observed that the degradation of the picture quality in accordance with the present invention is particularly useful where the prior art basic copy protection process provides relatively small degradation of picture quality or relatively small degradation of videotape recorder recording or playback. Thus the combination of the prior art process and the present processes severely reduces entertainment value of the illegal copy on a much larger combination of videotape recorders and TV receivers than does the basic prior art process by itself.

Provision of the horizontal checker pattern or vertical modification only in the overscan portions of the television picture ensures that when the original recording or signal is viewed there is no visibility of the checker pattern or vertical modification, and indeed the presence thereof is not known to the viewer of the original recording.

In other embodiments, the process user might trade off picture area for effectiveness. (The user may elect to trade off visibility of the process when the "legal" recording is played, in order to enhance the process anticopy effectiveness.) Thus, the modifications may in violation of broadcast TV standards extend into the viewable portion of the video field, but still be acceptable in many applications. Furthermore, in another embodiment, the process trades off deviations from accepted signal standards to further enhance the anticopy effectiveness.

The modified signal in any case is displayed normally on any TV receiver or monitor, providing the signal is of the correct amplitude. When the modified signal amplitude is reduced, as on an illegal copy, the conditions are optimized for the TV receiver to display or for a videotape recorder to playback a distorted picture. This will occur in a back-to-back video tape recorder copying situation using two videotape recorders when the recording being (illegally) copied is provided with the basic anticopy process of the above-referenced U.S. Pat. No. 4,631,603.

The video signal modifications in accordance with the invention, in addition to causing lack of horizontal or vertical stability in a TV receiver, also additionally have similar effects as described above on a typical videocassette (videotape) recorder, both during recording and playback. VCRs use the leading edge of the horizontal sync pulse to correctly position the burst gate. If the burst gate is incorrectly positioned, the color burst is not be sampled properly and loss of color or distorted color results. The horizontal modification causes misinterpretation of the position of the leading edge of horizontal sync. This will occur in the VCRs involved in both the recording and playback of a (copy protected) copy, resulting in color loss/distortion. This effect can also be caused independently in the TV set. In the same way that a TV set will tend to lose vertical lock as a result of this process, so will a VCR. The result is a loss of drum servo lock in the VCR.

The modifications disclosed herein ensure that the required conditions for maximum picture disruption are always present, rather than relying on chance (the particular picture being displayed) that these conditions occur. Therefore the above processes which may include the horizontal aild/or vertical modifications and/or horizontal sync pulse narrowing have substantial value in enhancing the above-described basic prior art copy protection process, and more generally enhance any copy protection process which reduces the amplitude of the video signal which is recorded when an unauthorized copy is attempted. Another embodiment to enhance horizontal jitter with illegal copying of video tapes is to use post horizontal pseudo sync pulses of approximately −20 IRE amplitude (−40 IRE equals normal sync amplitude) and a width of about 1-2 µs varying in position in about a range of 1-2 µs after color burst.

While the embodiments disclosed herein are in the context of the NTSC television standard, with modifications apparent to one of ordinary skill in the art they are applicable to SECAM or PAL television standard.

Also disclosed herein in accordance with the invention are several methods and apparatuses for removal or "defeat" of the above-described video signal modifications, to permit unhampered copying and viewing thereof. The defeat method and apparatus in one version replace or level shift the vertical and horizontal modification pulses with a fixed level gray signal, and defeat the sync pulse narrowing modification by sync widening or replacement.

In other versions, the defeat method uses added pre-horizontal sync pulses, post-horizontal sync pulses, or attenuation averaging. Also disclosed is a new method of defeating the prior art basic video anticopying process.

BRIEF DESCRIPTION OF THE DRAWINGS

FIG. 12b shows waveforms illustrating operation of the circuit of FIG. 12a;

FIGS. 24a, 24b, 24c show a circuit for nullifying the enhancement signals using sync widening;

FIGS. 25a to 25h shows waveforms of the circuit of FIGS. 24a, 24b;

FIGS. 38a to 38e show waveforms illustrating operation of the circuit of FIG. 37;

FIGS. 39b to 39d show waveforms illustrating operation of the circuit of FIG. 39a;

FIGS. 40a, 40d, 40g show circuits for defeat of post-pseudo sync pulses;

FIGS. 40b, 40c, 40e, 40f, and 40h show waveforms illustrating operation of the circuits of FIGS. 40a, 40d, 40g;

FIG. 41a shows a circuit for defeat of post-pseudo sync pulses by pulse narrowing;

FIG. 41b shows a corresponding waveform illustrating operation of the circuit of FIG. 41a;

FIGS. 43a to 43g show waveforms illustrating operation of the circuit of FIGS. 42a, 42b.

DETAILED DESCRIPTION OF THE INVENTION

Horizontal Rate (Checker) Signal Modification

Figure 1A:
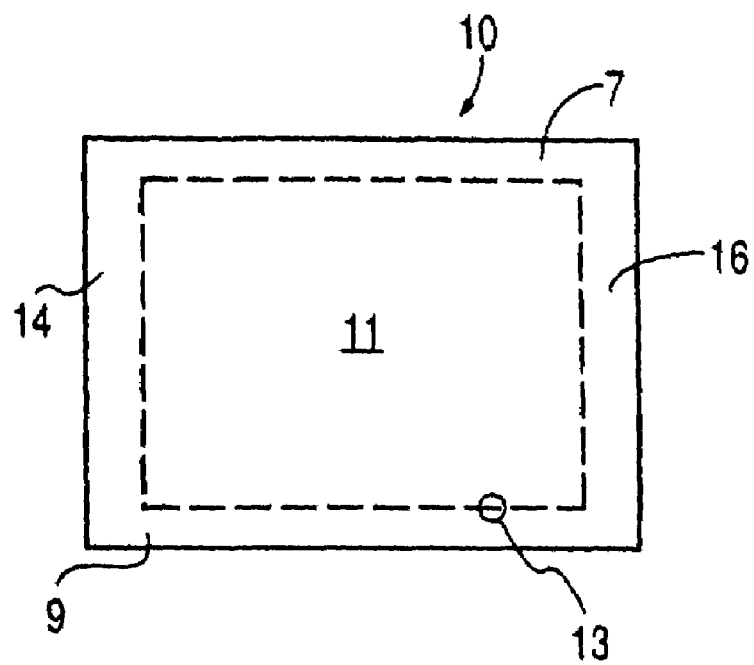
FIGS. 1a and 1b show respectively a normal picture and a modified picture with the horizontal modification checker pattern and the location of the vertical modification.

FIG. 1a shows a normal television picture 10, (without showing any actual video information), i.e. including the left and right overscan portions 14, 16 and top and bottom overscan positions 7, 9. The part of the picture inside the dotted line 13 is the visible video 11.

The overscan portion of a television picture, as is well known, is that portion of the television picture not viewable on a standard television set. Because of design limitations and aesthetic considerations, standard TV sets are adjusted by the manufacturer to display somewhat less than 100% of the transmitted picture area. The portions of the television image which are not normally viewable are called the overscan area. These portions are viewable on a professional-type video monitor with underscan capability. However, all standard television receivers operate in an overscan mode, and hence the added checker pattern and the modified lines at the end of each field would not be viewable on such standard television receivers as sold in the United States and elsewhere.

Figure 1B:
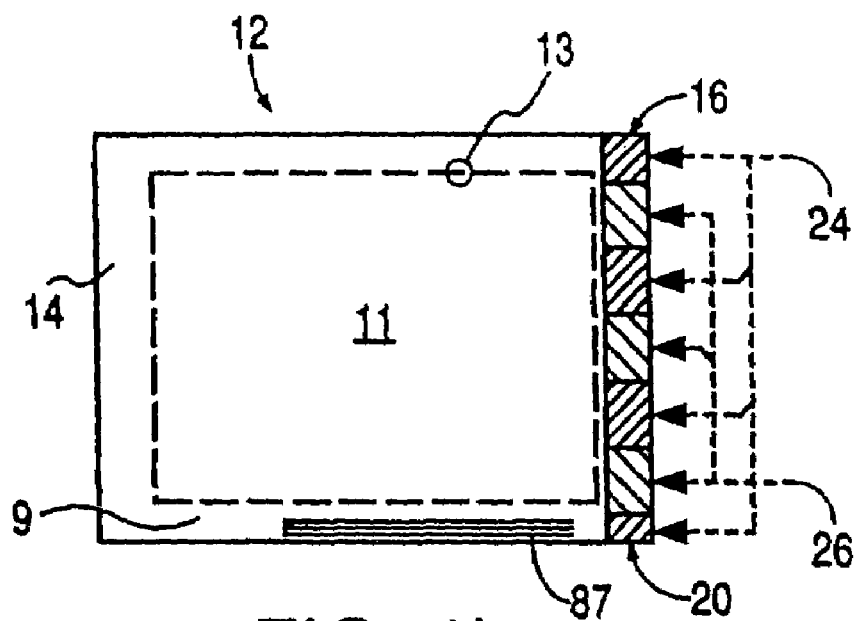

FIG. 1b shows the modified television picture 12 in accordance with the certain modifications of the present invention, also including the overscan portions 14, 16. In the right-side overscan portion 16, a checker pattern 20 of alternating gray rectangles 24 and black rectangles 26 is provided. This checker pattern information 24, 26 provides the copy protection enhancement as described below. In the display of the picture 12 on a standard TV set the checker pattern 20 would not be seen since it is in overscan area 16. The vertical signal modification is inserted in the bottom overscan area 9 and therefore is also not visible.

Figure 2A:
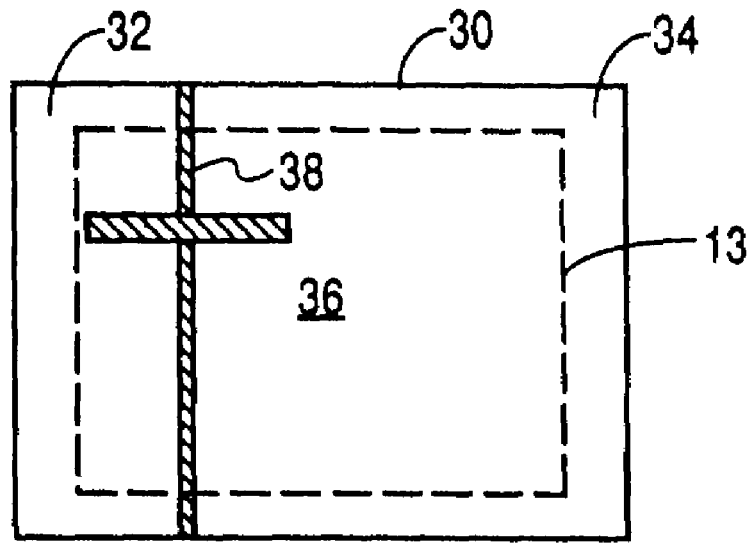
FIGS. 2a and 2b show a picture resulting from a video signal of normal amplitude, respectively without and with the checker pattern.

FIG. 2a shows a video field 30, including the left and right overscan portions 32, 34, including in the active video 36 a vertical and horizontal picture element 38 (such as for instance a cross). This field 30 is in accordance with the prior art and the checker pattern and vertical modification signal are clearly not included. This is also without any reduction of signal amplitude, i.e. without provision of the prior art copy protection process.

Figure 2B:
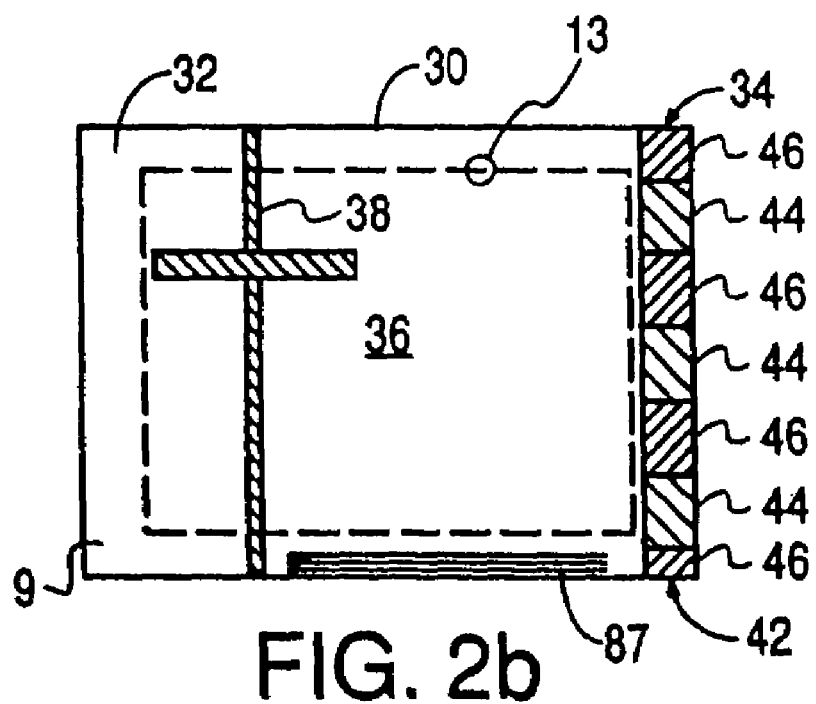

FIG. 2b shows the field 30 with the addition of the checker pattern 42 in overscan area 34 outside border 13 and the addition of vertical modification pattern 87 to lower overscan portion 9. Since there is normal signal amplitude present, the checker pattern 42 and/or vertical pattern 87 have no effect on the appearance of the cross 38 which is shown normally. It is to be understood that FIG. 2b is what would appear on a monitor showing the entire area and would not appear on a normal television receiver.

It is not possible to show a graphic representation of the effect of these signals on the VCR. A TV set will display artifacts due to the abnormally low signal amplitude; the VCRs used to record and replay the copy can also be affected. In this instance, the servo systems of the VCRs will be disturbed, resulting in positionally unstable pictures.

Figure 3A:
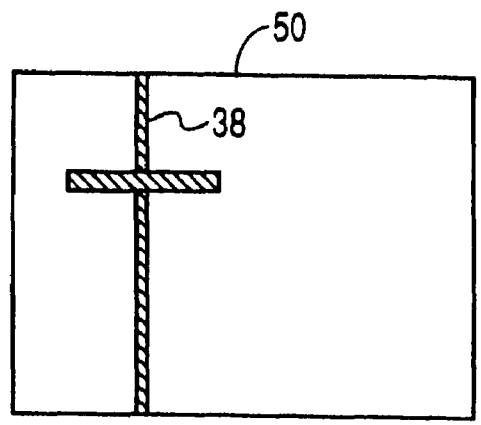
FIGS. 3a, 3b and 3c show the same pictures as displayed respectively on a television set with a video signal of reduced amplitude, without and with the checker pattern and vertical modification.

FIG. 3a shows a picture 50 resulting from reduced signal amplitude, i.e. in accordance with the prior art copy protection process, acting on a relatively insensitive VCR, but without the addition of the checker pattern. This figure shows only the actual viewable portion (inside border 13 of FIGS. 2a, 2b) of the picture on a standard television receiver. As can be seen, the cross 38 is displayed normally because in this case the picture content is such that there is no horizontal displacement. This is a case where the prior art copy protection process provides inadequate copy protection, because the picture is indeed viewable.

Figure 3B:
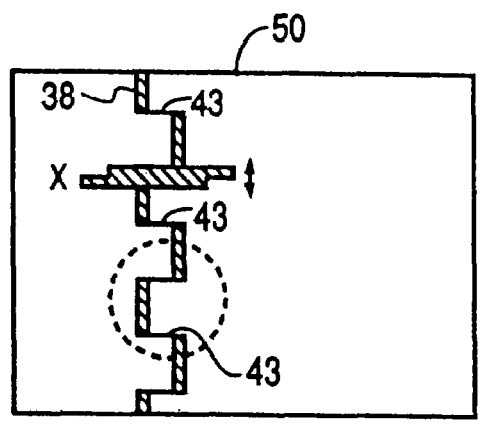
Figure 3C:
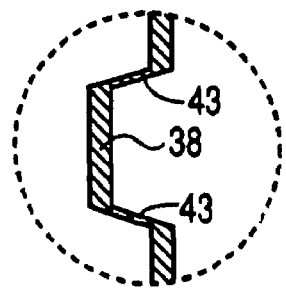

FIG. 3b shows the effect of the presence of the checker pattern 42 of FIG. 2b when the reduced signal amplitude is present, i.e. when the prior art copy protection process is used in conjunction with the checker pattern. Again in FIG. 3b the overscan portion is not shown. Here it can be seen that the cross 38 suffers from multiple horizontal "tears" 43 which occur at the location of the transition from gray checker 46 to black checker 44 (and vice versa) of the checker pattern 42 of FIG. 2b. As shown in the enlarged view of FIG. 3c, portions 43 of the vertical part of cross 38 are horizontally displaced by an amount dependent on the distance between the left edge of the black portions 44 of the checker pattern and the location of the true horizontal sync signal in each line (not shown). Clearly, the picture 50 of FIG. 3b is substantially degraded. The effect is further enhanced (not shown) by moving the checker pattern 42 up or down slowly in the vertical direction so that the horizontal displacements are seen to move, i.e. "wiggle". This provides a virtually unviewable picture and hence substantial copy protection.

In accordance with the invention the checker pattern 42 of FIG. 2b includes typically five black rectangles 44 each alternating with one of the mid-gray rectangles 46. (Fewer such rectangles are shown in FIG. 2b for clarity). It has been found that maximum picture degradation occurs with approximately five gray to black transitions and five black to gray transitions per picture height.

The signal level of the black rectangles 44 is set to be between blanking level and black level for NTSC (black level and blanking level are the same for PAL or SECAM signals), and at black level for PAL and SECAM, and the amplitude of the mid-gray rectangles 46 is approximately 30% of peak white level. The checker pattern 42 induces the zig-zag type pattern as shown in FIG. 3b; in other embodiments, there might be only one black rectangle 44 or two, three or four or more black rectangles 44 per field 30 of FIG. 2b. Also the sizes (heights and widths) of the black rectangles 44 need not be uniform.

The process causes early horizontal retrace in a low video signal amplitude environment by providing a negative-going transition, i.e. from the instantaneous picture level at the start point of the black rectangles 44 to black level prior to the horizontal sync signals on at least certain lines of the picture. The checker pattern 42 shown in FIG. 2b is one such pattern which causes the intended effect.

The typical duration, (width) of the checker pattern 42 is approximately 1.0 to 2.5 microseconds, as determined by the requirement that the checker pattern normally is not introduced into the displayed portion of a standard television picture, i.e. is limited to the overscan portion, and also does not infringe upon the normal horizontal blanking period.

In other embodiments, the horizontal sync pulse is narrowed and allowing the checker pattern to be wider. This would provide a greater horizontal displacement when the reduced amplitude video signal is displayed, but result in a nonstandard original video signal, which however is acceptable for certain non-broadcast applications. Also, the particular amplitudes of the mid-gray 46 and/or black rectangles 44 need not be exactly as described above. Any effects resulting from the changed relative position of leading edge of horizontal sync pulse and the color burst can be corrected by a corresponding relocation and/or expansion of the color burst.

Figure 4:
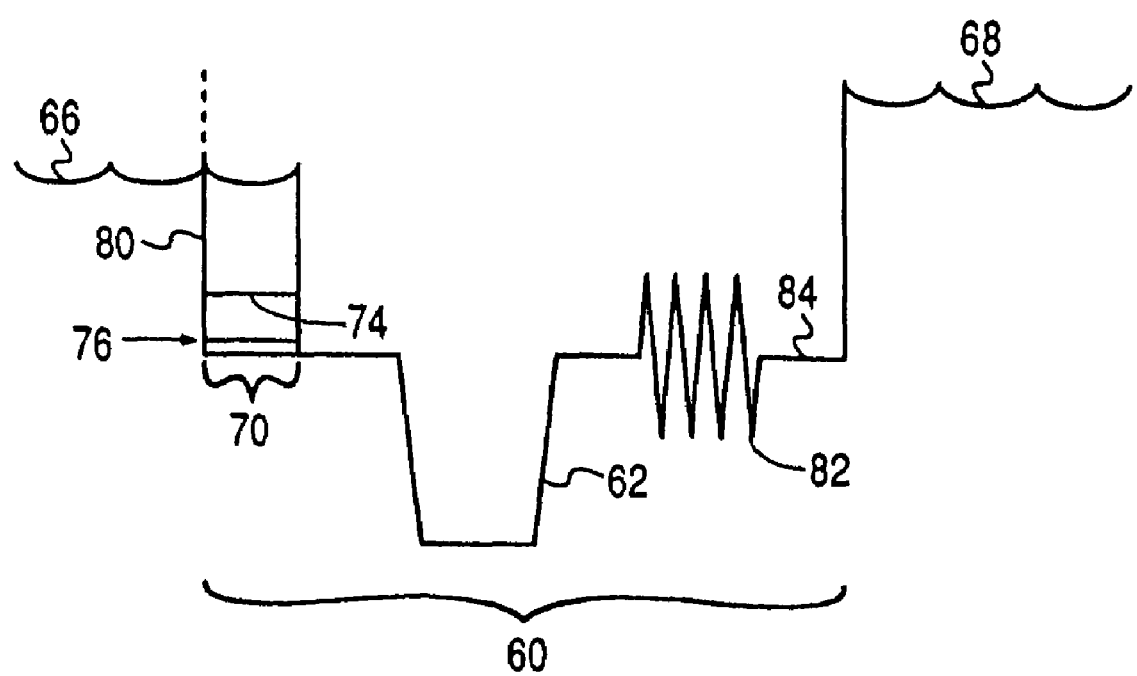
FIG. 4 shows a portion of a video signal with the checker pattern.

FIG. 4 shows the horizontal blanking interval 60 for a single video line, with a portion of the checker pattern present. The horizontal sync pulse 62 conventionally starts 1.5 microseconds after the start of the horizontal blanking interval 60. Active video 66, 68 occurs both before and after the horizontal blanking interval 60. However, in accordance with the invention, a portion 70 of the active video 66 just prior to the horizontal blanking interval 60 has been replaced by either a mid-gray level signal 74 or by a black level signal 76. (The gray level 74 and the black level 76 are both shown in FIG. 4 only for purposes of illustration.) The loss of portion 70 of the active video 66 is not problematic, since as explained above in a standard television receiver this portion of active video is not visible anyway, being in the overscan portion of the picture.

The transition 80 from the active video level 66 down to the black level 76 appears to the television receiver to be a horizontal sync signal. This effect (as explained above) only occurs when the video signal being displayed has reduced amplitude due to the copy protection process.

The presence of the gray level 74 (the gray portions of the checker) additionally ensures that the entire picture is not shifted to the right. This would be the case if for instance there was a solid black stripe down the right hand side of the picture. The alternating gray and black levels provide the zig zag effect shown in FIG. 3b, which has been found to be intolerable for viewing by virtually any individual. Also shown in FIG. 4 is a conventional color burst 82 riding on the back porch 84 of the horizontal blanking interval 60.

It will be appreciated from FIG. 4 that the only modification to the video signal is the removal of the small portion of active video 70 and the substitution therefore of either the gray level 74 or black level 76.

The above described wiggle enhancement causes the checker pattern to move slowly from the bottom to the top of the picture or vice versa. It is found that if this takes approximately one second for a given transition to migrate from the bottom of the picture to the top of the picture or vice versa, this causes optimum reduction of entertainment value of the picture. This moving wiggle effect is provided by using a frequency of the square wave that generates the checker pattern, being slightly offset from the fifth harmonic of field rate, i.e. between 295 Hz and 305 Hz, for NTSC television. The corresponding frequency for PAL or SECAM systems is 245 to 255 Hz. This nonsynchronicity provides the desired slow movement of in the checker pattern. As noted above, even if such asynchronicity is not present and the checker pattern is static, there is still substantial benefit from the present process. The frequency of the signal generating the checker pattern can be adjusted to maximize the degradation of the picture quality when the low amplitude signal is replayed and displayed. Frequencies between 180 and 360 Hz for NTSC and 150 to 300 Hz for PAL (3 to 5 times the field rate) typically result in an optimum effect. The frequency may be varied with time to ensure optimum effect on a variety of playback and viewing equipment.

In another embodiment, the checker pattern is located on the front porch of the horizontal blanking interval, i.e. not replacing any portion of active video. This somewhat reduces the amount of horizontal displacement; however, still there is at least some of the desired effect but resulting in a signal which retains all of the picture information but does not conform to all NTSC standards.

The checker pattern need not be present on every field.

Vertical Rate Signal Modification

The above detailed description is directed to horizontal picture information; the video signal modification and the consequent effect of this modification are in the horizontal picture direction. The related vertical rate modification described in the Summary is further described hereinafter.

The vertical modification takes several forms. In one embodiment, groups of 1 to 4 lines in the lower overscan portion of a video field have their active video replaced alternatively with white or black. In another embodiment, the last few video lines immediately prior to the vertical sync pulse are blanked, as are the first few lines of the following vertical blanking interval, and the original picture video and vertical sync pulse therein are replaced with either a high level (such as mid gray which is about 30% peak white, or actual peak white) or a low level (in the range of black down to blanking level) signal as shown at 87 in FIGS. 1b, 2b and described above.

These vertical modifications are normally not visible to the viewer since the modified active video lines are restricted to those lines falling in the overscan area 9 at the bottom of the picture of FIG. 1b. (Also, the modified lines will be in a similar location to the head switch point when video from a VCR is considered, and video on these lines is unusable in any case as a result of disturbances occurring at and after the head switch point.)

In a standard NTSC video signal (or in other standards) as is well known, the first three lines of the vertical blanking interval each include two equalization pulses, and the following three lines each include two "broad" vertical sync pulses. Normally vertical retrace begins shortly after the first of these vertical sync pulses.

Figure 5A:
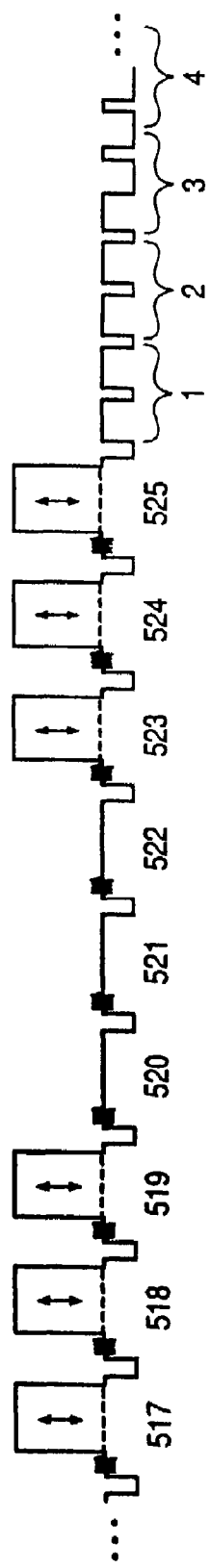
FIGS. 5a and 5b show respectively a portion of a video signal with the vertical modification not extending into the horizontal and vertical blanking interval and with the vertical modification extending into the vertical blanking interval.

The first vertical modification embodiment is shown in FIG. 5a. (Line numbers here refer to the second field of an NTSC video frame.) Lines 517, 518, 519 have their active video portions replaced with a peak white (1.0 volt nominal) signal; the same is done in lines 523, 524, 525. In lines 520, 521, 522 the active video is replaced with a black (0 volt nominal) signal. Instead of groups of three lines, the groups may be 0 to 5 or more lines, and the white and black signals may be modulated or switched in amplitude. Thus in the last several lines of each field the pattern of the white and black signals changes dynamically between fields.

The second vertical modification embodiment (FIG. 5b) blanks the last two active video lines (lines 524 and 525 for instance) in a video field and the first three lines (lines 1, 2, 3 for instance) of the immediately following VBI. These two active lines are in the lower overscan portion 9 (FIG. 16) of the TV picture. Then a mid gray (30% of peak white) video signal 87 is generated and inserted in these five blanked lines on a periodic basis. When the mid gray signal is not on (indicated by vertical arrows at lines 524, . . . , 3), these blanked lines "fool" the vertical sync circuitry of most TV receivers into performing the vertical retrace at the beginning of the first of these five lines, rather then normally five lines later at the beginning of the vertical sync pulses. Thus vertical retrace is advanced by five lines. When these five lines are at mid gray, vertical retrace is initiated at its proper location by normal vertical sync. It is to be understood that the number of such blanked lines and the amplitude of the inserted waveform may vary in other embodiments.

Figure 5B:
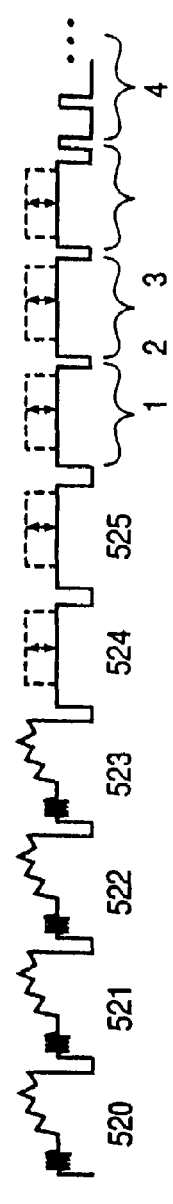

As shown in FIG. 5b, lines 4-6 (only 1-4 are shown) are as in a standard signal, as are lines 517 to 523. The modification is only to lines 524, 525, 1, 2 and 3; the active video portions of lines 524, 525 and the corresponding portions of lines 1-3 are blanked (to black) or have a mid gray signal at about 0.3 volts inserted. (It is to be understood that this amplitude is nominal, without consideration of the amplitude reduction effect of the associated prior art copy protection process). FIG. 5b shows a portion of a field with the mid-gray level. As stated above, the gray signal is switched on and off ("oscillates") at a rate typically between 1 Hz and 10 Hz. In the version oscillating at 1 Hz, there are 30 consecutive video fields with five lines having active video at blanking level, followed by 30 consecutive video fields with the five lines at 30% gray of FIG. 5b. As shown in FIG. 5b, the color burst in lines 524 to 3 may be blanked (or not).

This oscillation causes the picture to "jump" up and down by 5 lines once per second (the oscillation rate) which has been found to be extremely irritating to the viewer as suggested at "x" in FIG. 3b. That is to say, on the fields where the vertical modification of FIG. 5b is present, the vertical retrace occurs early by five lines, followed by the fields where the vertical retrace occurs normally. The early vertical retrace occurs because the overall video amplitude has been reduced for instance to a maximum (peak white to sync tip) of 0.4 volts from the NTSC standard 1.0 volts due to the presence of the prior art copy protection signals. The vertical sync separator of the TV receiver then perceives the first of the five blanked lines as being the first vertical sync (broad) pulse and so retraces vertically shortly thereafter.

In another version of the vertical modification (not shown) instead of the last two lines of one field and the first three lines of the next field being modified as in FIG. 5b, the modification is wholly to the last five lines (lines 521, 522, 523, 524, 525) of active video of one field; this avoids producing an "illegal" (non-standard) video signal. A variation of this vertical modification is to relocate about 3 lines or more like lines 524, 525, and in FIG. 5b to lines after the vertical sync area (i.e., lines 22-24). In some TV sets this causes extra jumping because the TV set "sees" two vertical sync pulses one at the right time i.e., line 4 and one at about line 23.

It is to be understood that the vertical modification need not extend over the entire active video portion of a horizontal line. It has been found that providing the modification over about ½ of the duration of active video in a line is sufficient to generate the premature vertical retrace.

Figure 5C:
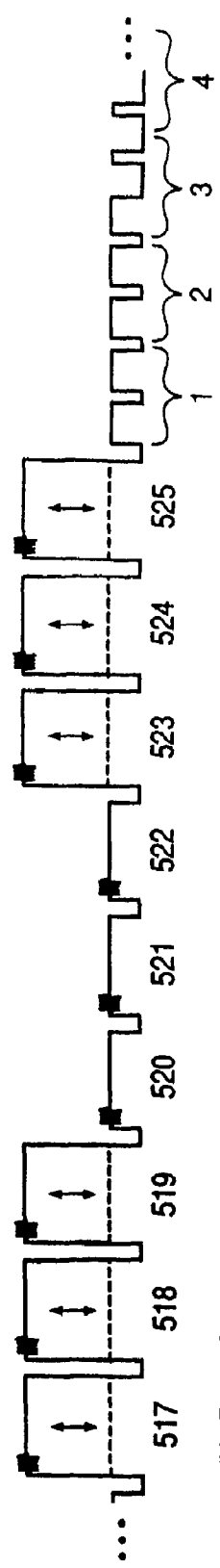
FIG. 5c shows an additional vertical modification extending into the horizontal blanking interval.

In yet another embodiment of the vertical modification (similar in most respects to that of FIG. 5a) as shown in FIG. 5c, the horizontal blanking interval is removed (blanked) on lines 517, 518, 519, 523, 524, 525 where the white pulses are added. Therefore (like that of FIG. 5b) this is also an "illegal" (non-standard) video signal, but is acceptable for many non-broadcast applications. The elimination of horizontal blanking on these lines increases AGC gain reduction (in VCR AGC circuits). The white pulses on lines 517, 518, 519 and 523, 524, 525 may be present in each field or modulated or switched in amplitude. Moreover, these lines with white pulses may change locations by a few lines from field to field or some multiple of field rate as to induce vertical blurring effects when an illegal copy is made and viewed on a TV set. The groups of white pulses may extend over zero to four lines.

The vertical modifications to the video signal have no effect when applied to a TV monitor as a part of an original (authorized) signal. However, if the video signal amplitude is reduced sufficiently, for example by an anticopy process, the TV monitor will tend to incorrectly detect the vertical sync information, with vertical instability resulting as described above.

Furthermore, if the vertically modified signal is applied to a VCR in conjunction with an anticopy process which results in a reduced amplitude video signal within the recording VCR, when a recording is made the VCR's drum servo will tend to be disturbed. This is because VCR's typically require a "clean" vertical sync signal to maintain correct phase, and the presence of a jittering vertical sync signal causes the VCR to lose lock. When the recording is replayed the visible effect is vertical instability of the picture plus intermittent noise bands which appear as the drum servo loses lock. (This is similar to a variable tracking error.)

In other words, the vertical rate waveform modifications function similarly to the horizontal rate waveform modification described above, except that vertical disturbances are induced rather than horizontal. The two techniques combined are more effective in terms of picture quality degradation than either one on its own. Sweeping the pulse rate of the vertical waveforms increases effectiveness to more TV sets, i.e., the frequency is varied between for instance 2 Hz and 10 Hz over a period of about 20 seconds. Sweeping the checker frequencies also will cause the horizontal tearing to go up and down resulting in a more irritating picture when an illegal copy is made.

Apparatus For Vertical And Horizontal Modifications

Figure 6A:
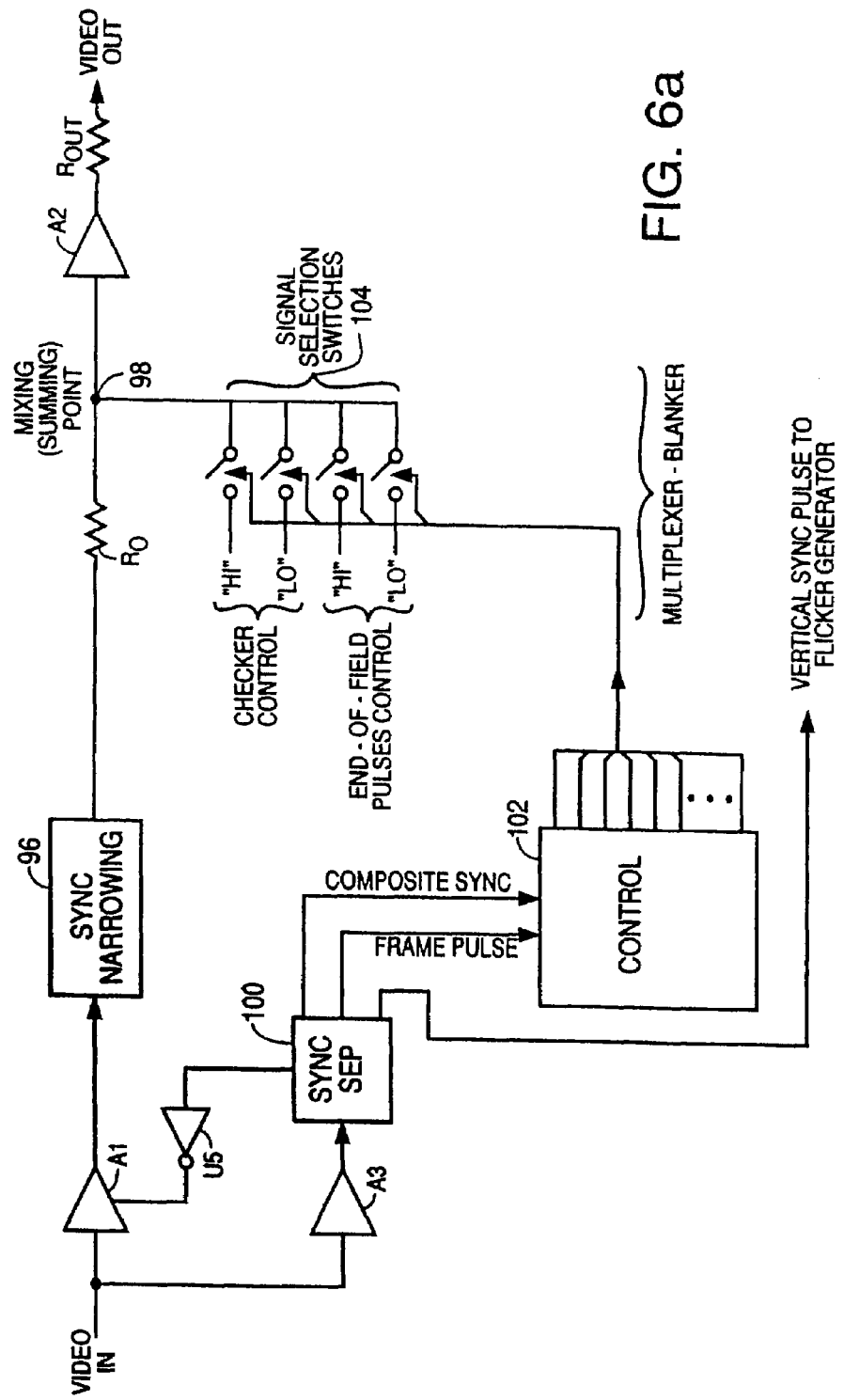
FIGS. 6a, 6b, 6c show a circuit for providing video signal modifications in accordance with the invention.

Circuitry for inserting the above-described horizontal and vertical modifications is shown in block form in FIG. 6a.

The main video signal path includes an input clamp amplifier A1; a sync pulse narrowing circuit 96; a mixing point 98 at which the waveform components of the horizontal checker and the vertical modification Oitter inducing) waveforms are added; and an output line driver amplifier A2. In this case also the video input signal into the circuit of FIG. 6a may have the last 9 lines of each field blanked to a reference level. U.S. Pat. No. 4,695,901 shows a switching circuit for blanking.

The process control and signal generation path includes a sync separator 100; control circuit 102; circuits (see FIG. 6b) to generate the required signal voltages which will be added to the main video signal; and a switch selection system 104 (FIG. 6a) which applies the required signal voltages under the control of the control circuit 102. (Note that in the drawings certain parts designations, e.g. U1, R1, OS1, A1 are on occasion repeated for certain components. These are not intended to represent the identical component unless explicitly indicated.)

The input video is DC restored by the input video clamp amplifier A1. (Amplifier A1 is a commercially available part, for example the Elantec EL2090.) Amplifier A1 ensures that the video signal (at blanking) is at a known pre-determined DC level before adding any additional waveform components to that video signal.

The resulting clamped video signal is applied to the mixing point 98 with a source impedance Ro, typically greater than 1000 ohms. The added pulse signals to be injected are applied to the mixing point 98 with a source impedance less than 50 ohms. When it is required to modify the input video signal, for example with a checker component, the appropriate signal is selected and applied to the mixing point at a low source impedance, which overrides the input video signal from amplifier A1 and effectively replaces the input video signal with the required signal. When the input signal is to remain unchanged, the switch elements 104 are all in the open state, with the result that the video signal passes unchanged to the output line driver amplifier A2. The resulting video signal at the mixing point 98 is applied to line driver amplifier A2 to provide standard output signal level and output impedance. An output of the video clamp amplifier A1 is applied to the sync separator 100 (this is a commonly available part, for example the National Semiconductor LM 1881.) Sync separator 100 provides the composite sync pulses and frame identification signal required by the process control circuit 102.

The process control circuit 102 generate the control signals to turn on the signal selection switches 104 at the precise time (and for the required duration) that the various signals are to replace the input video signal.

All of the various signals which are to replace the original (input) video consist of a high or low steady state DC signal level. For example the checker signal "high" is a mid-gray level, typically of about 30% of peak white; the checker signal "low" is black level or blanking level. These various signal levels are generated (see FIG. 6b) from potentiometers $VR_1$, $VR_2$, $VR_3$, $VR_4$ which provide adjustable signal levels (or alternatively from voltage divider resistors for fixed preset signal levels) connected across appropriate supply voltage lines. This signal is applied to the appropriate selection switch elements respectively 104-1, 104-2, 104-3, 104-4 via unity gain operational amplifiers A5 to ensure the required low output impedance into the mixing point 98.

The control circuit 102 generates the appropriate switch selection control pulses for the checker pattern and vertical modification signals (see FIG. 6a). Checker pulses are applied only to selected lines; one example is to start the checker pattern at the 10th line containing picture information (i.e. after the end of vertical blanking) and end it 10 lines before the last line containing picture information (i.e. 10 lines before the start of the succeeding vertical blanking interval). Similarly, the vertical jitter modification signals are be applied only to selected lines, for example the last nine lines prior to the vertical blanking interval. Hence, both the checker pattern and vertical modification signals require control signals with both horizontal and vertical rate components.

Figure 6B:
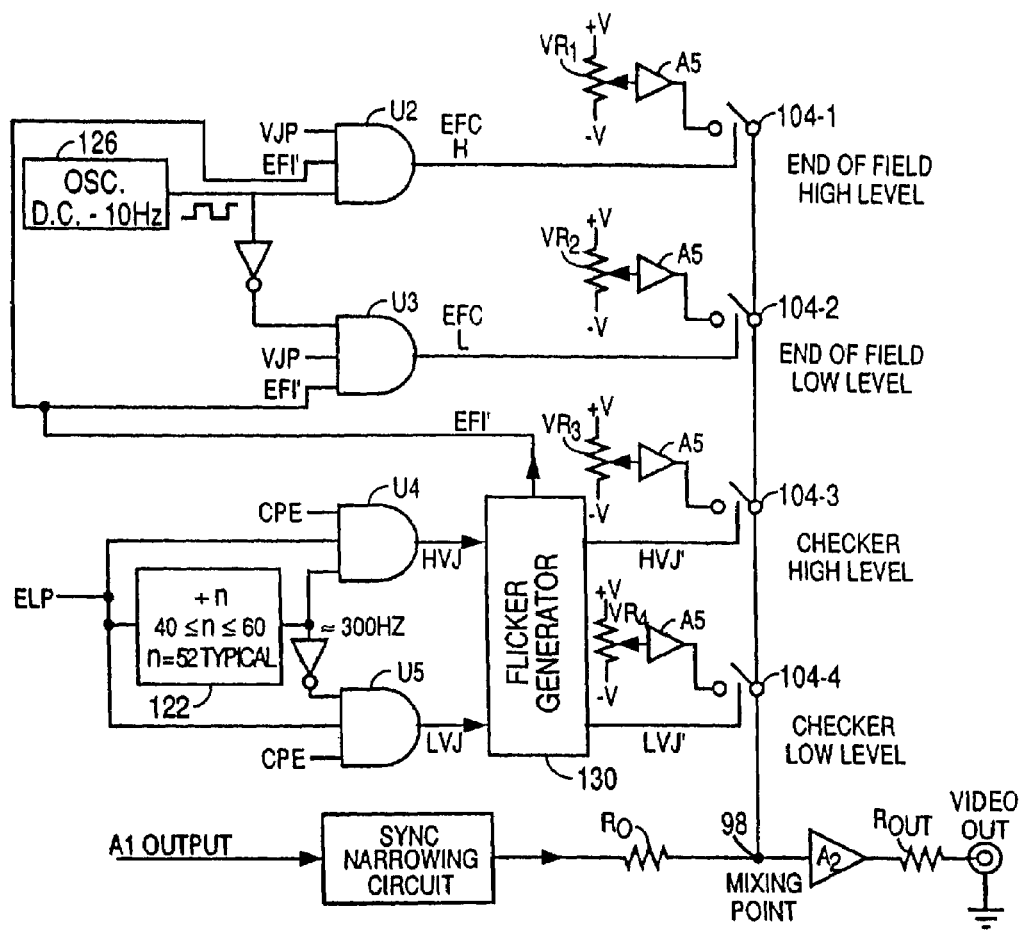
Figure 6C:
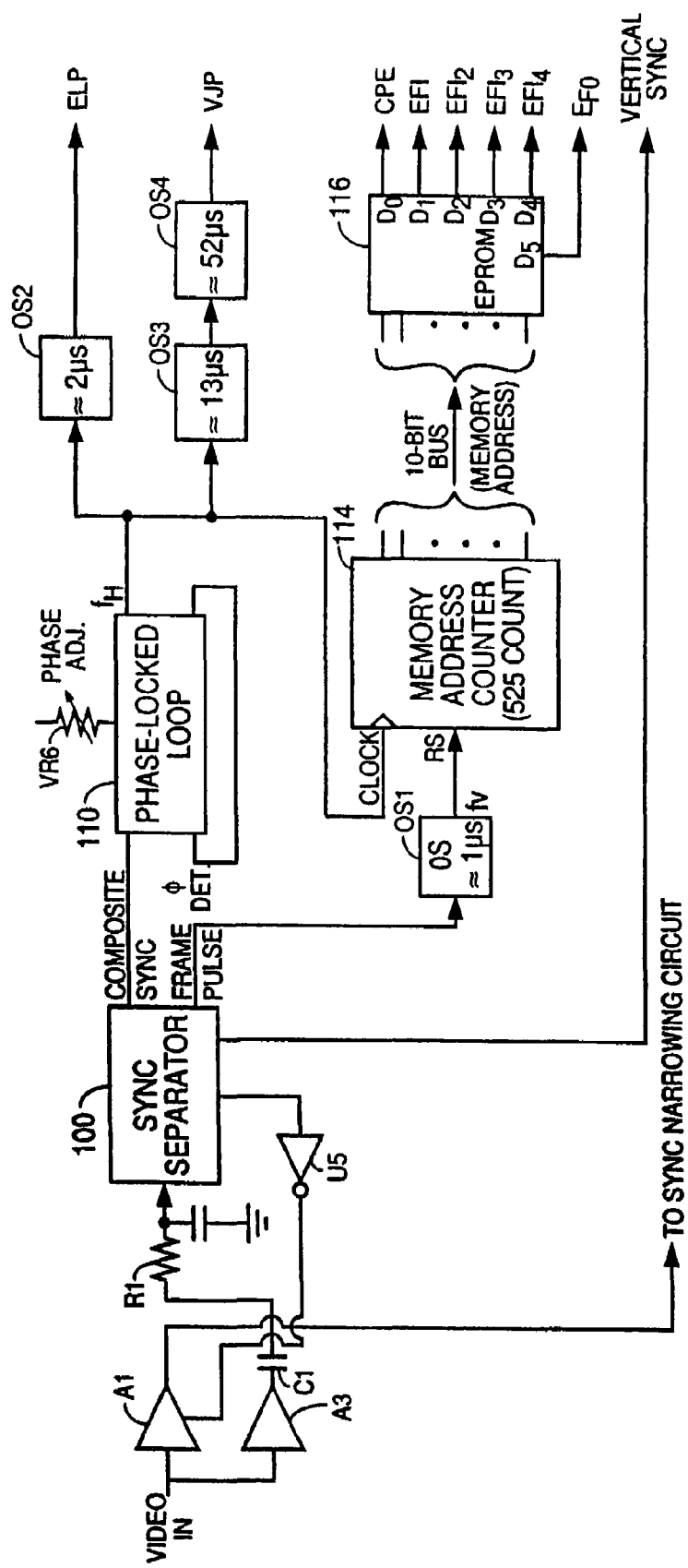
Figure 7A:
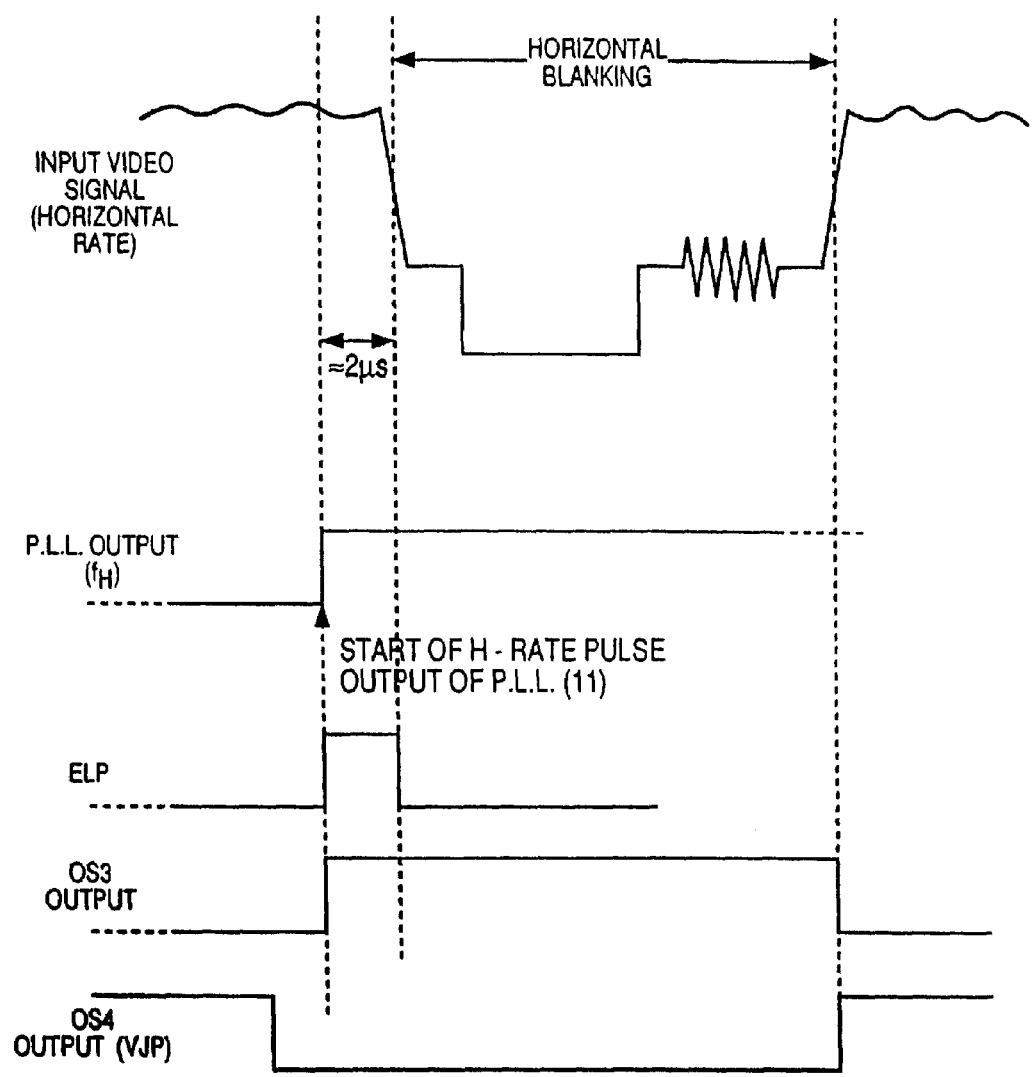
FIGS. 7a, 7b show waveforms illustrating operation of the circuit of FIGS. 6a, 6b, 6c.
Figure 7B:
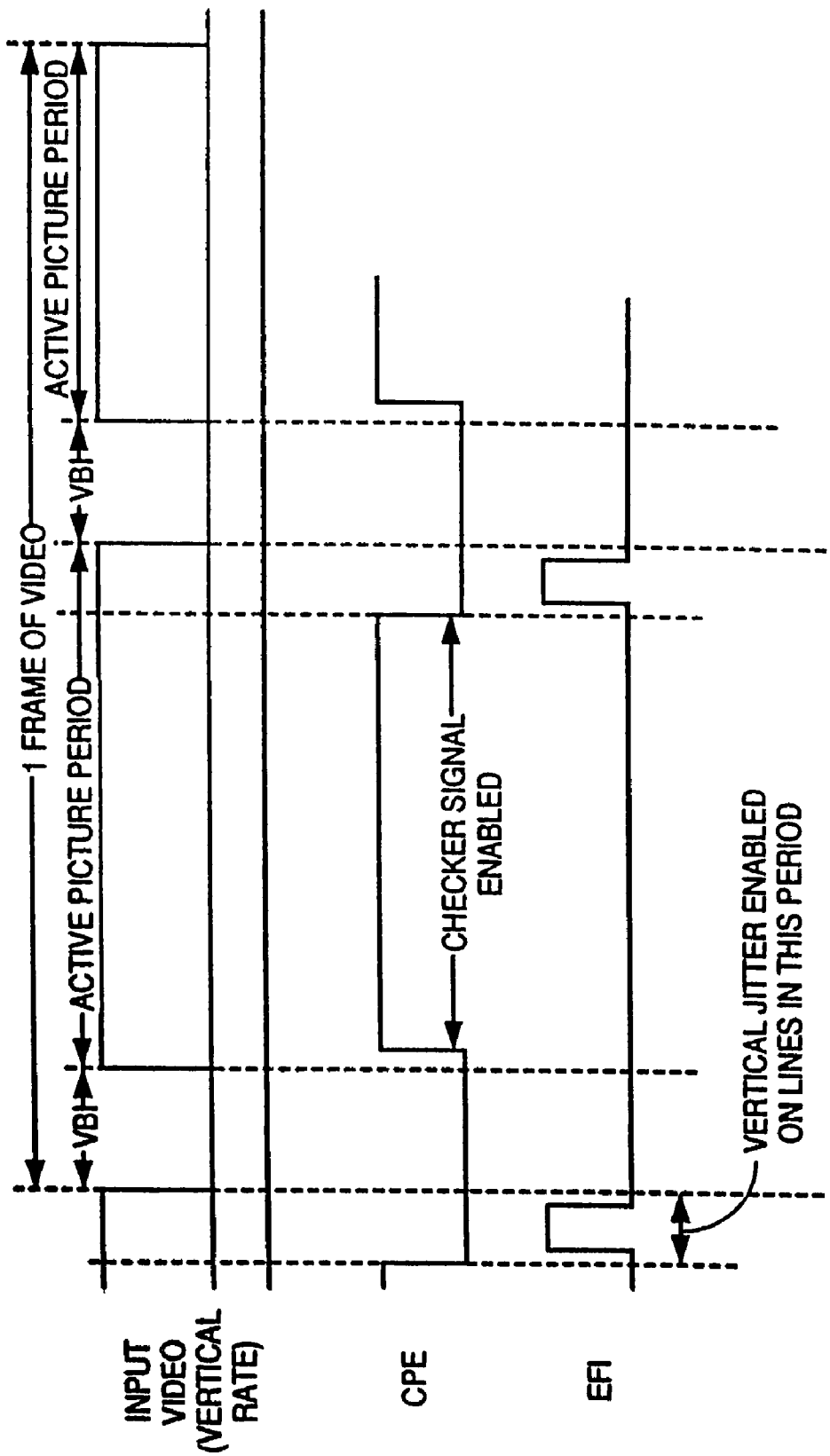

The video input signal "video in" (see FIG. 6c showing detail of FIG. 6a) is buffered by amplifier A3 and coupled to sync separator via coupling capacitor C1 and a low-pass filter including resistor R1 and capacitor C2. Sync separator 100 provides composite sync pulses and frame identification square wave signals. The composite sync pulses are applied to a phase-locked loop (PLL) 110. The phase control ("phase adj.") of PLL 110 using potentiometer $VR_6$ is adjusted so that the horizontal rate output pulse starts at the required start point of the checker, typically 2 μs before the start of horizontal blanking (FIG. 7a). The output signal of PLL 110 is used to derive the horizontal rate component $f_H$ of both the checker and vertical modification signals. The burst gate output signal of sync separator 100 is inverted by inverter U5 which provides a clamping pulse for clamp amplifier A1 (part number EL2090).

The frame identification square wave output ("frame pulse") of sync separator 100 is applied to a one-shot circuit OS1 to provide a frame identification pulse of approximately 1 μs duration. This one-shot output signal $f_v$ is used to derive the vertical rate component of both the checker and vertical modification signals. The horizontal-rate phase-locked loop component $f_H$ from PLL 110 is applied to the clock input terminal of a memory-address counter 114. The frame (vertical)-rate one-shot output signal $f_v$ is applied to the reset input terminal RS of counter 114. The memory address counter 114 output signals are applied to the memory 116, typically an EPROM which is programmed such that one of its data line output terminals provides a checker pulse enable (CPE) signal which is high during that portion of the picture period that the checker signal is to be present. A second EPROM data line output terminal provides an end-of-field identification (EFI) signal which is high during the lines at the end of each field which will have to include vertical modification signals.

The horizontal-rate phase-locked loop component $f_H$ is also applied to a one-shot circuit OS2 which generates an end-of-line pulse (ELP) of the required duration of the checker pulses, typically 2 μs (see FIG. 7a).

The horizontal-rate phase-locked loop output signal $f_H$ is also applied to another one-shot circuit OS3, providing an output pulse of approximately 13 μs duration. The output of one-shot OS3 triggers another one-shot OS4 with an output pulse VJP of approximately 52 μs duration. The timing and duration of pulse VJP define the position of the vertical modification inducing signal within the line time; i.e. pulse VJP is essentially on during the desired portion of the active horizontal line period.

The four signals ELP, VJP, CPE and EFI generate the required control signals for the signal selection switches 104-1, . . . , 104-4 (see FIG. 6b). The end of line pulse ELP is applied to a divider circuit 122 to derive the desired frequency to determine the checker frequency. The higher this frequency, the greater the number of checker dark-light-dark transitions per picture height. This frequency may be chosen within a wide range; a divider ratio of 52 (n=52) provides a useful result. The divider 122 output signal is applied directly to one input terminal of 3-input AND gate U4. An inverted output signal of divider 122 is applied to the corresponding input terminal of second 3-input AND gate U5. The output portino of divider 122 can be a sweep oscillator circuit consisting of a pair of NE566 IC's. One NE566 is set nominally at 300 Hz and the other is set at 1 Hz. The output of the 1 Hz NE566 is fed to the frequency control input of the 300 Hz NE566. Both 3-input AND gates U4, U5 have the checker pulse enable (CPE) and end of line pulse (ELP) signals applied to their two other input terminals. The result is a high checker control (HVJ) signal at the output terminal of 3-input AND gate U4, and a low checker control (LVJ) signal at the output of 3-input AND gate U5.

A similar arrangement generates the required signals for the vertical modification control signals. An oscillator 126 (such as the commercially available part number NE555 or NE566) is configured to operate at low frequencies, typically between DC and 10 Hz. The oscillator 126 can be set to a high logic level output. Similarly the DC to 10 Hz signal output can be swept over a range of frequencies to upset as many TV sets as possible during playback of an illegal copy. This can be done as described above with a pair of NE566 IC's. The output signal of oscillator 126 is applied to one input of a 3-input AND gate U2. An inverted output signal of oscillator 126 is applied to the corresponding input terminal of a second 3-input AND gate U3. Also, each TV set may "resonate," or jitter more at unique frequencies sweeping the frequencies of oscillator 126 ensures wide coverage of different TV sets. The vertical jitter position (VJP) and end of field identification (EFI) signals (with signal EFI modified by flicker generator 130 and so designated EFI') are applied to the other two input terminals of 3-input AND gates U2, U3. The result is a high vertical jitter control (EFC H) signal at the output terminal of 3-input AND gate U2, and a low vertical jitter control (EFCL) signal at the output of 3-input AND gate U3.

It will be understood that with suitable modifications, the above apparatus will produce the added horizontal or vertical modifications after the normal horizontal or vertical sync signals, e.g. for the added vertical modifications at lines 22-24 of an NTSC television signal, so as to cause a video retrace.

The circuit of FIG. 6b in conjunction with flicker generator circuit 130 via EFI' produces multiple vertical modification signal patterns.

FIG. 6b shows the field or frame "flicker feature" generator 130 used in certain embodiments of the invention for modifying the horizontal and vertical modifications.

The following are achieved by this flicker feature:

1) Change the "polarity", i.e., invert the gray vs. black rectangles of the checker pattern at some particular multiple of field rate; this will for instance cause the attenuated video from an unauthorized copy to interleave the checker displacement, further degrading the viewability of the copy.

2) A field-by-field change of the position of the end of field (vertical modification) pulses causes the authorized copy to playback on a TV set an up/down flicked blur, because each field has a differently timed pseudo-critical sync pulse position. This is achieved for example if:

EFI pulse is high on lines 255-257, and
EFI1 pulse is high on lines 258-260, and
EFI2 pulse is high on lines 261-262 and 1, and
EFI3 pulse is high on lines 21-23.

Figure 8:
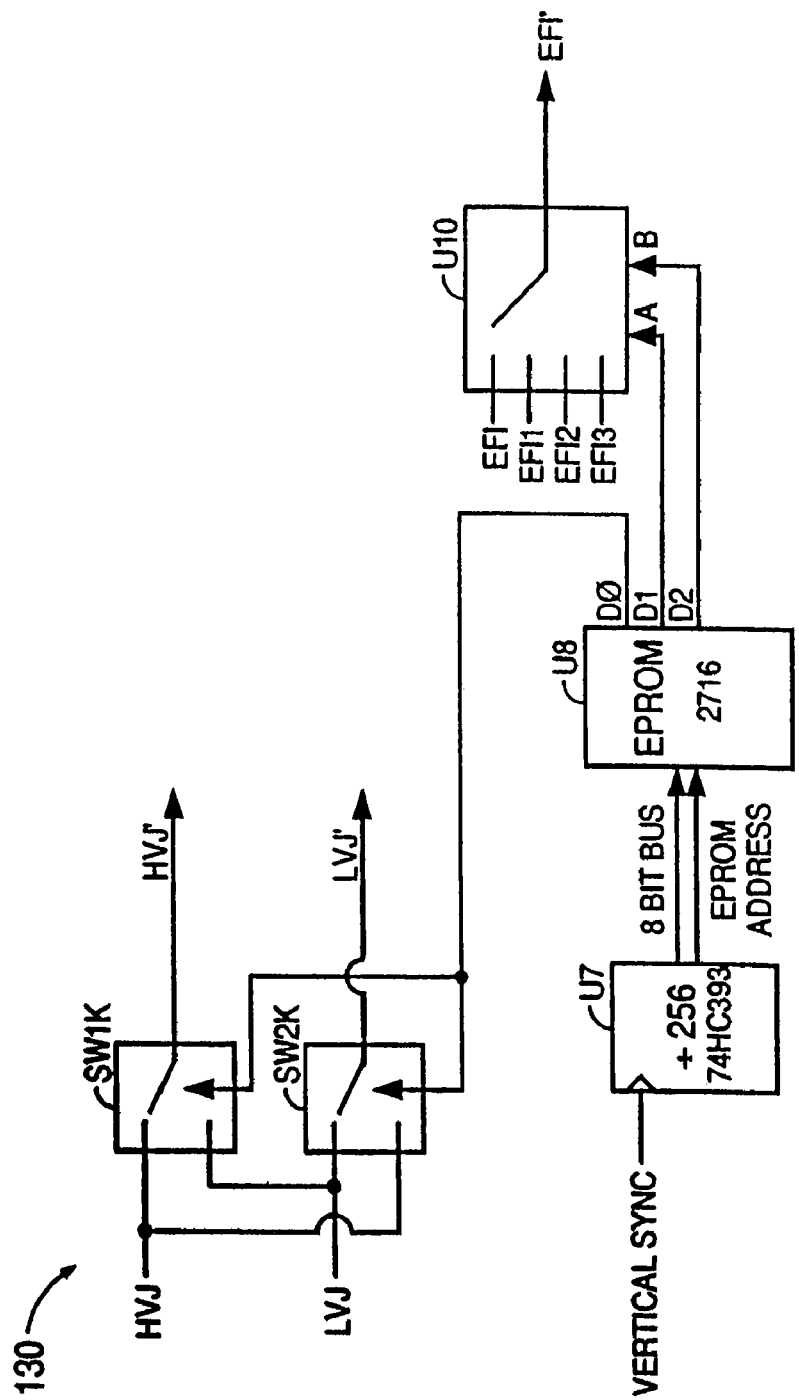
FIG. 8 shows detail of flicker generator of FIG. 6b.

FIG. 8 shows the circuitry of flicker generator 130 of FIG. 6b, and shows that these four pulses are multiplexed via multiplexer U10 (i.e., a CD4052) at a field rate by EPROM U8 (part number 27C16 or 2716). As a result, pseudo-vertical sync pulses occur differently in position depending on the field. In a simple example, EFI, EFI1, EFI2, EFI3 are stepped once per field. As a result, during playback of an unauthorized copy, the pseudo-vertical occur at lines 256 or 259 or 262 or 22 in successive fields or frames. As a result, the picture flickers because of the field rate vertical sync repositioning in the TV or VCR. EPROM U8 provides flexibility as to where the various end of field pulses are to be located as a function of time.

FIG. 8 also shows how the checker pattern black vs. gray rectangles are inverted at some particular multiple of field rate. The vertical sync pulses clock the 8 bit counter U7 (divide by 256, part number 74HC393). The outputs of counter U7 drive the address lines of the EPROM U8. The data output signal DO from EPROM U8 goes high to invert the checker pattern via switches SW1K, SW2K. The flexibility of signal DO from EPROM U8 allows the invert commands on the checker pattern to happen pseudo-randomly or periodically, and also allows different flicker rates (i.e. every 2 fields or every 5 fields, etc.). EPROM U8 data lines $D_1$ and $D_2$ also drive multiplexer switch U10 (part number CD4052), similarly improving flexibility to generate output signal EFI'.

Another Circuit For Generating The Vertical And Horizontal Modifications

In FIG. 6b the end of field and end of line pulses are switched through to override the video driving resistor $R_O$. Unless these switches have a low enough "on" resistance, video from the input program source will always superimpose on top of the end of field or end of line pulses. For example, a typical analog switch on-resistance is about 100 ohms. The typical resistance $R_O$ is about 1000 ohms. With these values, 10% of the video superimposes on the end of line and end of field pulses. If the video goes to peak white, the end of field and end of line pulses will have a minimum of about 10% peak white (100 IRE) or 10 IRE thus rendering these added pulses useless.

To overcome these possible shortcomings, in another embodiment the added pulses are added then switched in via multi-pole switches that at the same time switch out the video source.

Figure 9:
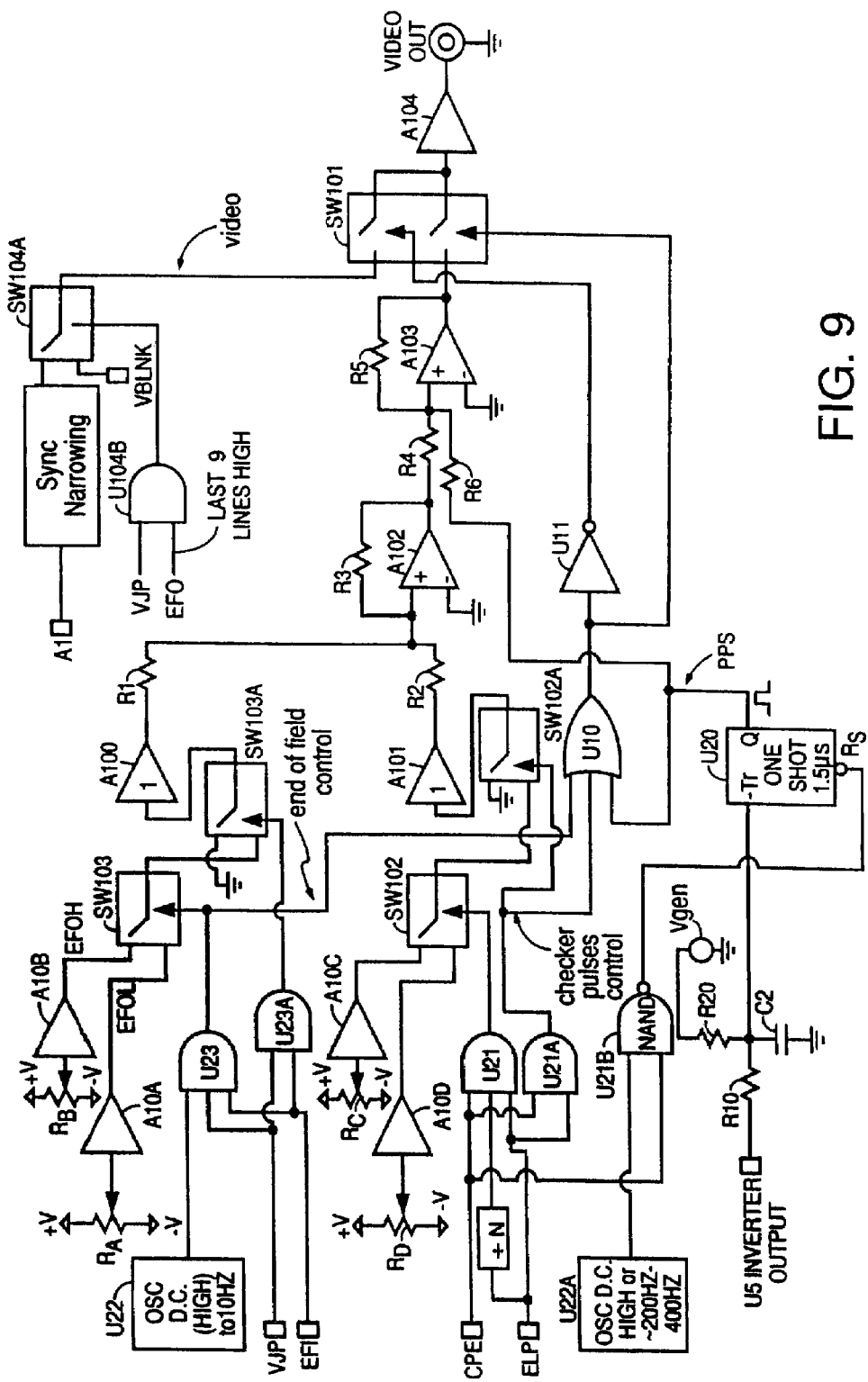
FIG. 9 shows another embodiment of a circuit for providing the video signal modifications.

As shown in FIG. 9, the end of field high and low states are generated by AND gate U23 with input from oscillator U22 (a 0.1 Hz to 10 Hz oscillator) and input signals VJP and EFI. Switch SW103 switches between the high and low states controlled by variable resistors $R_B$ and $R_A$ respectively. Amplifiers A10A, A10B are unity gain buffer amplifiers. To ensure against crosstalk of low states of EOF and checker pulses, switch SW103A is connected between switch SW103 and amplifier A100, and switch SW102A is connected between switch SW102 and amplifier A101. Gate U23A "and" gates switch SW103A to go to ground on all lines other than the EOF line locations. Likewise, gate U21A gates switch SW102A to ground at all times other than when the checker pulses are on. Otherwise, switches SW103A and SW102A are transparent to the EOF and checker pulses of switches SW103 and SW102, respectively. The output of switch SW103 is buffered by unity gain buffer amplifier A100 and summed into a summing amplifier A102. Similarly, switch SW102 receives the end of line high, low states generated via signal ELP, counter U20 (a divide by n counter), and signal CPE.

Variable resistors Rc and RD provide adjustment for high and low end of line pulses respectively. Amplifier A101 buffers switch SW102 into summing amplifier A102 via resistor R2. Amplifier A102 feeds summing amplifier A103. The post pseudo-sync pulse (PPS) is also summed into summing amplifier A103. The output of summing amplifier A103 is then: end of line pulses, end of field pulses and post pseudo-sync pulse (PPS). Switch SW101 switches in all of these pulses via OR gate U10 and inverter U11 during their coincident times, and switches in video at all other times. Amplifier A104 buffers output of switch SW10 and provide a video output "Video Out" containing video with the added pulses. Switch SW104A preblanks to video from the sync narrowing circuit to a voltage level VBLNK (i.e. 0 IRE) for the last active 9 lines of each TV field via "AND" gate U104B. Gate U104B has EPROM data output EFO (which turns high during the last 9 lines of the TV field) and VJP (active horizontal line pulse) at its two inputs.

A position modulation source for the PPS is controlled by voltage source Vgen. Source Vgen feeds resistor R20 with an inverted burst gate pulse into resistor R10 and capacitor C2 to form a variable delay into one shot U20. One shot U20 is approximately 1.5 μsec of variable position after burst of input video, and is gated out during the vertical blanking interval by signal CPE and NAND gate U21B. Resistor R6 determines the amplitude of the PPS. Resistor R6 is typically set to −10 IRE to −20 IRE. The other input (U22A) of "NAND" gate U21 is normally high as to all PPS to be a constant amplitude pulse position sync. If U22A is pulsing (i.e., 300 Hz), the PPS signal is then turning on and off as well (at 300 Hz). Thus, the PPS can be a position modulated pulse, and pulse amplitude modulated sync pulse following burst.

Horizontal Sync Pulse Narrowing Modification

A sync pulse narrowing circuit and method for enhanced of an anticopy protection of video signals is used by itself or in cascade (as shown in FIG. 6a block 96) with any of the above-described other signal modification techniques, and as further described below. The reason to narrow the video signal sync (synchronization) pulses (mainly the horizontal sync pulses) is so that when an illegal copy is made, the attenuated video with reduced sync pulse width (duration) causes a playability problem when viewed on a TV set. This is because most TV set sync separators incorporate sync tip DC restoration. Because these TV set sync separators are typically driven by medium impedances, the sync pulses are partly clipped off. By narrowing the sync pulses, the sync pulses are even further clipped off. When an unauthorized copy is made of the video signal, especially with the above-described checker and/or end of field modification signal, the copy has a reduced amplitude video with reduced sync pulse width. As a result, the TV sync separator sees a severe loss in sync due to its own clipping from the narrowed sync width and the attenuation of the video itself. Thus, the TV set's sync separator does not "extract" sync properly and this causes the TV picture to be even less viewable, because the horizontal and/or vertical modification effects are more intense.

Figure 10:
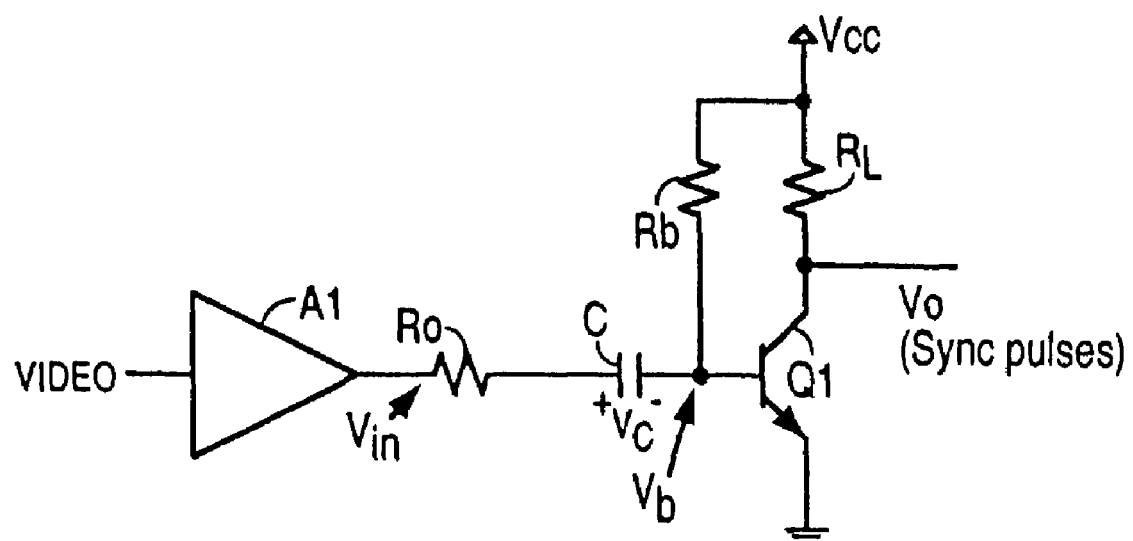
FIG. 10 shows a prior art sync separator circuit.

FIG. 10 shows a typical prior art sync separator as used in many TV sets. This circuit operates when the inverted video is fed to the base of the transistor Q1 via a coupling capacitor C. The sync tips of the video signal charge up the capacitor C, just enough so that only the very tip of the sync pulses turn on the transistor. Resistor $R_b$ biases the transistor so that the tips of sync are "sliced". The voltage Vc across C, is related to resistance $R_o$ the driving resistance of the video. The larger resistance $R_o$, the more the amount of sync clipping is seen at $V_b$. If resistance $R_o$ is too large, the transistor Q1 will start sync slicing into the video (blanking level) region, because the value of $V_c$ is not charged up to an average level to allow a cut off of the transistor just below the sync tip level of inverted video.

Insufficient charging of capacitor C allows transistor Q1 to be turned on even when blanking level arrives. The base emitter impedance of transistor Q1 is low when transistor Q1 is on. (This causes attenuation of the positive going sync pulses). Since charging capacitor C is a function of the sync pulses' width, narrowing the sync pulses makes the sync separator clip a portion of the narrowed sync more than a normal sync width. This is equivalent to sync slicing at a point closer to the video signal (i.e. video blanking level). Under normal video levels a narrowed sync pulse presents no playability problems on a VCR or TV. But when a narrowed sync pulse is recorded on an illegal copy of a copy protected cassette, the video signal is attenuated. This attenuation with the narrowed sync causes the TV (during playback viewing) to not reliably extract the sync pulses and instead synchronize off parts of the video signal, i.e. blanking level.

Selectively narrowing certain horizontal sync pulses to close to zero pulsewidth (to less than 600 ns duration) so that the filter in a TV or VCR sync separator does not respond or that the sync separator coupling capacitor charges up negligibly is equivalent to there being no sync pulse in that area. These selected horizontal sync narrowed pulses near the end of the field can create a situation such that the sync separator will slice a blanked video line as a new (spurious) vertical pulse during playback. With a video signal from an illegal copy with attenuated video supplied to the TV, this situation then causes the VCR or TV to see two vertical pulses in one field, which can cause vertical jitter.

In one embodiment, the pulsation (modulation) frequencies of the end of the video field lines (those end of field lines having an amplitude 0 IRE to at least 10 IRE having narrowed horizontal sync pulses) are swept from about 1 Hz to 15 Hz. This advantageously causes the desired effect in a wide variety of TV sets.

Figure 11A:
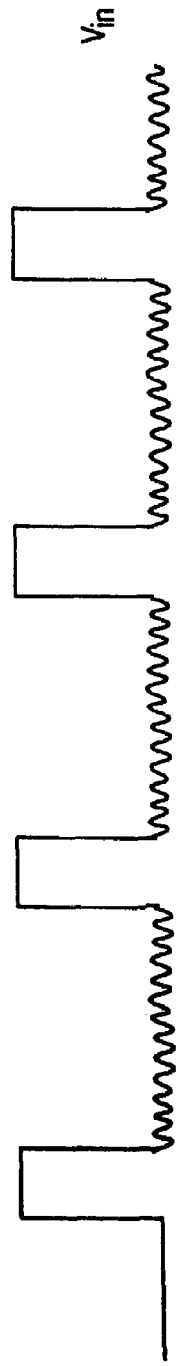
FIGS. 11a to 11o show video waveforms illustrating horizontal sync pulse narrowing.
Figure 11B:
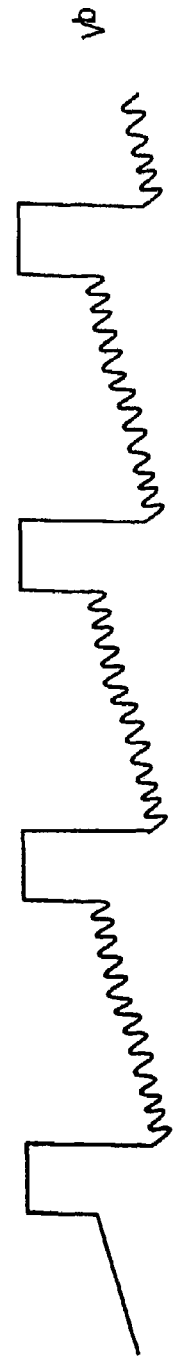

FIG. 11a shows a video signal waveform (Vin); this is inverted the video into the TV sync separator circuit in FIG. 10, and is coupled to resistor $R_o$ (where $R_o \approx 0$) of FIG. 10. FIG. 11b shows the effect of the coupling capacitor and resistor $R_b$. Note at Vb the video signal is ramping up towards the sync tip level. (This is a result of the RC time constant of resistor Rb and capacitor C since Rb>>Ro.)

Figure 11C:
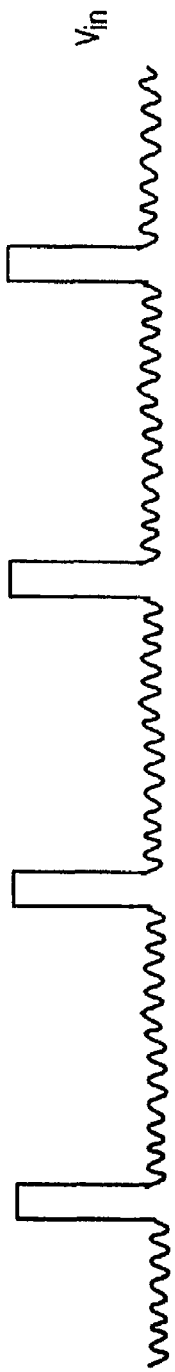
Figure 11D:
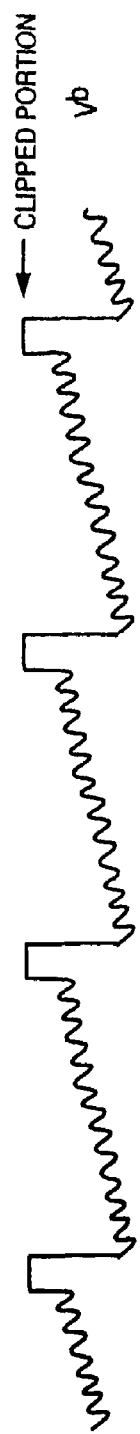

FIG. 11c shows narrowed horizontal sync pulses. The action of resistor $R_o$ (where $R_o$ now is medium resistance i.e. 200 to 1500 ohms), capacitor C, resistor $R_b$ and transistor Q1 cause clipping action of the narrowed sync tip. Because the sync widths are narrower, capacitor C is not charged up sufficiently and causes more sync clipping. Recall that the charging of capacitor C is related to both the amplitude of the sync pulse and its pulse width, i.e. Vc is proportional to (sync pulse width) multiplied by (sync amplitude). The lower the voltage Vc the more the sync clipping action. FIG. 11d shows this result at point in FIG. 10 Vb.

Figure 11E:
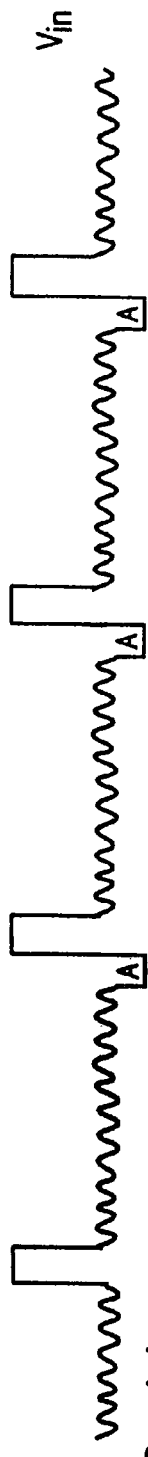
Figure 11F:
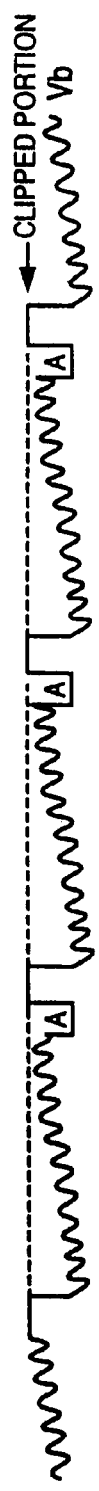

FIG. 11e shows an attenuated video source signal from an illegal copy with narrowed sync pulses where "A" indicates the presence of the checker pulses. The sync separator responds by clipping the sync pulses completely and as a result, parts of the video toward the end of line are interpreted as new sync pulses. FIG. 11f shows this. The sync separator (inverter) transistor Q1 turns on during the clipped portion of video.

Figure 11G:
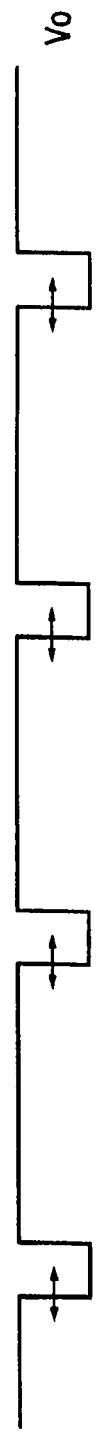

FIG. 11g shows that by slicing parts of the video, the leading edge of sync is rendered unstable. This leading edge instability of the sync separator causes the TV to display an unstable image (i.e., shaking side to side). As shown by the arrows, the resulting unstable horizontal sync pulses are caused by sync narrowing or checker pulses.

Figure 11H:

FIG. 11h shows what the output of the TV sync separator would have been for FIG. 11d, which is a full level TV signal with narrowed sync. Thus the signal of FIG. 11d poses no playability problems to a TV set. Only when the signal of FIG. 11d is added to a copy protection signal and an illegal copy is made do playability problems become evident on the TV set, because the illegal copy results in an attenuated signal.

FIG. 11i shows with a full unattenuated TV signal that if selected lines near the end of a video field or after the vertical sync pulses (i.e. NTSC lines 256-259, lines 10-12) are narrowed with varying amplitude (i.e. switching from about blanking level to about 10-100 IRE), the sync separator transistor Q1 will start ramping up to slice into the picture area, i.e. "ZZ" of FIG. 11j. This causes a wider pulse in the "ZZ" area, but not wide enough to cause a vertical sync pulse.

FIG. 11k shows the sync separator output of the waveform of FIG. 11j. If this waveform is to be accompanied by anti-copy protection signals, the illegal copy will provide an attenuated signal to the TV sync separator as in FIG. 11l. FIG. 11l is an attenuated TV signal due to illegal copying with narrowed syncs accompanying the end of field lines.

Figure 11M:
Figure 11N:
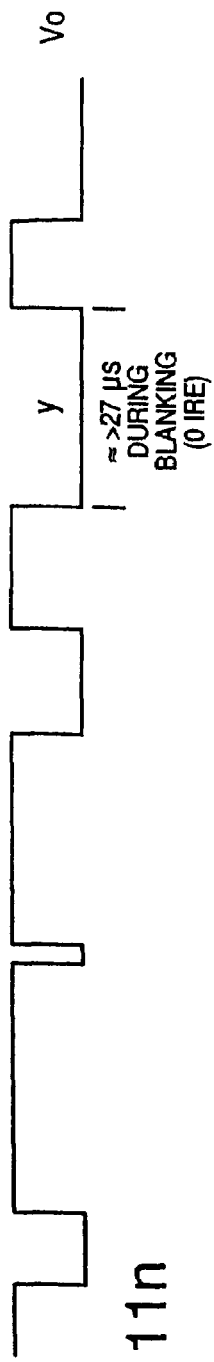

FIG. 11m shows the ramping action at point $V_b$ via resistor Rb and capacitor C. The corresponding output of the sync separator shows at "y" a new (spurious) broad (vertical sync) pulse. This new pseudo-vertical sync pulse has been created when the narrowed horizontal sync pulses are with the end of field lines at blanking level. When the narrowed horizontal sync pulses are accompanied with 10 to 100 IRE, the TV sync separator only outputs narrow horizontal rate sync pulses, and no new broad pulses. This is because the 10 to 100 IRE levels are ignored entirely by the sync separator. By the switching in and out of blanking and greater than 10 IRE unit signals, the sync separator sees normal vertical sync sometimes followed by a spurious early or late vertical sync pulse (see FIG. 11n). These spurious early and/or late vertical pulses then cause the TV to jitter up and down when playing back an illegal copy.

In some cases to get the same effect as above one can:

Narrow selected sync pulses to about zero, i.e. eliminate horizontal sync pulse so as to make TV sync separator to make spurious vertical sync pulse.

Reposition a few sync pulses with greater than 63.5 μs periods to cause the sync separator to malfunction and make a new spurious vertical sync pulse. This causes the ramping action of some sync separators to cause spurious vertical pulses.

Figure 11O:

FIG. 11o shows a video signal which is free of spurious vertical sync pulses due to a video signal being above blanking, i.e. greater than about 10 IRE units in the area of the narrowed pulses. Thus if the level of the video signal is high enough relative to blanking level, the presence of narrowed horizontal sync pulses fails to generate a spurious vertical sync pulse.

Figure 12A:
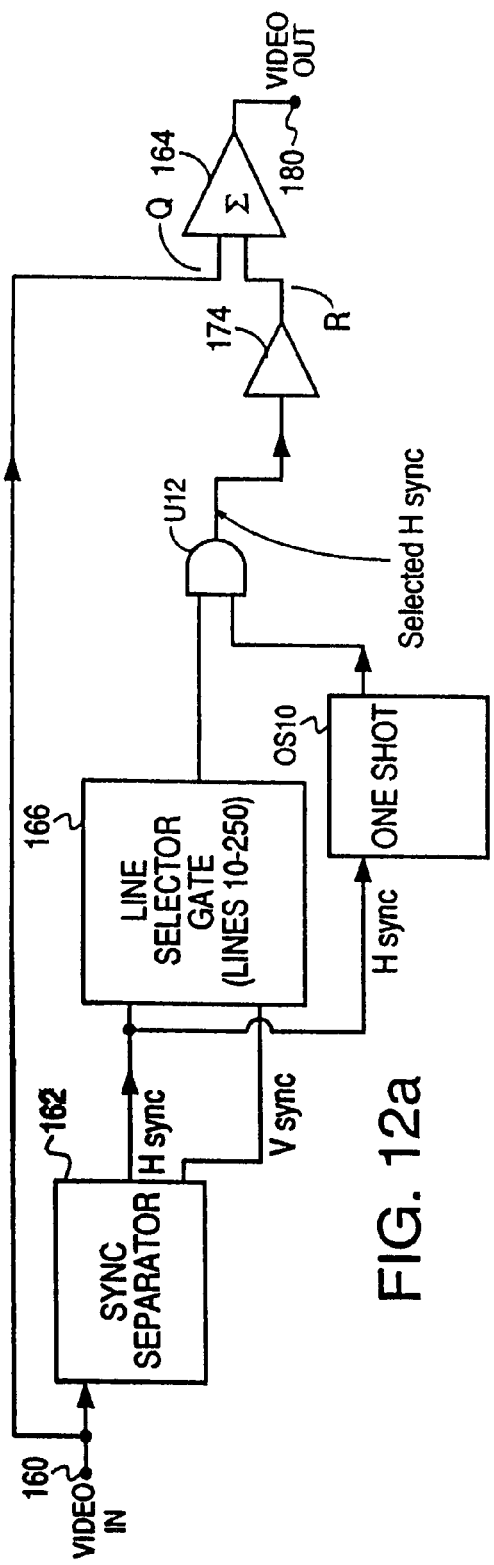
FIG. 12a shows a block diagram of a circuit for horizontal sync pulse narrowing.

As shown in the sync pulse narrowing circuit of FIG. 12a, the video input signal (possibly already carrying the basic copy protection pulses) is input to terminal 160 where it is supplied to sync separator 162 and also to video adder 164. Sync separator 162 outputs separated horizontal sync (H sync) and vertical sync signals to line selector gate 166 which selects for instance lines 10 to 250 of each video field. The separated H sync pulses are also provided to one-shot circuit OS10 which in response outputs a signal of about 2 µs duration to AND gate U12, the other input of which is a line select signal indicating selected lines 10 to 250 from gate 166. In response, AND gate U12 outputs a signal representing a portion of H sync on each of these lines 10 to 250, which is scaled by amplifier 174. The output of scaling amplifier 174 is summed back into the original video signal at adder 164, the output of which is supplied to video out terminal 180.

Figure 12B:
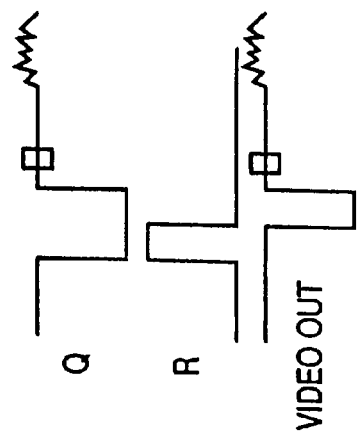

FIG. 12b shows a representation of the waveform at point Q of FIG. 12a (the conventional H sync signal with color burst), and the signal at R which is the output of scaling amplifier 174. The summed result of Q and R ("video out" at lower part of FIG. 12b) is seen at the video out terminal 180, which is a shortened H sync pulse with color burst.

Figure 13A:
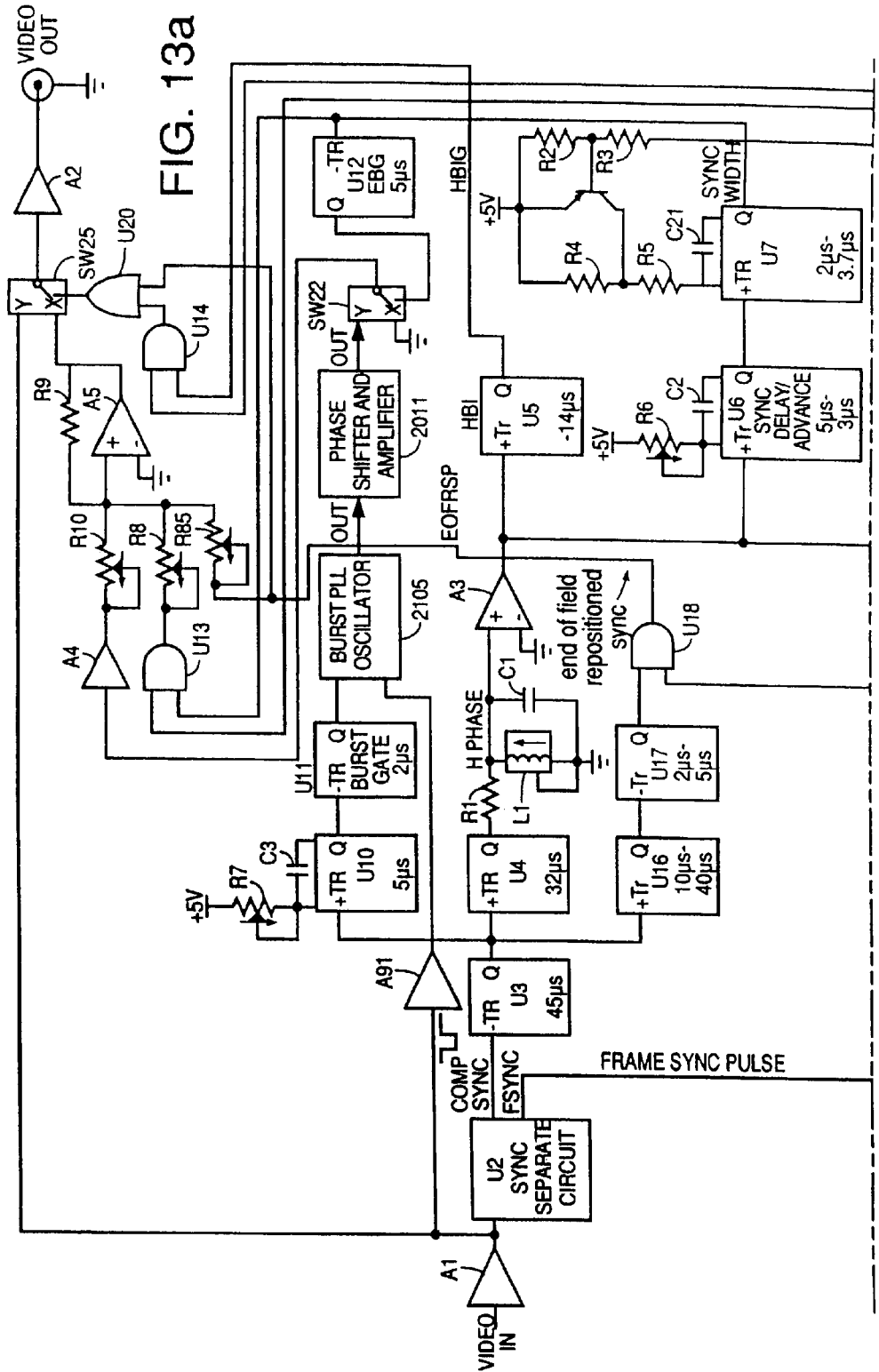
FIGS. 13a, 13b show in detail a circuit for horizontal sync pulse narrowing.
Figure 13B:
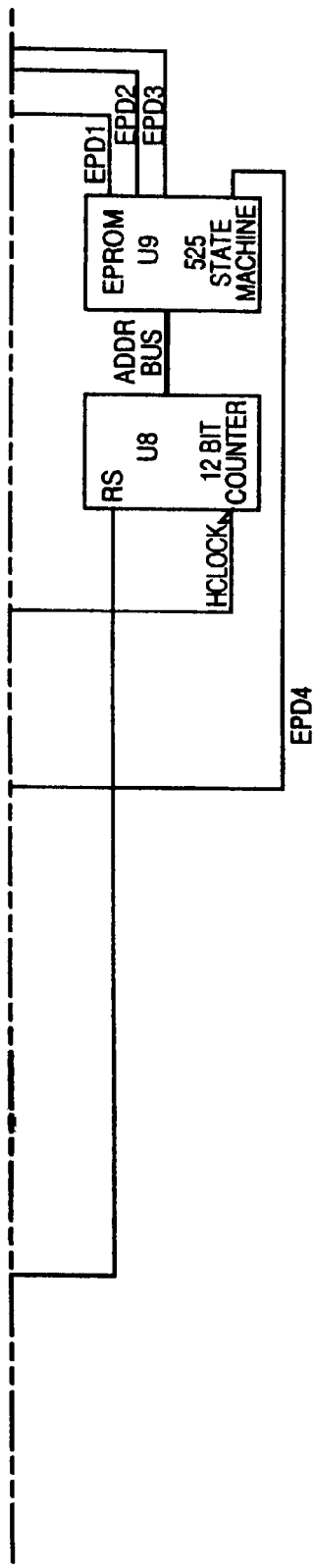

Another circuit to perform sync narrowing with extended color burst envelope (extended burst is necessary to ensure color lock for TV sets if narrowed H syncs cause a color lock problem) is described hereinafter. FIG. 13a, 13b show a circuit for introducing narrowed horizontal sync pulses throughout the active video field. Within this active field, an EPROM data output determines which lines get narrowed further. For example, this EPROM output (EPD1) can allow for lines 20-250 to have a 3.7 µs sync replaced pulse width, while lines 251-262 have a 2.0 µs sync replaced pulse width. Other combinations are possible dependent on programming EPD1 in EPROM U9. Also, another output from EPROM U9 can cause sync suppression in lines (i.e., lines 255 and/or 257) or so, before the location of the EOF pulses (this is done via AND gate U10 and EPD2 from EPROM U9). Repositioned horizontal sync narrowed sync is also possible after sync suppression in normal HBI is done.

Input video carrying any combinations of: the basic anticopy process, end of field pulses, and checker process or normal RS170 type video is DC sync restored by video amplifier A1 to OV (equal to blanking level). Amplifier A1 outputs into sync separator circuit U2 which in turn outputs composite sync and a vertical pulse between 11 µs and 20 µs. To generate a burst gate to lock input video's burst to circuit 2015, care must be taken not to generate a burst gate pulse when pseudo sync pulses are present (i.e., if input video has the basic anticopy process). Thus, one shot U3 takes composite (and pseudo) sync and one shots a non-retriggerable pulse of about 45 µs, long enough to ignore equalizing and vertical 2H pulses in the vertical blanking interval and also the pseudo sync pulses that may be present (usually in the first 32 µs of the TV lines 10-20). One shot U10 delays the leading edge of input video sync by 5 µs and triggers one shot U11, a 2 µs one shot to be coincident with the input video's color burst.

Amplifier A1 drive a chroma bandpass filter amplifier A91 to input into burst phaselock loop circuit 2105. The output of PLL circuit 2105 is now a continuous wave subcarrier locked in phase with the input video's color burst. PLL Circuit 2011 adjusts the regenerated subcarrier phase to be correct at amplifier A5 output. Frame sync pulse from sync separator U2 resets address counter U8 for EPROM U9. Counter U8 is incremented by a horizontal rate pulse from amplifier A3. EPROM U9 outputs each data line that contain particular TV lines high or low in the active field.

One of the advantages of the circuit of FIGS. 13a and 13b is that the regenerated narrowed sync can be placed anywhere in the horizontal blanking interval (HBI). This becomes advantageous especially if the new narrowed sync can start 1 µs in advance (before) input video's horizontal sync. With a 1 µs advance in new narrowed horizontal sync and the PPS pulse, the horizontal instability with an illegal copy having the basic anticopy process results in 1 µs more in horizontal jitter. By advancing the narrowed H sync pulse, a greater time distance exists between the narrowed H sync pulse and the PPS, yielding proportionally greater instability when an illegal copy is played back.

To generate an advance narrowed H sync, the output of one shot U2 is a 45 µs pulse coincident with the leading edge of input sync is "squared" up via 32 µs one shot U4. The filter including components R1, L1 and C1 bandpass filters the output of one shot U4 into a 15.734 KHz sine wave.

By adjusting inductor L1, a sinewave in advance (or behind) of input video's H sync is produced. Comparator A3 converts this sinewave into pulses whose edges are leading or lagging the video input's leading sync edge. The "tracking" ability of filter R1, L1, C1 (with a Q of 4) to generate waveforms synchronous to the input video is, in general, better than most horizontal PLL's when the video input is from a VCR. The output of amplifier A3 then goes to 14 µs one shot U5, to generate an HBI gate signal to replace old (input) sync and burst with new narrowed sync and extended burst.

One shot U6 sets a nominal narrowed sync delay of 0.5 µs from the beginning of the input video HBI (of one shot U5's leading edge) and one shot U7 triggers off a new narrowed sync pulse. Components R2, R3 and Q1 form a switch to narrow the pulse further by shorting out transistor Q1 (emitter to collector) and via command of EPD1 (i.e., for lines 251-262 each field EPD1 is low, and high elsewhere). The output of one shot U7 is then pulses of 3.7 µs from lines 20 to 250 and pulses of 2 µs from 251 to 262. Triggering off the trailing edge of one shot U7 is one shot U12, the output of which is the extended burst gate which (about 5.5 µs pulse width).

The output of one shot U12 gates a color burst from circuit 2011 via switch SW22, and the band pass filter (3.58 Mhz) amplifier A4 shapes the extended burst envelope from switch SW22 output and couples to summing amplifier A5, via extended burst amplitude adjustment resistor R10. Narrowed H sync from one shot U7 is "anded" via gate U13 with signal EPD2 which is generally high, except for the few lines on which narrowed sync is to be suppressed, which enhances the end of field pulses. The output of gate U13 sums into amplifier A5 via narrowed sync amplitude control resistor R8. The output amplifier of A5 is then narrowed sync plus extended color burst. Switch SW25 switches the output of amplifier A5 via AND gate U14 through OR gate U20, which switches amplifier A5 output during the HBI via one shot U5 output and EPD3, (active field location pulses i.e., lines 20-262).

Buffer amplifier A22 then outputs video from input with new narrowed H sync and extended color burst. To gate in a repositioned sync pulse (EOFRSP) in the end of field location, one shot U16 is 10 µs to 40 µs in length from the leading sync edge of input video. Gate U16 couples to gate U17 a 2 µs to 4 µs wide pulse that is delayed about 10 µs to 40 µs from the input video's leading sync edge. The output of gate U16 is enabled via AND gate U18 and EPD4 from EPROM U9.

Signal EPD4 is then high at certain lines at the end of the field after sync suppression is activated via EPD2. Gate U16 drives summing amplifier A5 via EOFRSP amplitude adjustment resistor R85. Gate U16 also turns switch SW25 on during activation of EOFRSP through OR gate U20 to insert the repositioned sync pulse (EOFRSP). Thus the output of amplifier A2 has input video, narrowed sync and possibly 1 or 2 lines of suppressed sync (no sync) or/and a few lines of repositioned narrowed H-sync.

The sync pulse narrowing is effective even if not all horizontal sync pulses in a video signal are so narrowed. It has been determined that even a relatively small number of narrowed horizontal sync pulses provide a spurious vertical retrace. For instance, three to six consecutive video lines with a narrowed horizontal sync pulse are adequate for this purpose. It is preferred to group together the narrowed horizontal sync pulses in consecutive (or at least relatively close together) lines to generate the spurious vertical retrace.

Other circuitry for sync pulse narrowing, in the context of removal of copy-protection signals, is disclosed in U.S. Pat. No. 5,157,510, Ron Quan et al., and U.S. Pat. No. 5,194,965, Ron Quan et al., both incorporated by reference.

Figure 14A:
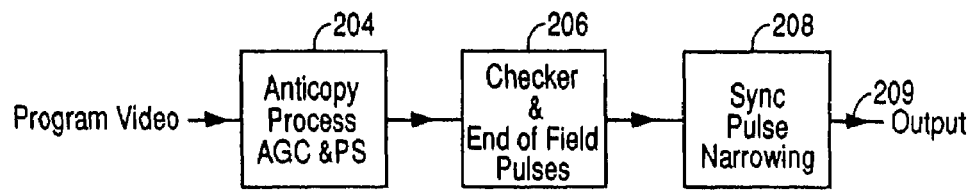
FIGS. 14a, 14b, show block diagrams of apparatuses for combining sync pulse narrowing with the horizontal and vertical modifications.
Figure 14B:
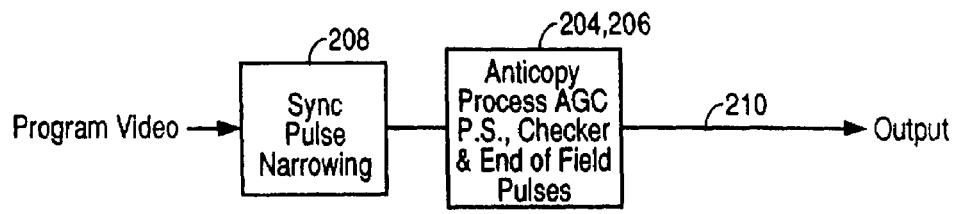

FIGS. 14a and 14b show block diagrams of two apparatuses for combining the above described sync pulse narrowing with the earlier described prior art copy protection process and horizontal and vertical signal modifications.

FIG. 14a shows the first such apparatus, with program video supplied to circuitry block 204, for adding the prior art copy protection signals including the added AGC and pseudo-sync pulses. The next block 206 (shown in detail in FIG. 6a) adds (1) the checker pattern and (2) the vertical rate signal modifications to the end of each of selected fields. Then the sync pulse narrowing circuitry block 208 (shown in varying detail in FIGS. 12a and FIGS. 13a and 13b) further modifies the video signal, which is output at terminal 209, for instance, to a master duplicator VCR in a video cassette duplication facility. It has also been observed that the prior art basic anticopy process was improved by just adding in conjunction the sync narrowing process.

Alternatively, in FIG. 14b the input program video signal is first subject to the sync pulse narrowing circuitry block 208, and to the copy protect and checker pattern and vertical rate signal modification circuitry blocks 204, 206 (shown here combined into one block) and hence supplied to output terminal 210.

It is to be understood that other apparatuses may also provide the disclosed video signal modifications, i.e. the checker pattern, end of field vertical pattern, sync narrowing, and equivalents thereof.

Method and Circuit for Removal of Video Copy Protection Signal Modifications

Given an anticopy process signal including at least AGC and pseudo-sync pulses as described above and/or sync narrowing, and/or end of line "checker" pulses, and/or end of field pseudo-vertical sync pulses, a method and circuit for defeating these is described hereinafter.

For the AGC and pseudo-sync pulses, Ryan, U.S. Pat. No. 4,695,901 and Quan U.S. Pat. No. 5,157,510 both incorporated by reference, disclose methods and apparatus for defeating (removal or attenuation of) these added pulses. Ryan, U.S. Pat. No. 4,695,901 discloses only the removal or attenuation of pseudo-sync and AGC pulses, and does not disclose the defeat of sync pulse narrowing, end of field pseudo vertical sync pulses, or end of line (checker) pulses. Processing amplifiers as are well known in the art can remove sync pulse narrowing with regenerated sync, but processing amplifiers do not defeat the end of line checker pulses or end of field pseudo-vertical sync pulses.

It is not taught in the prior art how to defeat these copy protection vertical and checker signals. Merely blanking them out can still cause residual anticopy signal enhancements to survive when an illegal copy is made. The reason is that blanking these signals to blanking level alone in the presence of pseudo-sync and AGC pulses will cause an attenuated video signal to be input into a TV set when an illegal copy is made. This attenuated signal then has, for instance, end of field lines at blanking level and can cause pseudo-vertical sync pulses in this situation. This is true especially if narrowed horizontal sync pulses are still present.

On the other hand, if only the narrowed sync pulses are restored to normal sync width, the other two copy protection enhancement signals (checker and vertical) are still effective.

Thus the following methods defeat the above disclosed anticopy process enhancements:

1) The end of line (checker modification) copy protection signals are replaced with a signal at least about 20% of peak white, or a level shifting signal of at least 20% of peak white is added to the end of line signal. The signal replacement or adding may be to a portion of the checker signal so as to defeat the process. By "portion" is meant the part of the end of line pulse to be "neutralized" or part of all the lines of video that has the end of line pulses.

2) The end of field (vertical) copy protection pulses are replaced with a signal that is at least about 20% of peak white for a period of at least around 32 μsec per line; alternatively a level shifting signal of at least about 20% of peak white is added to the vertical pulses for at least around 32 μsec on enough lines (i.e. 7 of 9, 5 of 7, 2 of 3) to defeat the anticopy process.

It is to be understood that the 20% of peak white level referred to here with respect to the vertical and checker pulses has been experimentally determined to be a typical minimum value needed to produce the intended effect of defeating the video signal enhancements, and that a higher level signal (such as 30% or more) would accomplish the purpose even more thoroughly.

3) Most (50% or more) of the narrowed horizontal sync pulses are widened so as to defeat the sync narrowing process, i.e. if sync is narrowed to 3.0 μsec, a widened sync pulse to 4.0 μsec may be adequate to defeat the sync narrowing process, and without the need to replace the narrowed sync with RS170 standard horizontal sync pulses. (Note that 4.7 μsec is specified as the horizontal sync pulse width for the RS170 standard.)

4) A widened sync pulse width encroaching into the end of line (checker) pulses can be used to defeat both the checker and sync narrowing processes. Care must take to assure that the flyback pulse of the TV set still triggers color burst, because widening the sync pulse to include part of the checker pulses can cause the TV set's flyback pulse to trigger prematurely.

5) A horizontal sync and colorburst with adequate sync and burst width repositioned into the checker pulses can defeat both the sync narrowing and the checker processes, without causing the TV set's flyback signal to trigger incorrectly the TV set's color burst signal.

The vertical pulses will have the effect of vertical sync signals on a TV set if reduced video amplitude is present. Most TV sets or VCRs need about 30 μs to trigger the vertical sync filter to output a vertical pulse. Thus, by modifying the vertical pulses such that even if residual pseudo-vertical pulses are of less duration than for instance 20 μs, then no pseudo-vertical sync pulses are output from the vertical sync filter.

Sufficient defeat of the checker pulses results if the "low" state of the checker pulse is shortened so as to cause a narrowed horizontal sync pulse not to be detected by the TV set's or VCR's sync separator. This avoids the effect of the checker pattern when playing back in an illegal copy.

Figure 15:
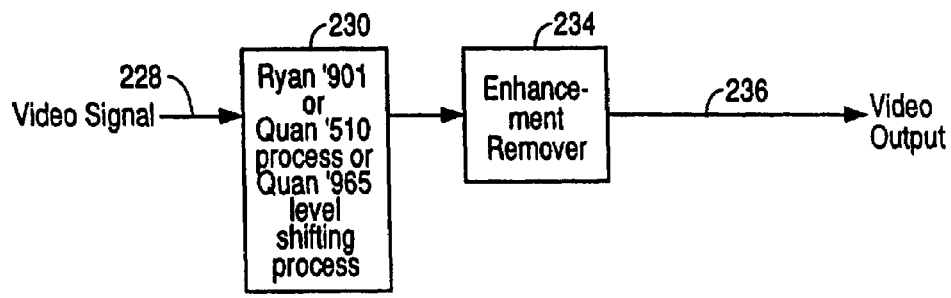
FIG. 15 shows in block diagram form an apparatus for removal of the various video signal modifications.

FIG. 15 shows a two step circuit and method for removing all the above-described anticopy protection signals. A video signal containing AGC, pseudo-sync, checker, vertical pulses, and narrowed horizontal-sync pulses is first input on terminal 228 into the circuitry 230 as disclosed in Ryan, U.S. Pat. No. 4,695,901 or Quan, U.S. Pat. No. 5,157,510 to defeat the effects of the AGC pulses and pseudo-sync pulses. Second, the output signal from circuitry 230 is input into the enhancement remover 234 which defeats the checker and vertical pulses, and also defeats sync narrowing and any residual AGC pulse or pseudo-sync pulses in the horizontal blanking interval. The video and signal at terminal 236 is thus free of all effects of copy protection signals.

In this embodiment, the checker and vertical pulses are defeated (ideally) by replacing these pulses with pulses having an amplitude of about 20% of peak white pulses, or by adding a level shifting signal having an amplitude of about 20% of peak white. The checker pulses can also be defeated by substituting in a wide horizontal sync signal, thereby replacing the checker pulses. This defeats the checker pulses and widens the horizontal sync pulse to defeat the sync narrowing process. Finally, if the HBI (horizontal blanking interval) is replaced by new horizontal sync and color burst, then the sync narrowing and any AGC pulse and/or pseudo-sync pulse in the active field are defeated.

Figure 16:
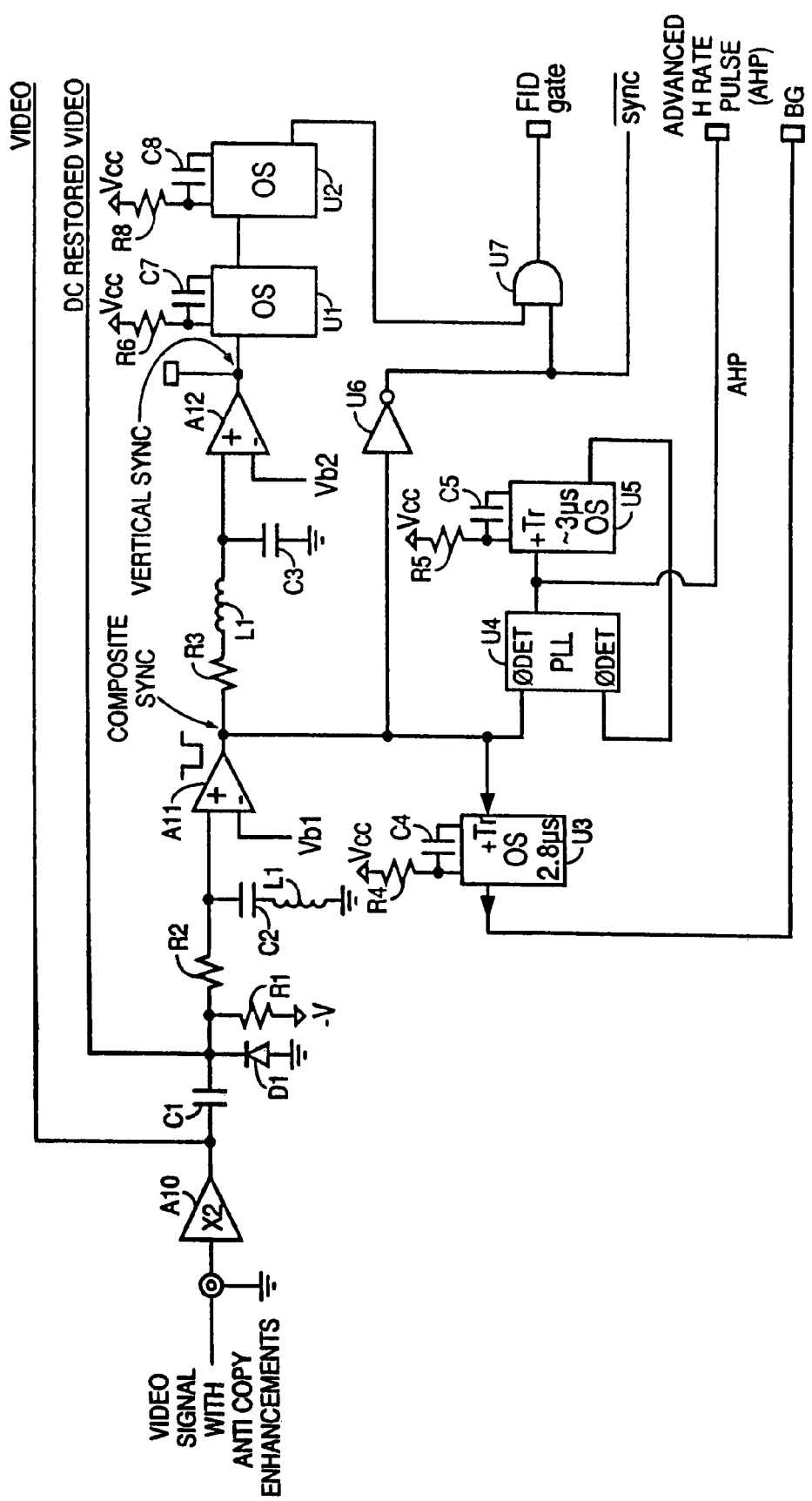
FIGS. 16, 17, 18 show a circuit for removing the anticopy process enhancement signals via level shifting and horizontal sync replacement.

Also in this embodiment, narrowing the black level duration of the checker and vertical pulses results in a viewable copy. Also, any AGC pulses following a normal horizontal sync pulse can be defeated by adding a negative level shifting pulse to counter the elevated color burst (AGC pulse) or by sync and burst replacement. A circuit for accomplishing this is described hereinafter. In FIG. 16, showing details of block 234 of FIG. 15, an enhanced anticopy protected signal is input to amplifier A10 having gain K (i.e. K is equal to 2). The output of amplifier A10 is coupled to capacitor C1, diode D1, and resistor R1, which together are a DC sync restoration circuit. Resistor R2, capacitor C2, and capacitor C1 form a color subcarrier frequency notch filter so that comparator A11 can separate sync properly. Voltage reference Vb1 sets the slice point to cause comparator A101 to function as a sync separator. The output of comparator A11 is then fed to a low pass filter including components resistor R3, inductor L1 and capacitor C3 to recover a vertical rate pulse. Comparator A12 with reference input level $V_{b2}$ is a vertical sync separator.

Because this video signal can be from a VCR, certain sync separators, i.e. the LM 1881, produce incorrect frame pulses with VCR outputs. So to generate a frame pulse, one shot U1 outputs a pulse that ends slightly short of six lines from the beginning of the first vertical sync pulse. One shot U2 outputs pulse having a width of about 25 μs.

Figure 17:
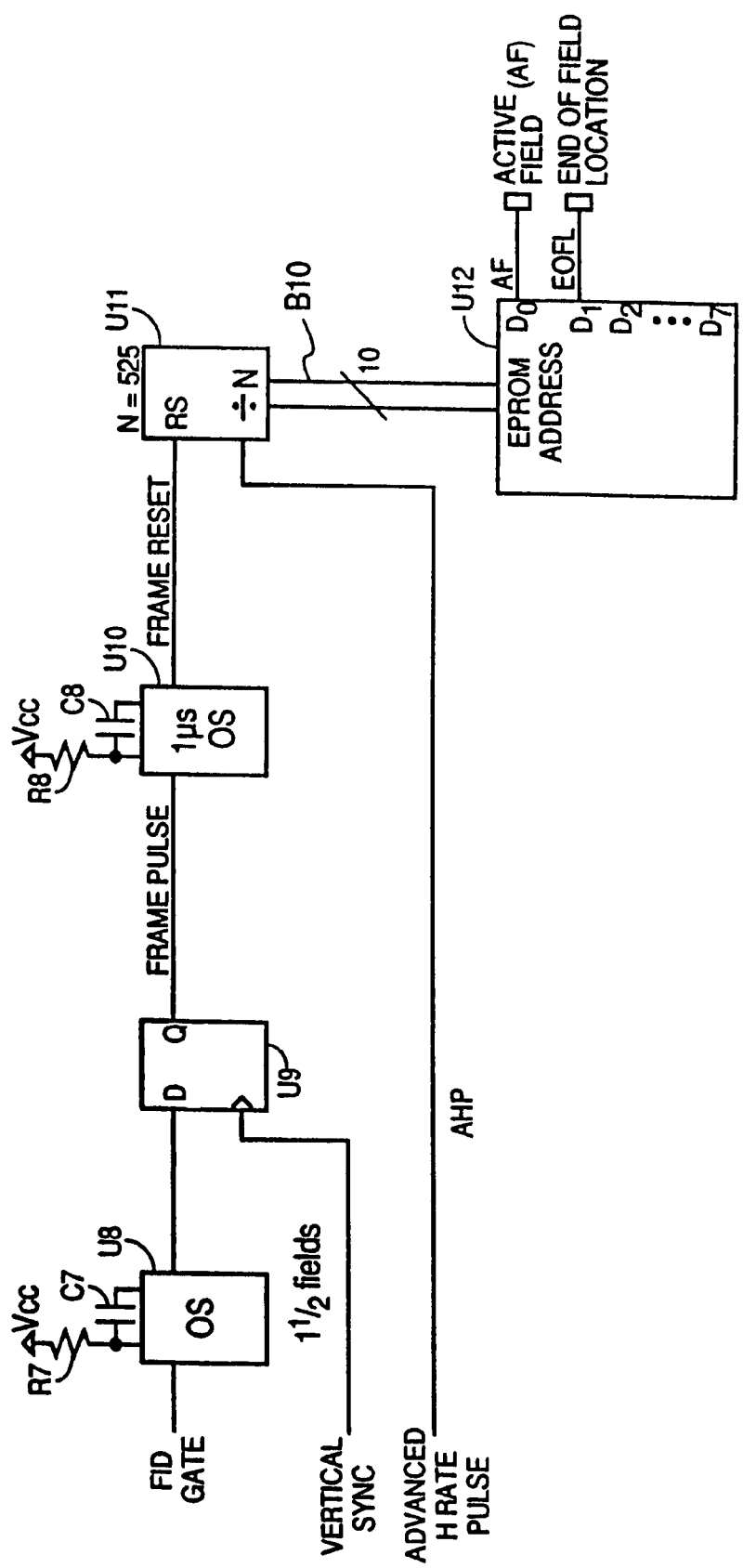

Then AND gate U7 logically "ands" the output of inverter U6 with that of one-shot U2 to generate a pulse occurring every two fields or each frame. Only in one field is output from U2 and U6 high. Gate U7's output is the signal (FID) gate which triggers (see FIG. 17) one shot U8 having a pulse duration of 1½ fields. With D flip flop U9 and with the output of one shot U8 connected to the D input of flip flop U9 and vertical sync as the clock input for flip flop U9, a frame rate square wave is produced with its rising and falling edges coincident with the first vertical sync (broad) pulse of the incoming video signal. One shot U10 with counter circuit U11 and horizontal rate pulse from horizontal PLL U4 generates signals on a 10 bit address bus B10 that counts 525 states. EPROM U12 is addressed by 10 bit bus B10, and dependent on how EPROM U12 is programmed, EPROM U12's output lines carry the following signals:

1) Active field location (AF) (high states from line 22 to line 262).

2) End of field location (EOFL) (high states from line 254 to 262).

In FIG. 16, PLL circuit U4 and one shot U5 are a horizontal rate PLL circuit such that PLL circuit U4's output is in advance of the leading edge of video horizontal sync by about 3 μs. This is done by one shot U5, which delays PLL U4's output by about 3 μs. The output of one shot U5 is fed back to a phase detector input of PLL U4. Since the edges of both detector inputs of PLL U4 must match, PLL U4's output must then be in advance of the leading sync edge amplifier (comparator) A101. PLL U4 also ignores any pulses other than horizontal rate. Thus vertical pulses and others are ignored by PLL U4.

Furthermore, one shot U3 develops a burst gate pulse (BG) of incoming video by timing off the trailing edge of sync from comparator A11.

Figure 18:
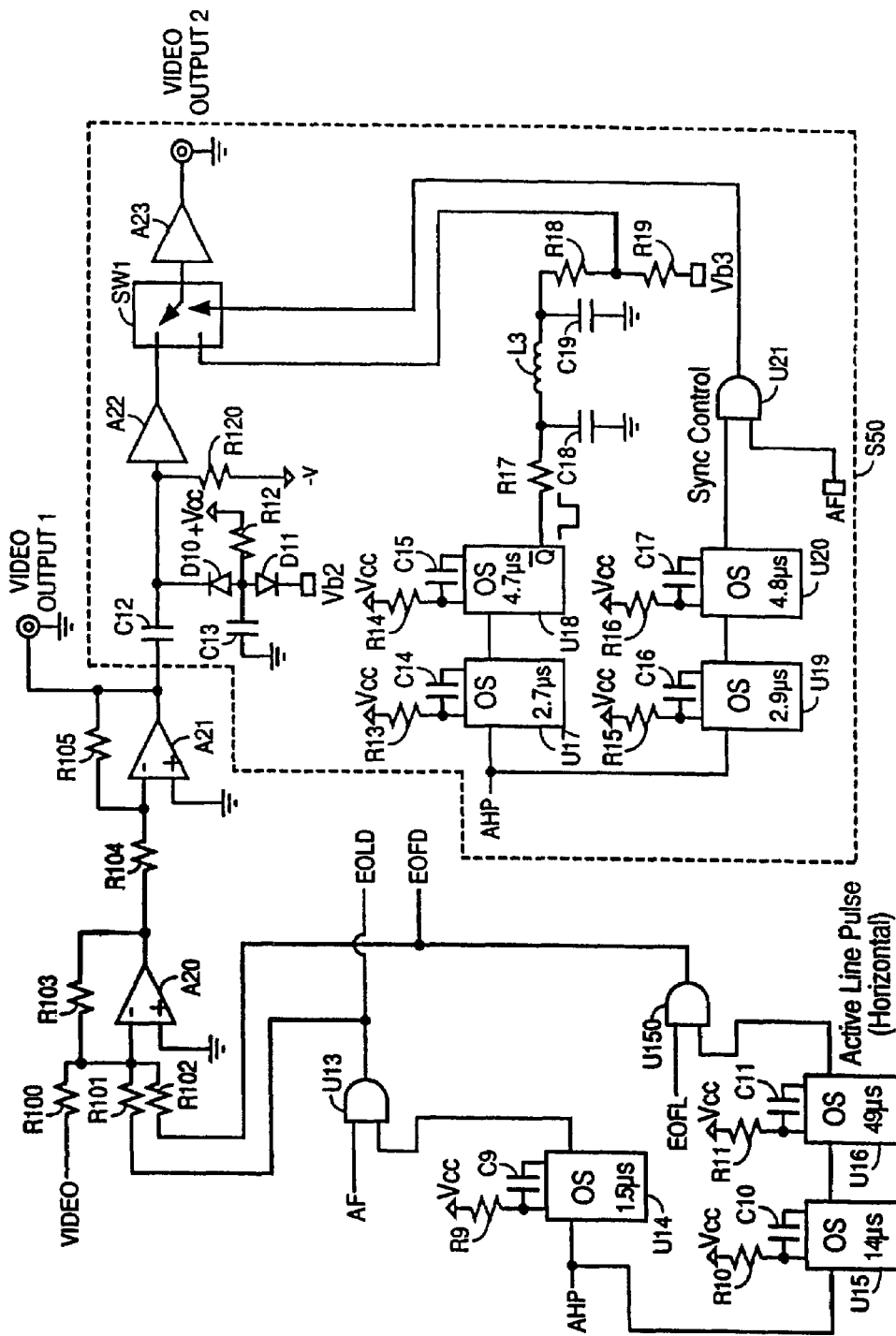

FIG. 18 shows a level shifting circuit defeating the checker and vertical pulses. Amplifiers A20, A21 form a summing amplifier. Signals supplied to this summing amplifier are via resistor R100 for video, via resistor R101 for end of line pulses, and via resistor R102 for end of field pulses. By using the advance horizontal pulse (AHP) which starts at the same time as each of the checker pulses, a pulse of about 1.5 μs duration is timed off the AHP using the active field pulse AF from EPROM U12. AND gate U13 generates a logic high pulse (EOLD) at the end of each line during the active field. This pulse from gate U13 then is added to the video, which causes the checker pulses never to come down to blanking level. Instead, the checker pulses now have a minimum 20% of peak white level. This defeats the end of line checker pulses because under the circumstance of an attenuated video signal, the checker pulses do not go down in video level enough to cause a sync separator to "accidentally" trigger.

Similar results are achieved for the vertical pulses where one shot U16 generates an active horizontal line pulse of about 49 μs duration (a minimum of 35 μsec) via the AHP into one shot U15 for a pulse that ends at the HBI. One shot U16 then triggers off one shot U15 (14 μsec pulse duration) to form an active line pulse. This active horizontal line pulse is and'd by gate U150 with the end of field location (EOFL) pulse via EPROM U12. The EPROM U12 EOFL pulses send a high logic signal at the end of the field during the horizontal active line via gate UI50. This high logic level from gate U150 output is then added to the video signal by resistor R102 to ensure that the vertical pulses are at a minimum level of 20% of peak white. With the vertical pulses having a level of at least 20% of peak white, under attenuated video circumstances, these new end of field lines will not cause a pseudo-vertical sync. The output of amplifier A21 then contains defeat mechanisms for both checker and end of field pulses. To defeat the sync narrowing process, the output of amplifier A21 is coupled to capacitor C12, capacitor C13, diode D10, diode D11, and resistor R12, which form a DC sync tip amplifier. Voltage VD2 is set to have 0 volts DC at blanking level into amplifier A22.

By using AHP again, one shot U17 and one shot U18 generate a new widened sync pulse. Components R17, C18, C3, C19, R18 and R19 are a low pass filter for finite rise time sync. Voltage $V_{b3}$ is set to establish blanking level for the "high" state of new widened sync. One shots U19 and U20 with AND gate U21 are the control logic to reinsert the new wider horizontal sync pulse during the active field. The outputs of one shots U19 and U20 are slightly delayed from U17 and U18 to accommodate the delay in the lowpass filter including components R17, C18, L3, etc. Electronic switch SW1 thus switches in the widened sync and outputs video out to amplifier A23. The right hand portion of FIG. 18 within the dotted line is the sync replacement and output circuitry S50.

Figure 19:
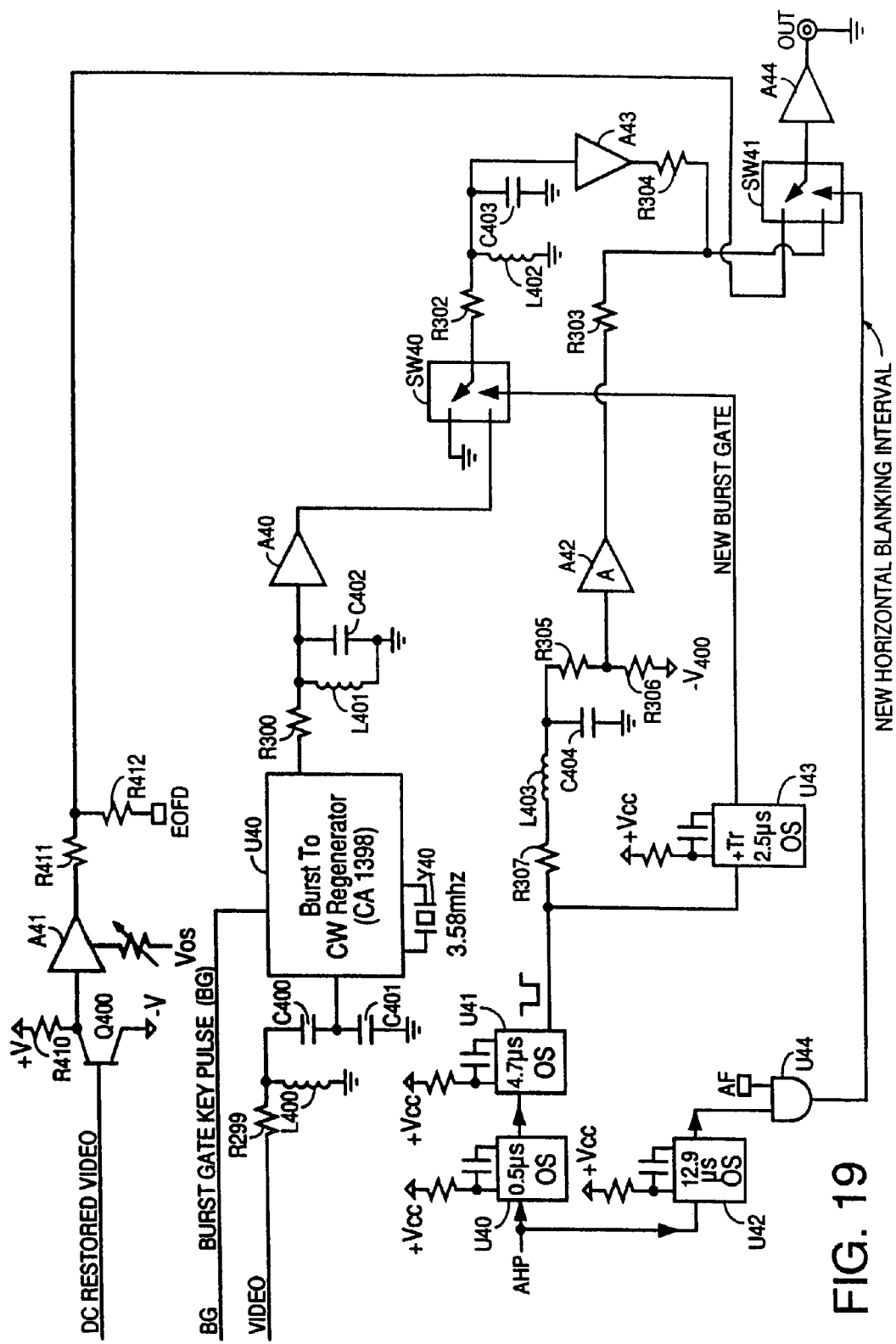
FIG. 19 shows a second circuit for removing the anticopy process enhancement signals via new sync and burst position replacement.

FIG. 19 shows a circuit to be used in conjunction with that of FIG. 16 that replaces the checker pulses with new widened horizontal sync pulses and a new color burst to follow these new widened horizontal sync pulses. Also the vertical modification pulses are defeated by level shifting via source signal EOFD (from FIG. 18) into resistors R412 and R411.

Input video is fed to a chroma band pass filter including components R299, C400, L400 and C401 into burst regenerator U40 (part number CA 1398) which is a burst to continuous wave subcarrier (3.58 mhz) regenerator; crystal Y40 is a 3.58 mHz crystal. The output of burst regenerator U40 is filtered via a band pass filter (3.58 mHz pass, including components R300, L401 and C402) and buffered by amplifier A40. Electronic switch SW40 gates in new color burst via one shot U43. One shot U43 is triggered by the trailing edge of the regenerated widened sync of one shot U41. One shot U40 is a 0.5 µs delay to establish a horizontal sync front porch "breezeway". Regenerated sync from one shot U41 output is filtered and level shifted via components R307, L403, C404, R305, R306 and voltage V400. Amplifier A42 buffers this level shifted widened regenerated sync to sum in with color burst via resistor R304 and amplifier A43. Electronic switch SW41 gates in during the active field (via AND gate U44 and the AF source signal from EPROM U12) new widened sync and new burst during the HBI. (The new widened sync and new burst also defeats any anticopy video signals with active field AGC pulses in the HBI, i.e. raised back porch pulses). Amplifier A44 buffers and outputs new video with defeated anticopy signals including narrowed sync, checker pulses, vertical pulses.

Figure 20:
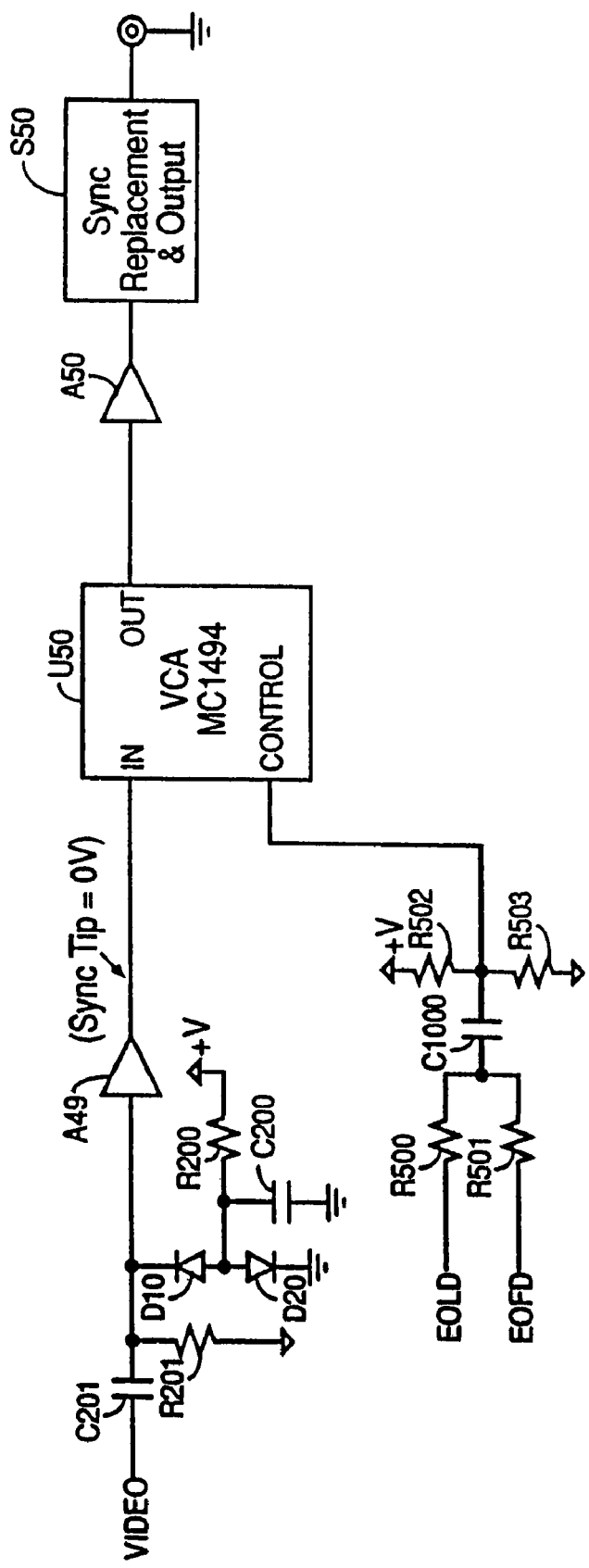
FIG. 20 shows a third circuit for removing the anticopy process enhancement signals via multiplying.

FIG. 20 shows a circuit for "level shifting" by multiplying a non-zero voltage to a higher voltage. End of line defeat signal EOLD and end of field defeat signal EOFD are used for level shifting in FIG. 16 generate a control voltage to raise the gain of voltage controlled amplifier (VCA) U50 (part number MC1494) during the presence of checker pulses and vertical modification pulses in the copy protected signal. The video is DC restored so that sync tip is at 0V, which means low states of the checker and vertical modification pulses are above 0V (typical from 0.3V to 0.5V). Components C201, R201, D10, D20, C200, R200 and A49 form this DC restored video signal. The output of VCA U50 then has a equivalent level shifted or amplified anticopy signal well above blanking level to defeat the anticopy enhancements. Amplifier A50 buffers the output signals from VCA U49 into the narrowed sync pulse defeat circuit of FIG. 16.

Figure 21:
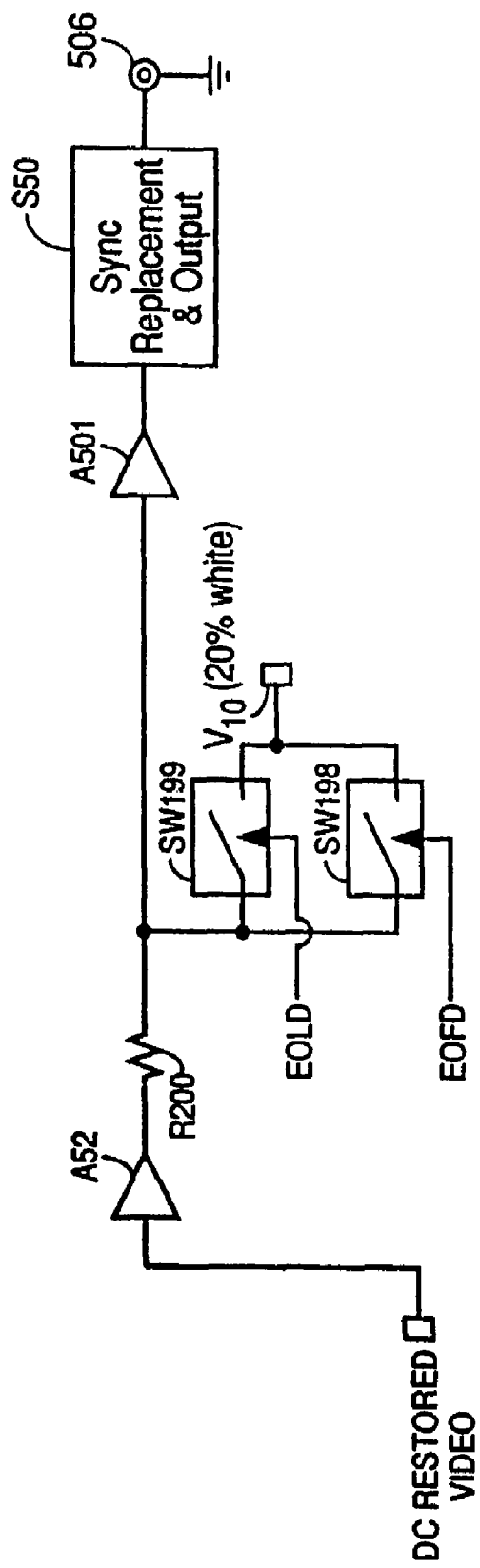
FIGS. 21, 22, 23 show three additional circuits for removing the anticopy process enhancement signals via switching means.
Figure 23:
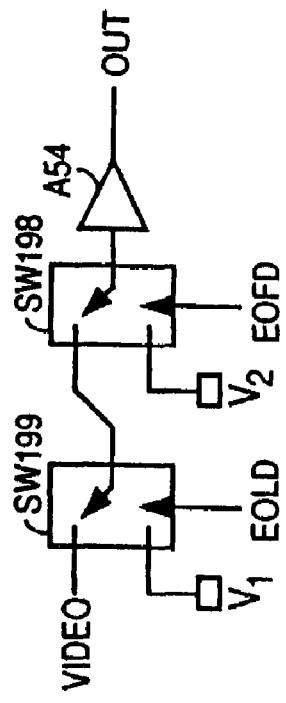
Figure 22:
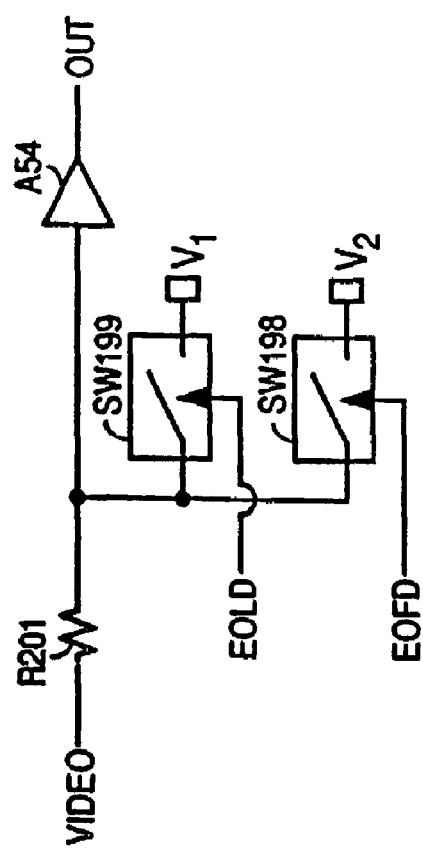

FIGS. 21, 22, and 23 show alternatives to defeat the checker and vertical anticopy signals by switching circuitry.

FIG. 21 shows that (for the DC restored video of FIG. 16) during the checker and vertical pulses, control voltages coincident with these pulses switch in (under control of the EOLD and EOFD signals) a 20% of peak white signal $V_{10}$, overriding the anticopy pulses by electronic switches respectively SW199 and SW198. The finite driving impedance of the video signal allows for this (resistor R200 providing the impedance of about 2000 ohms). The video signal is then amplified by amplifier A501, and processed by the sync replacement and output circuitry S50 of FIG. 18, before being outputted at terminal 506.

FIGS. 22 and 23 show alternative switching circuits to that of FIG. 21 to defeat checker and vertical pulses. (Sync replacement and output circuitry S50 is not shown in FIGS. 22, 23 but is present as in FIG. 21). In FIG. 22, the DC restored video input signal is again applied via resistor R201 to amplifier A54, with override switches SW198, SW199 under control respectively of the EOLD and EOFD pulses switching in voltages V1, V2, each of which is a DC or DC offset AC signal greater than or equal to 20% of peak white. The circuit of FIG. 23 is similar to that of FIG. 22, except that switches SW198, SW199 are located serially directly in the video signal path and use conventional replacement means to overcome the checker and end of field pulses. In certain cases merely blanking the checker and EOF pulses (blanking level $V_1=V_2=V_{10}$) may be sufficient in a viewable copy to defeat the effects of checker or EOF pulses.

Apparatus To Defeat Horizontal And Vertical Enhancements By Sync Wideninz.

Figure 24A:
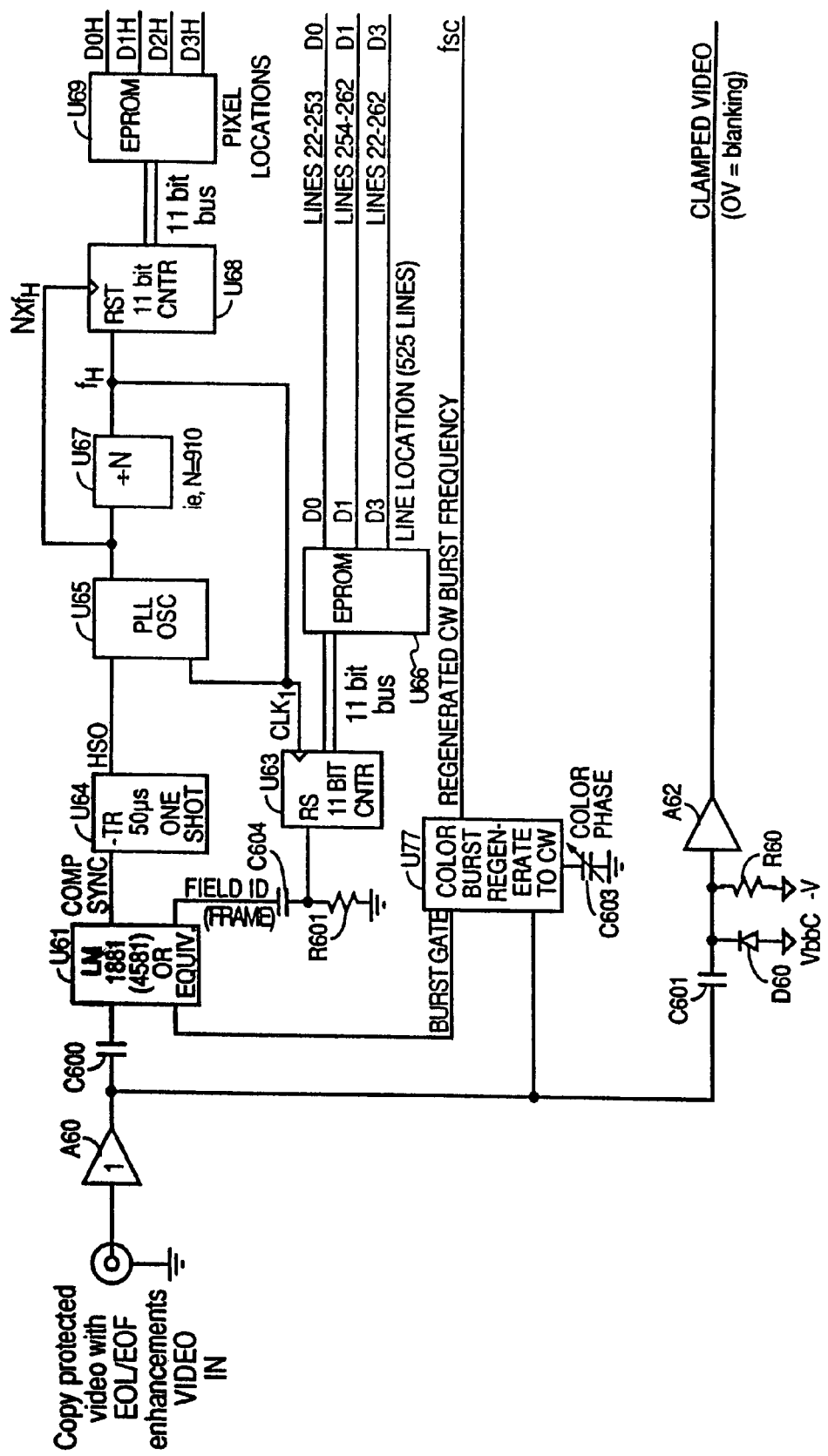

FIG. 24a shows a circuit with copy protected video with vertical (EOF) and checker (EOL) enhancements provided to input buffer amplifier A60 for defeat of the checker and vertical enhancements by sync pulse widening. The output of amplifier A60 is coupled to sync separator U61. The composite sync output of sync separator U60 is fed to one shot U61 to eliminate 2H pulses in composite sync. The output of one shot U64 is fed to PLL oscillator U65. The PLL's U65 frequency for N=910 is 14.31818 MHz, equal to N times the horizontal line frequency ($Nf_H$). By using $Nf_H$ to clock counter U68 and $f_H$ to reset it, EPROM U69 receives a 11 bit address bus from counter U68. EPROM U69 now can output horizontal pixel locations (as programmed into EPROM U69). The outputs of EPROM U69 contain the horizontal timing for:

Pre-pseudo sync location

Sync widening location

New Burst gate location

Pseudo sync locations for EOF pulse

The output of sync separator U61 also has a field ID (Frame) pulse which resets a 525 state counter U63. State counter U63 is clocked by a horizontal frequency pulse by the PLL U65 and divided by N counter U607. EPROM U66 then has the horizontal line locations within the active TV field. For example: in EPROM U66, $D_0$=lines 22-253 and $D_1$=lines 254-262, the location of the vertical modification pulses.

Referring to FIG. 24b, logic gates U610 to U614 utilize the data outputs of EPROMs U69 and U66 for the following:

1) Pre-pseudo sync and sync widening locations are gated through signal DO for pre-pseudo sync and widening sync (H) to be on lines 22-253. The output of gate U613 does this.

2) A sync widening only on lines 254 to 262 plus added pseudo sync pulses only on lines 254 to 262; U612 output accomplishes this. OR gate U614 combines the outputs of gates V612 and U613 and ORs these with D3H, the new burst gate signal. The output of gate U614 controls switch Sw600 to insert:

Pre-pseudo sync (Lines 22 to 253)

H Sync widening (Lines 22 to 262 new burst gate)

3) The new burst gate signal from signal D3H also, and D3 the active field pulse, gates the signal fsc cw via amplifier A65 and AND gate U615. The output of gate U615 is color subcarrier which is on only when signals D3H and D3 are high. Variable resistor R607 sets the new burst level, and capacitor C607, inductor L607 and resistor R604 filter the new burst envelope. U616 combines only the pre-pseudo sync, pseudo sync, widened sync pulses and sums into inverting summing amplifier via amplitude control R602 and R603. Summing amplifier A67 then has: pre-pseudo sync, widened H sync, new burst, and pseudo sync, and switch SW205 switches the output of amplifier A67 during the coincident times.

FIGS. 25a to 25h show waveforms as labelled at various points in the circuit of FIGS. 24a, 24b.

Figure 24C:
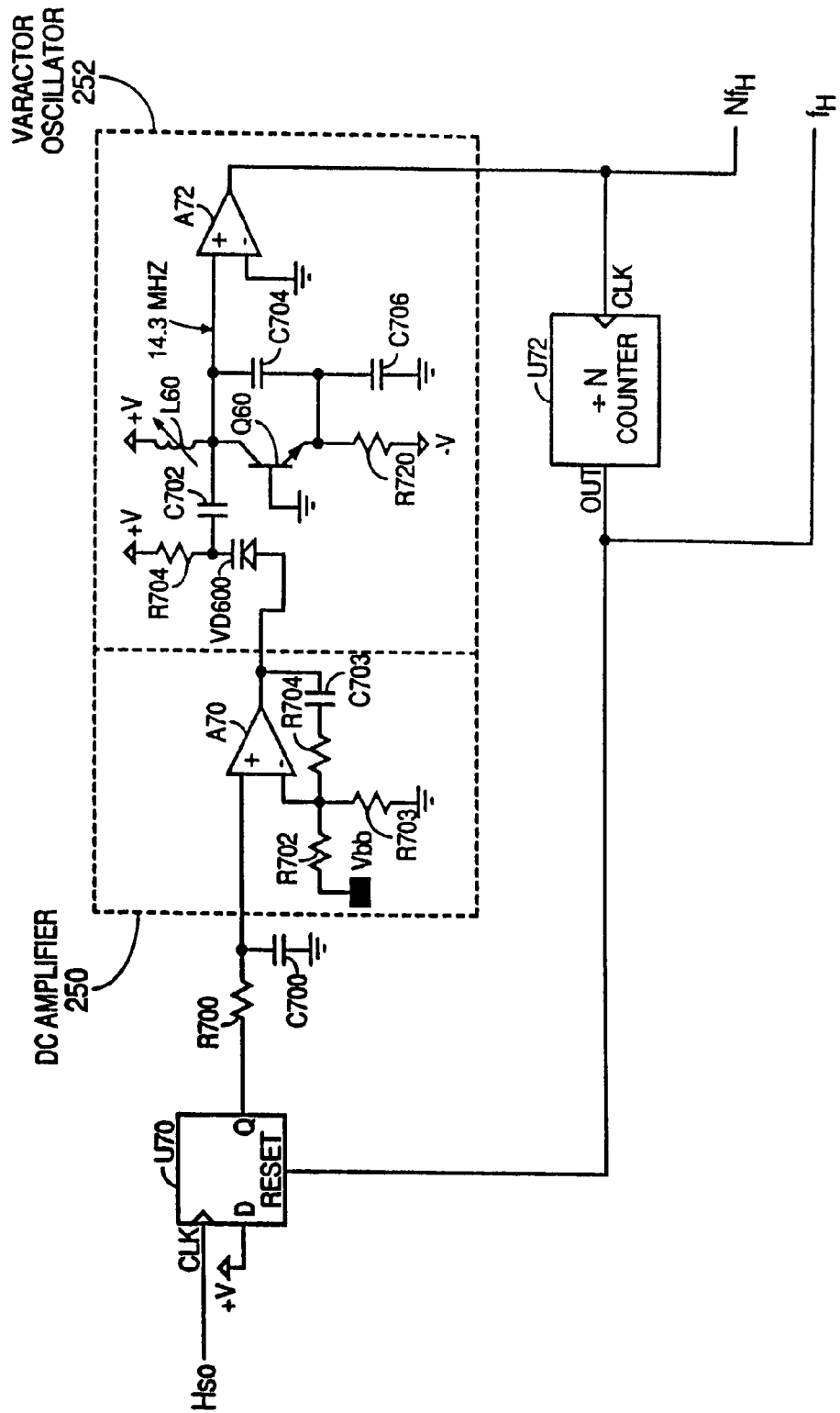

FIG. 24C shows a typical PLL circuit for oscillator U65 of FIG. 24a causing a varactor tuning diode LC oscillator 252 with a set-reset phase detector U70 and low pass filter (less than 1 KHz) including resistor R700 and capacitor C700, and a D.C. amplifier 250 including amplifier A70, and the associated components R702, C703, R703, R704 and voltage reference $V_{bb}$.

Another Method Of Defeating Checker And Vertical Enhancements

Figure 26:
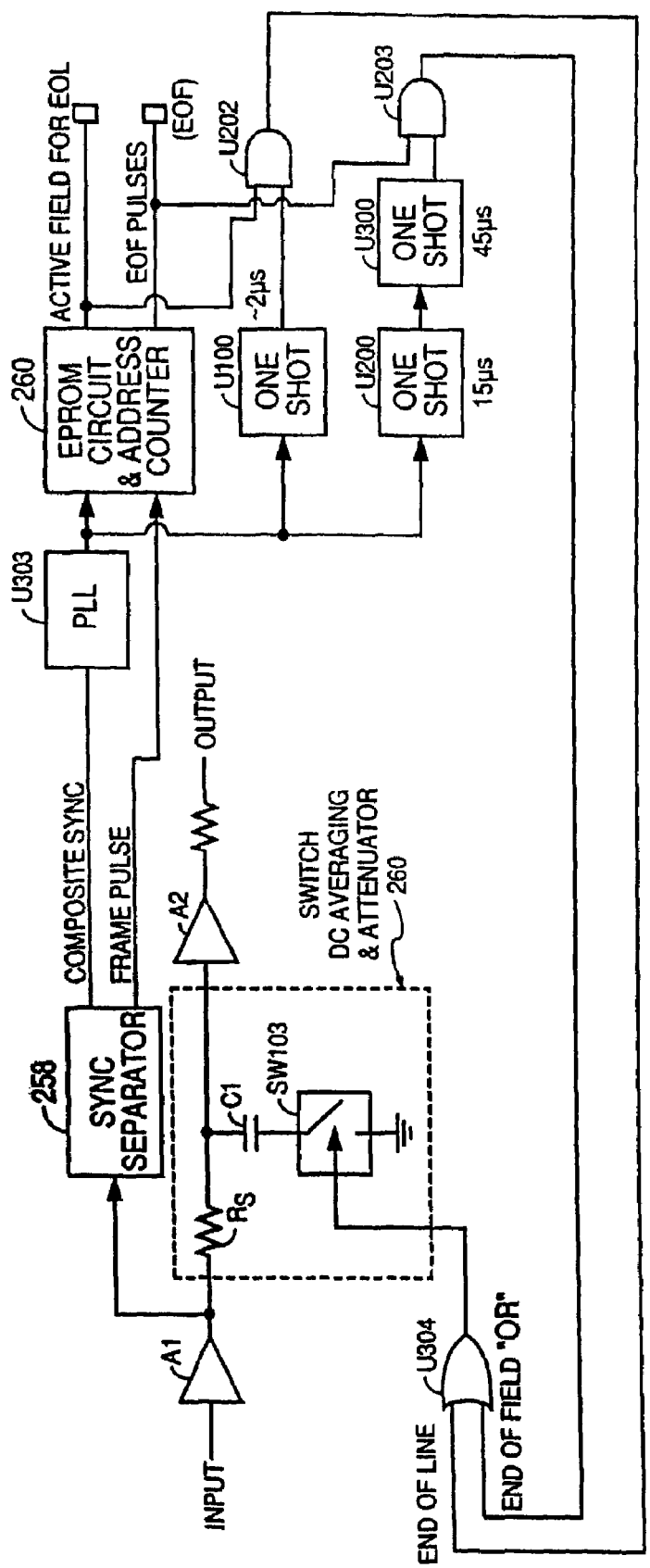
FIG. 26 shows another circuit for defeating the enhancement signals via DC averaging and attenuation.

Another circuit for defeating the checker and vertical pulses is shown in FIG. 26, where since switch SW100 is of low resistance, essentially the checker and vertical modification pulses are attenuated and/or level shifted or replaced by a voltage that is the average voltage (due to switch averaging circuit 260) in the high-low states of the end of line (checker) pulses and the end of field (vertical modification) pulses. For example, if the checker and vertical modification pulses have high states of 30 IRE and low states of 0 IRE, the capacitor C1 will charge to a voltage to approximately $$\frac{30IRE - 0IRE}{2} = 15IRE$$

Because switch SW100 is on during the checker period at the end of the line and on during the end of field pulses due to gate U304, during these times the capacitor C1 voltage overrides the input video signal with approximately a 15 IRE level, enough to defeat the enhanced anti-copy signals.

In FIG. 26, enhanced anticopy video signals are fed to input amplifier A1 which outputs into sync separator circuit 258 which outputs a short duration frame pulse (i.e. 10 μs) to reset memory address counters in circuit 260. Meanwhile, composite sync (including possibly pseudo sync pulses from the prior art basic anticopy process) is fed to a horizontal phase-lock loop circuit (PLL) U303. The output of PLL U303 is then a horizontal frequency pulse which starts about 2 μs before the front porch of input video. The EPROM of circuit 260 has outputs correlating to the checker and end of field pulses line locations in the TV field. One shot U100 outputs a pulse coincident with the checker location within the horizontal line, while one-shots U200 and U300 form a pulse such that the output of U300 has a pulse coincident with the end of field pulses within the horizontal line. The locations of checker and end of field pulses are gated through gates U202 and U203 and "or'd" via gate U304 to output pulses coincident in time with checker (EOL) and end of field pulses of the input video. Switch SW103 turns on during these coincident times to attenuate via resistor RS and average out (via capacitor C1) the enhanced copy protected signals, to output a more viewable signal from amplifier A2.

Figure 27:
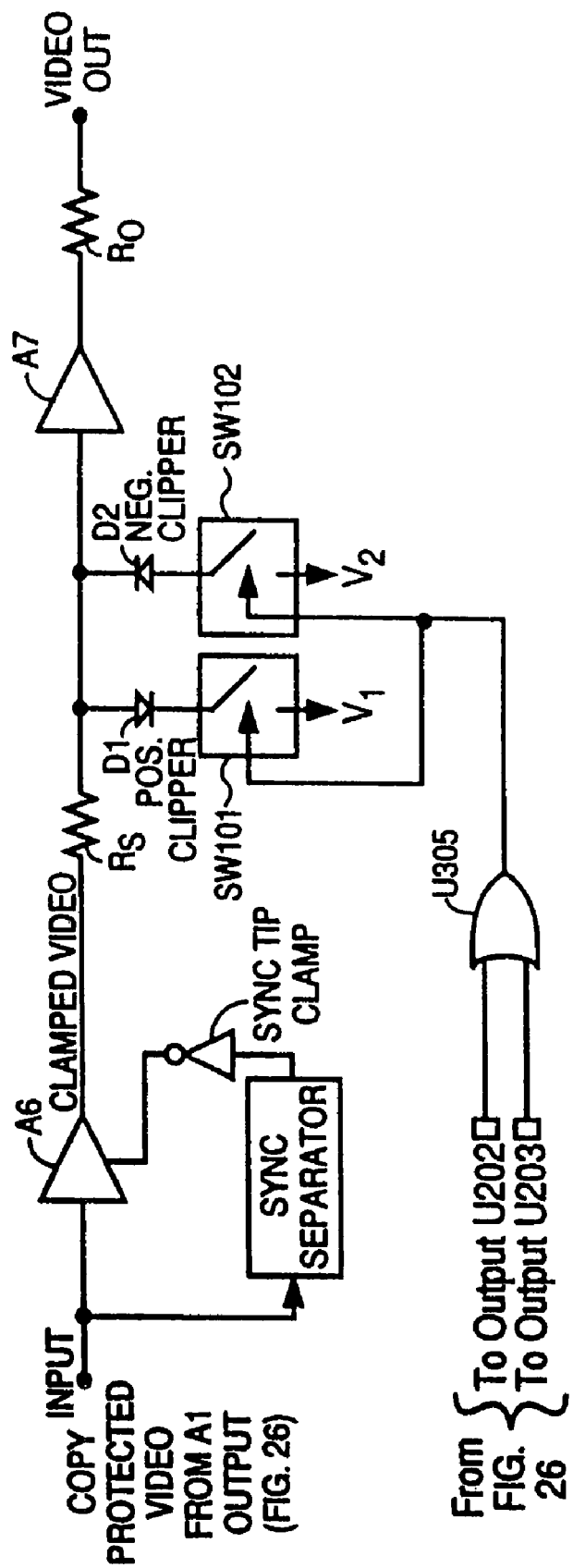
FIG. 27 shows an additional circuit of defeating the enhancement signals via clipping.

Another defeat method is to switch in either or both peak negative or peak positive clipper circuits during the presence of the checker (EOL) and vertical modification (EOF) pulses, as shown in FIG. 27. The input copy protected video is clamped by buffer amplifier A6. EOF and EOL locations are identified by the circuit and input to OR gate U305. Diode D1 positively clips the checker (high) gray pattern and vertical modification high gray pulses to render a more copiable recording. Diode D2 negatively clips the (low) black level of both the EOL and EOF pulses to a gray level to render a copiable recording via switches SW101, SW102. Amplifier A7 buffers the actions of switches SW101, SW102 to output a copiable video signal.

A third defeat method is to sense the checker pulses and vertical modification pulses and add inverse pulses. Since the check pattern runs up or/and down, and the vertical modification pulses run up and down, the circuit of FIG. 28 senses and nulls out EOF and EOL pulses.

Figure 28:
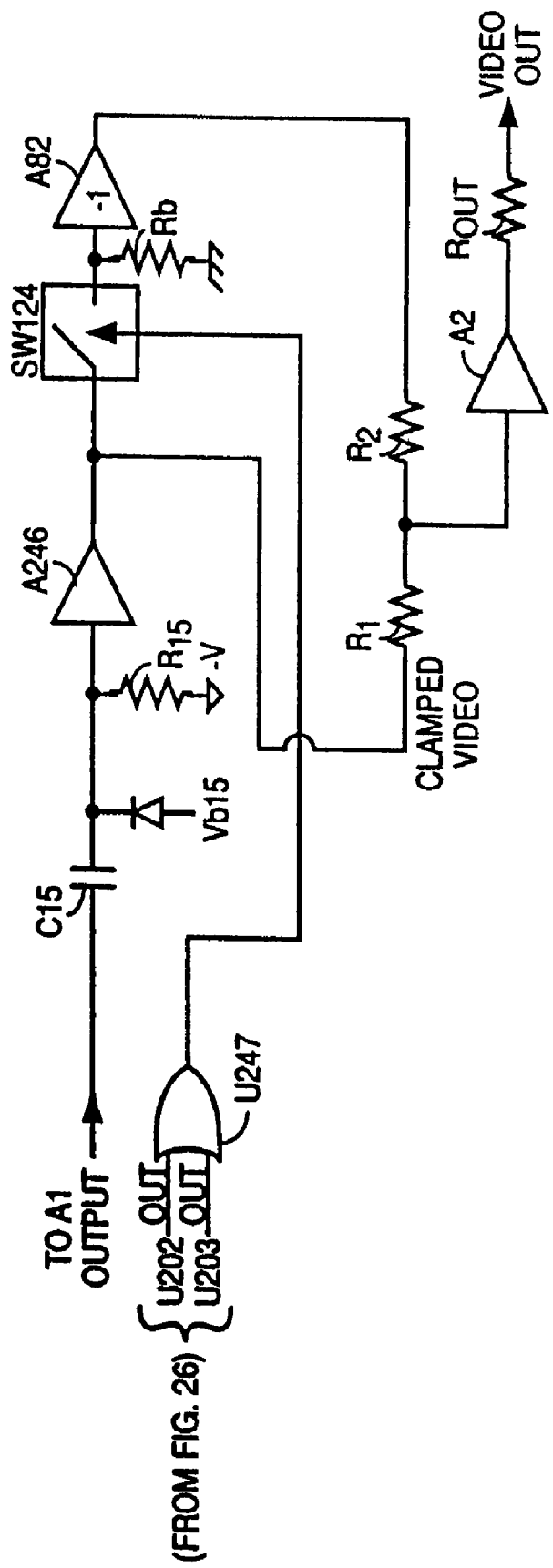
FIG. 28 shows yet another circuit to defeat the enhancement signals.

Although nulling may be less effective because reduces the checker or end of field pulses to about blanking level (OIRE), nulling can in some cases cause a more viewable picture. (Recall ideally the checker and end of field pulses should be above about 20 IRE for total defeat). Nulling thus causes the Hi and Lo states of the checkers and end of field pulses to go to a low state (0 IRE). FIG. 28 shows a nulling circuit. Video from amplifier A1 output of FIG. 26 is DC restored to have blanking level about OV via components C15, D15, Vb15, R15 and A246 feed into switch SW124 that passes the checker and end of field pulses via "or" gate U247. Gate U247 has checker and end of field locations "identified" via gates U202 and U203 from FIG. 26. Inverter A82 inverts the signal from switch SW124 and sums in this inverted checker/end of field pulse via resistor R2 back to incoming video (via resistor R1) to null out the checker and end of field pulses. (Resistors R1 and R1 have equal values). Amplifier A209 buffers this video signal with nulled out checker and end of field pulses. (Resistor R6 keeps a DC bias to ground for inverting amplifier A82).

Figure 29A:
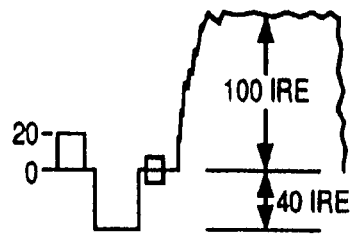
FIGS. 29a, 29b show waveforms illustrating defeat of the enhancement signals via increasing sync amplitude.
Figure 29B:
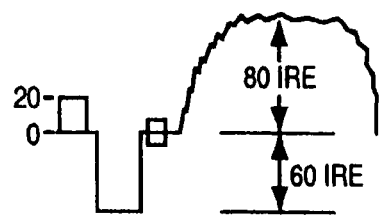

Yet another defeat method (for use against the EOL and EOF pulses) is to attenuate peak active video from 100% to 80% (by about 20%), and also increase the sync amplitude (by about 50%) as shown in the waveforms of FIGS. 29a and 29b. This requires an increase of composite sync from 40 IRE to about 60 IRE. This can also defeat pseudo-sync pulses of the kind disclosed in U.S. Pat. No. 4,631,603 because the pseudo sync pulses therein are 40 IRE. With prolonged composite sync pulses, sync separation circuits tend to separate only the large sync pulses and ignore the smaller amplitude ones. Thus the pulse pairs (pseudo-sync plus AGC pulse) will not be sensed. FIG. 29a shows the original input waveform for one video line. FIG. 29b shows the video line waveform modified for both the checker and vertical modification pulses.

FIG. 29b shows a resultant waveform with modified sync amplitudes to be about 50% over the standard video with checker and end of field pulses. Since the composite sync signals are larger, the attenuation by the illegal copy will generally not be enough to cause the checker and end of field pulses to be of any effect when viewing an illegal copy. Because the horizontal and vertical sync are modified to be much larger, the TV or VCR sync separator will not mistrigger.

Figure 30:
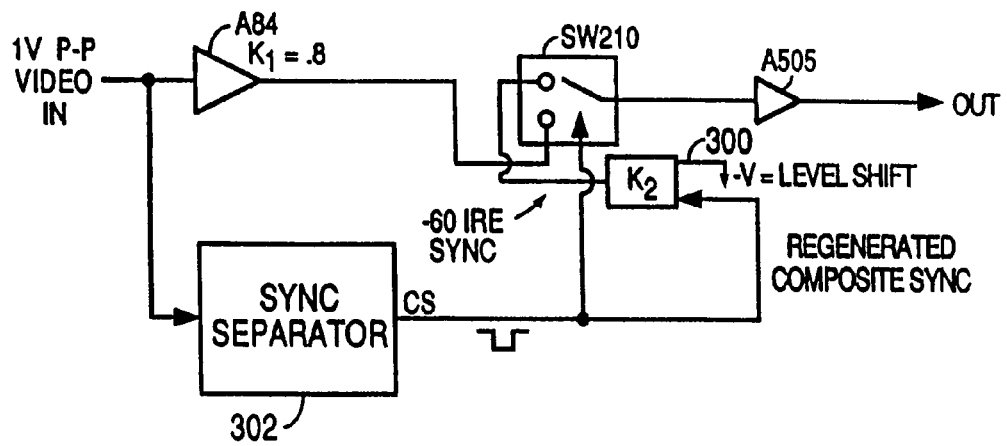
FIG. 30 shows a circuit for defeat of the enhancement signals via increasing sync amplitude.

FIG. 30 shows a circuit to provide the waveform of FIG. 29b. Enhanced anticopy protected signals are input to an amplifier A84 with gain of 0.8. These input signals are also clamped and have blanking level equal to OV. Sync separator circuit 302 outputs composite sync CS to analog switch SW210 and 300 attenuator. Attenuator circuit 300 attenuates the typical logic level of composite sync (i.e. 5V peak to peak) and via offset voltage—V. Attenuator circuit 300 outputs a regenerated composite sync of 60 IRE (with 0 IRE equal to OV) to −60 IRE levels. Switch SW210 then switches in this new regenerated sync to output via amplifier A505 a waveform like that of FIG. 29b.

Figure 31:
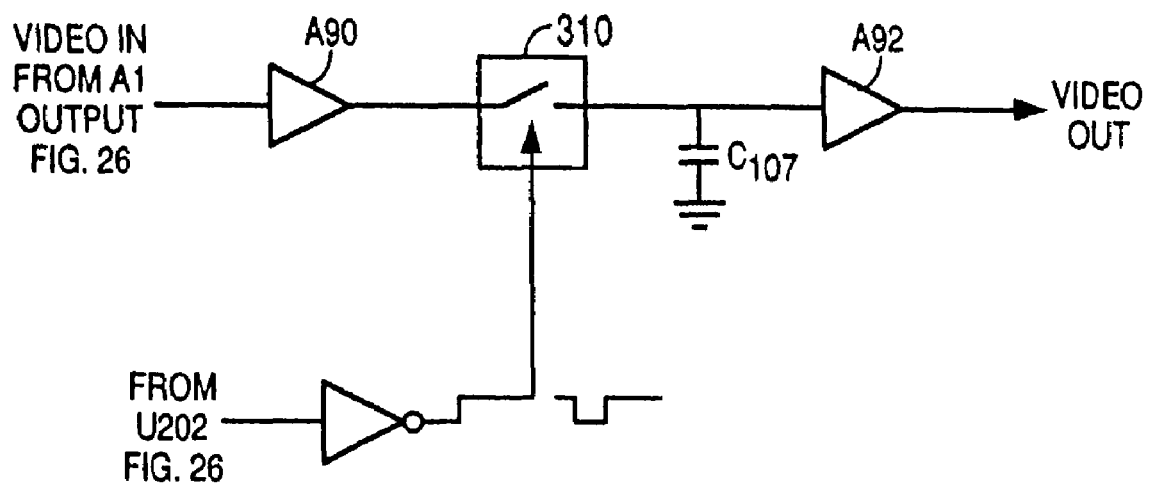
FIG. 31 shows another circuit for defeat of the enhancement signals via tracking and holding circuits.

Another defeat method as shown in the circuit of FIG. 31 is to track and hold the active video line to replace the checker pulse with the last value of active video before the beginning of the EOL pulses.

By using from the circuit of FIG. 26 A1 output and U202 output along with the circuit of FIG. 31, it is possible to defeat the checkers by tracking and holding. This method is similar to reinserting a known voltage during the time of checker pulses. Since most program material is above 0 IRE (especially in NTSC where black level is 7.5 IRE), tracking and holding the video results in a level generally greater than 7.5 IRE, which is enough to defeat the checkers when this level is re-inserted in the checker location.

Amplifier A90 receives input from amplifier A1 of FIG. 26. Amplifier A90 has a delay of 100 ns to 200 ns (via delay lines or low pass filters) so that the pulse from gate U202 tracks and holds video 100 ns to 200 ns just before the checker pulses. Switch 310 is on at all times and is off during the checker pulses' times. Thus, amplifier A92 output essentially is video transparent until switch 300 turns off and capacitor C107 fills in for 2 µs the last program pixel (greater than approximately 7.75 IRE) during the checker pulse time.

Figure 32A:
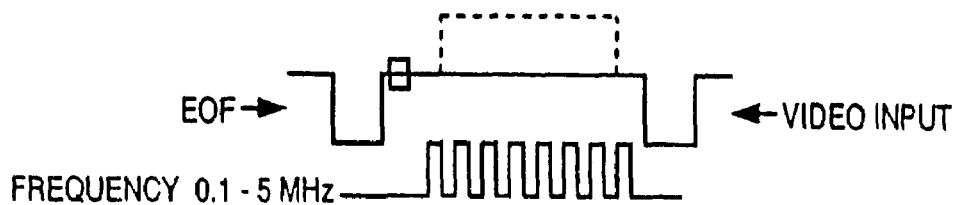
FIGS. 32a, 32b show waveforms illustrating defeat of the enhancement signals via adding an AC signal.
Figure 32B:
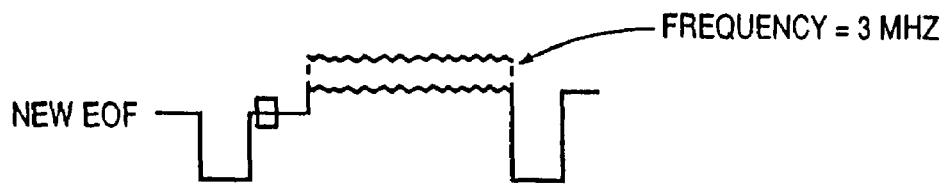

Another defeat method as shown in the waveforms of FIGS. 32a, 32b is to add a high frequency signal to the EOF and EOL pulses so as to effectively level shift by the average DC level of the high frequency signal. FIG. 32a shows in the upper waveform the video input signal including the EOF pulse, and in the lower waveform the high frequency level shifting signal having a frequency of 0.1 to 5 MHz. The lower waveform of FIG. 32a can be applied to the checker pulses as well (at a frequency of 3 MHz for example). The resulting VCR recorded signal is shown in FIG. 32b, with the wavy portion having a frequency 3 MHz. The added high frequency signal causes the VCR to respond only to the average DC level, thereby level shifting the high and low states of the EOF and/or EOL pulses so as to be ineffective.

Figure 33:
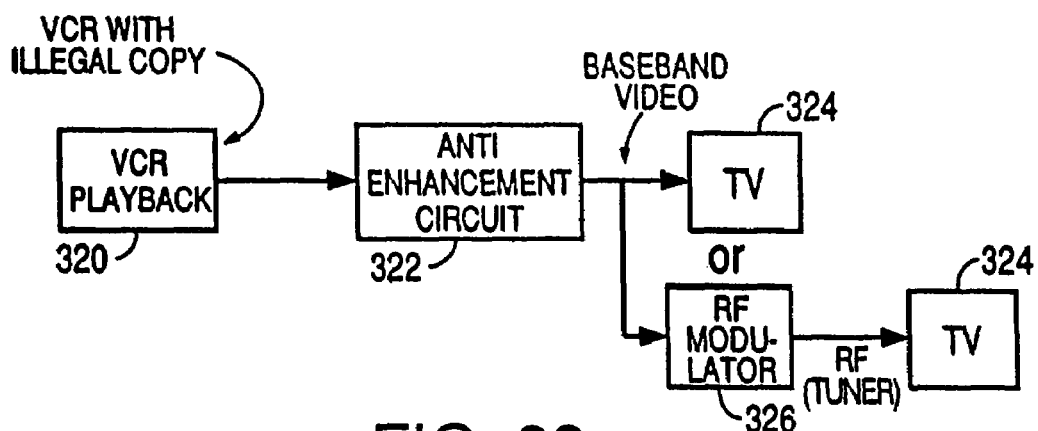
FIG. 33 shows a circuit for connecting circuits for defeat of the enhancement signals.

Since these above described enhancements are dependent on the TV set circuitry as well, as shown in FIG. 33 these "anti-enhancement" (defeat) circuits 322 can be connected between a playback VCR 320 and the TV 324 to ensure a more viewable image of the illegal tape copy, using if needed RF modulator 326.

Pre-sync Pulses Defeating Horizontal And Vertical Modifications

The following describes how wider than normal sync pulse replacement (i.e. normal sync of 4.7 µs vs. wider sync of 6 µs to 10 µs) negates vertical modification (end of field) and checker (end of line) pulses respectively.

In the sync separators used in TV sets as shown in prior art FIG. 10, the composite sync pulses charge up the input sync separator coupling capacitor C. The slice threshold is a function of the average charge time per TV line. The greater the charge time, the further the "slice" point is away from the blanking level. Also, because the slice point is ramping toward blanking level due to resistor $R_b$ and capacitor C, a sync pulse preceding the end of line pulses causes the ramping to be temporarily slowed down as to avoid slicing during the end of line pulses or end of field pulses.

Figure 34A:
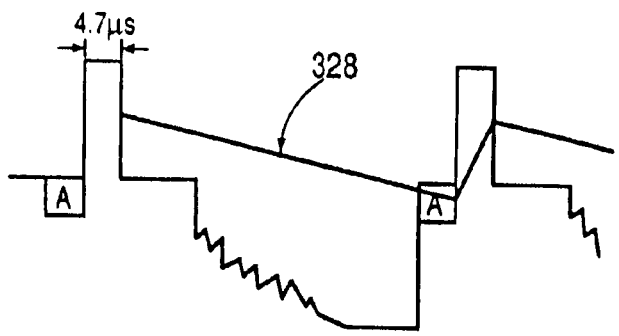
FIGS. 34a, 34b, 34c and 36c show waveforms illustrating sync slicing.

FIG. 34a shows the TV sync separator's response to a TV signal (inverted video representation) including the basic anticopy process of U.S. Pat. No. 4,631,603 plus just the checker anti-copy enhancement. The TV sync separator slice point 328 clearly falls into the "A" regions, (the checker regions) and thus causes on/off pre-sync pulses that result in a checker pattern on the TV set picture.

Figure 34B:
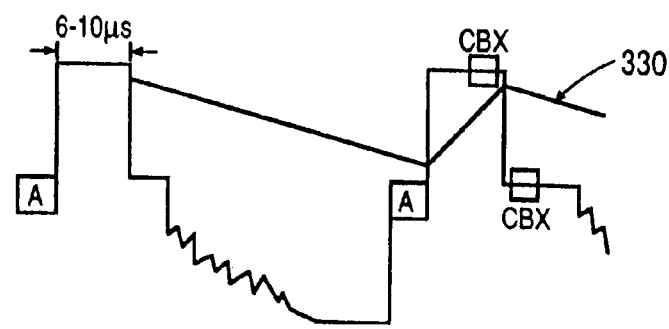

The waveform of FIG. 34b shows the result of wider than normal sync pulses. The resulting TV sync separator slice point 330 clearly never falls into the "A" checker region, and thus the TV does not experience a checker pattern. The color burst waveform may need to be added in the "CBX" region throughout the horizontal sync region to ensure color lock of the TV or VCR.

Figure 35A:
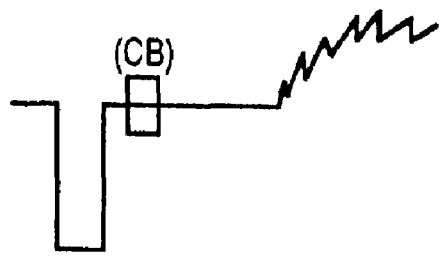
FIGS. 35a, 35b show waveforms illustrating the effect of widened sync.
Figure 35B:
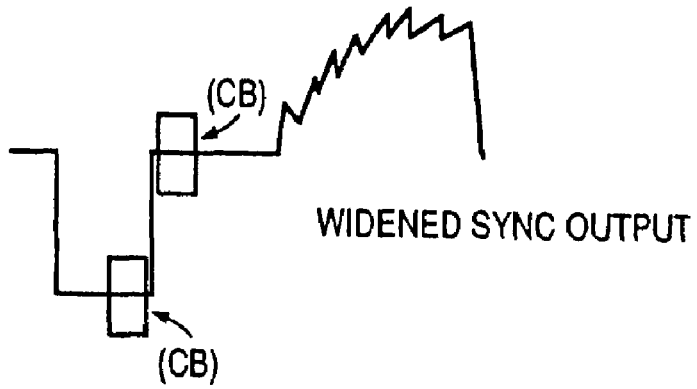

FIGS. 35a, 35b show respectively a normal video horizontal sync pulse and a widened horizontal sync pulse with regenerated color burst (CB) added to the second half of the widened sync pulse, and the color burst added after the trailing edge of this widened horizontal sync pulse. The added regenerated color burst is to ensure that TV sets still have a color burst to lock onto, whether the TV triggers color burst off the leading or trailing edge of sync.

The regenerated color burst is not necessary for the location of the vertical modification pulses sync; these happen at the bottom of the TV field which is generally not viewed.

The following explains how adding sync pulses and pre-sync pulses negates the effects of (defeats) the end of field and end of line pulses:

By adding sync and pre-sync pulses, the TV's sync separator coupling capacitor C charges up more. Thus the slice point of the sync separator circuit moves away from blanking level, avoiding the end of line pulses and end of field pulses.

Figure 34C:
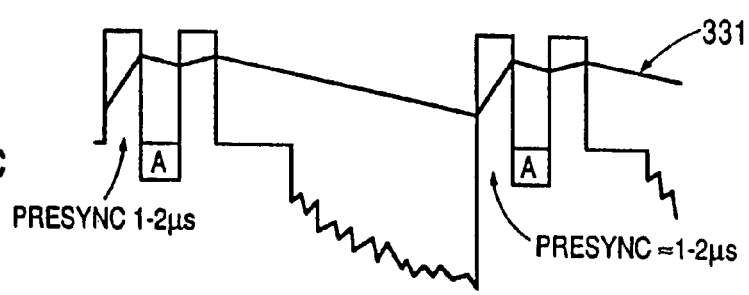
Figure 36A:
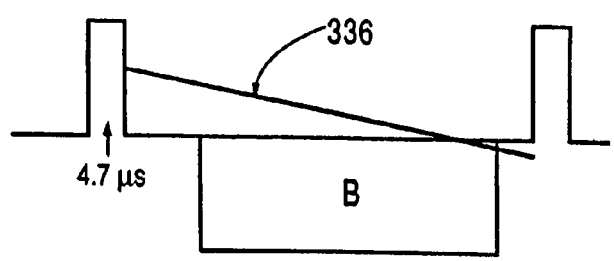
FIGS. 36a, 36b show further sync slicing points.
Figure 36B:
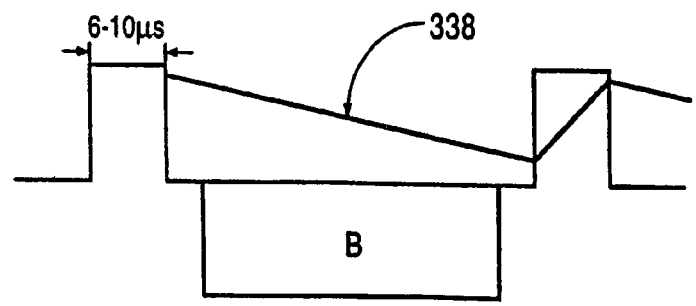
Figure 36C:
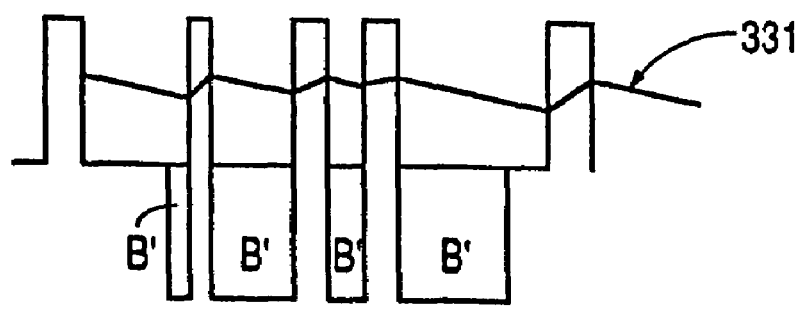

The waveform of FIG. 34c shows video with added pre-sync pulses; the TV or VCR sync separator slice point 331 does not go into the end of line location. Similar results are shown for vertical modification pulses with gating in pseudo sync pulses in FIG. 36c. FIG. 36a shows vertical modification pulse "B" with normal H sync width and TV sync separator slice point 336. Note that the slice point 336 of the TV sync separator slices into the vertical modification pulse B. FIG. 36b shows the corresponding waveform with widened H sync width, having TV sync separator slice point 338 that avoid slicing into the "B" region (vertical modification pulses).

Post-sync Pulses Additional Horizontal Modifications

Figure 37:
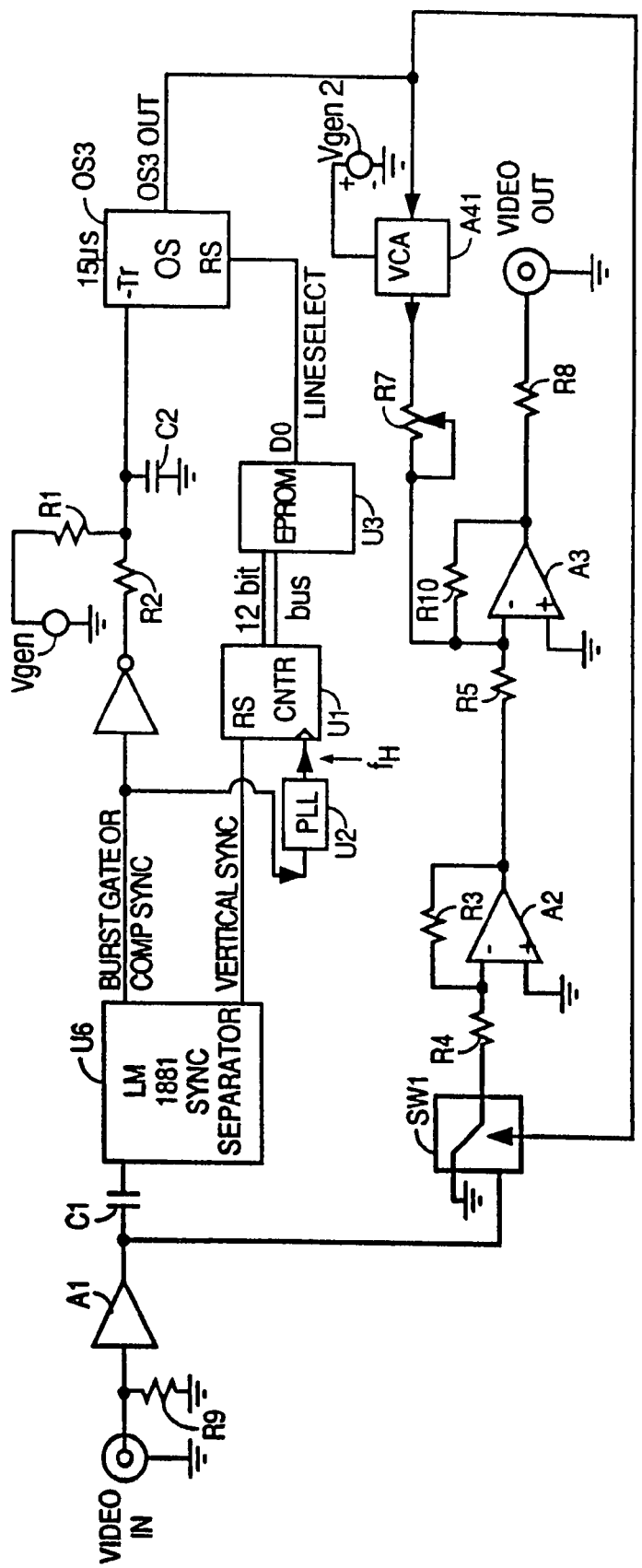
FIG. 37 shows a circuit for enhancements of a checker pattern using post-sync pulses.

FIG. 37 shows a circuit to add post-pseudo sync pulses to enhance anticopy effectiveness (i.e., further degrade viewability) when an illegal copy is made with the above described basic anticopy process of U.S. Pat. No. 4,631,603.

Video with the basic anti-copy process plus other above-described enhancements is input to resistor R9. Amplifier A1 buffers input video and couples it via capacitor C1 into the sync separator U6. The vertical sync output of sync separator U6 resets a 12 bit counter U1. Counter U1 is clocked by horizontal sync to a PLL U2 that is locked to composite sync. EPROM U3 selects on which lines the post-pseudo sync (PPS) may appear. A pseudo-random distribution of post-pseudo sync may be used, as selected by EPROM U3. Signal DO (an output of EPROM U3) inhibits one shot OS3 accordingly. The burst gate signal from sync separator U6 is inverted and low pass filtered by capacitor C2 and resistor R2. Voltage Vgen sums in a signal (i.e., 300 Hz triangle wave form) into capacitor C2. This causes a time varying threshold difference into one shot OS3 and thus causes a position change. The output of one shot OS3 is a fixed pulse (i.e., 1.5 µs duration) with pulse position modulation for example of ±1 µs. The output of one shot OS3 blanks out any video to blanking level via switch SW1 and adds a pulse by variable R7 to generate a post pseudo-sync pulse. Summing amplifier A3 inverts the output pulse of one shot OS3 to maintain the correct shape of the added post pseudo-sync pulse. FIGS. 38a to 38e show waveforms at various points in the circuit of FIG. 37, as labelled. The amplitude of the post pseudo sync may be amplitude modulated via VGen2 and voltage controlled amplifier A41 which is a multiplying amplifier. The output of amplifier A41 varies in amplitude according to VGen2, being 0V when the post pseudo sync pulse is off.

Defeat Method And Apparatus For Post Sync Enhancement

Figure 39A:
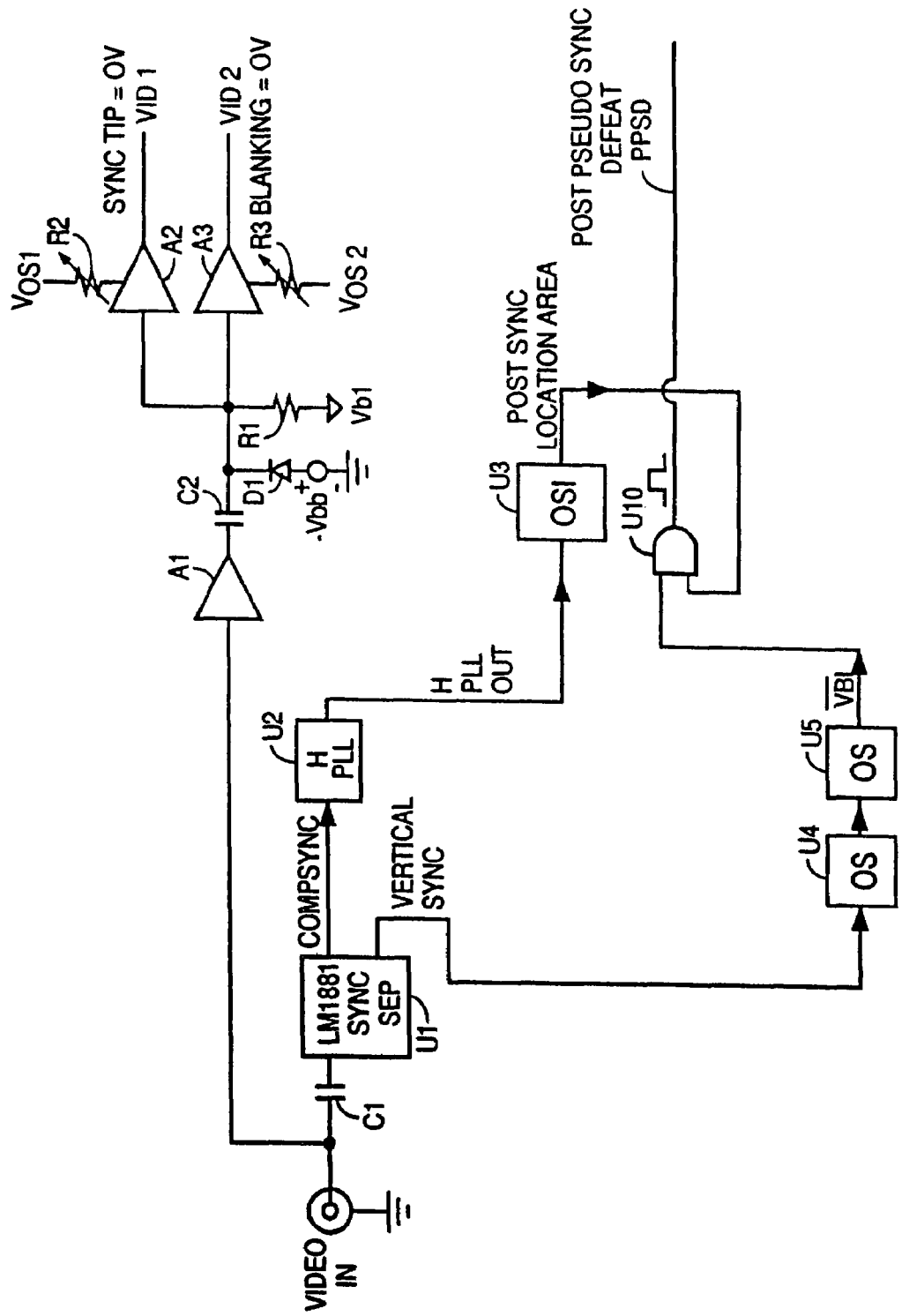
FIG. 39a shows a circuit for defeat of the post-sync pulses enhancement.

FIG. 39a shows another defeat circuit for use with "video in" containing the above-described post pseudo-sync pulses (PPS) coupled to sync separator U1 by capacitor C1. That is, the circuit of FIG. 39a reduces or removes the effect of the PPS pulses, rendering the video signal recordable. Sync separator-U1 feeds composite sync into a horizontal phase lock loop U2. The H PLL U2 is phased to begin in the area of the post pseudo sync pulse (after burst). One shot U5 triggers off H PLL U2 to generate a pulse that contains the post pseudo-sync pulse. Vertical sync from one shot sync separator U1 triggers sync separator U4 to generate a pulse from extending TV from line 4 to line 21, and one shot U4 triggers one shot U5 to generate an active field pulse from lines 22 to 262. The output of one shot U5 (which is the complement of the vertical blanking interval) gates AND gate U10 so that the output of gate U10 is on only during the active TV field.

Thus the output of gate U10 indicates locations of the post pseudo-sync pulses during the active field. FIGS. 39b, 39c, 39d show waveforms labelled for three points in the circuit of FIG. 39a.

FIG. 40a shows the output signal of gate U10 of FIG. 39a used to defeat the post pseudo-sync pulses by generating a pulse (PPSD) coincident to the PPS signal and level shifting via analog multiplier U6 (part number 1494). Multiplier U6 increases or decreases the gain during the time the post pseudo-sync defeat pulse U10 output is present. When signal VID1 is provided to multiplier U6, the sync tip is OV at VID1. By increasing the gain at the right time, the result is waveform Z of FIG. 40b. By using signal VID2 into multiplier U6 instead of VID1 and using the output of gate U10, multiplexer U6 is reconfigured to attenuate with the positive going pulse of U10 output and the gain is reduced at the right time to produce waveform Y of FIG. 40c, defeating the process.

By using signal VID2 into an analog switch SW220 of the circuit of FIG. 40d, gate U10's output controls switch SW220 to insert a reference voltage. If VR is OV, waveform X of FIG. 40e results in a blanked-out post pseudo-sync. If VR is at sync tip voltage (i.e., −40 IRE), the result is waveform U of FIG. 40f which creates an additional H sync pulse of fixed amplitude and position. This causes most TV sets to have a static horizontal picture offset and none of the "waviness" the post pseudo-sync pulse would otherwise cause.

By summing the output of gate U10 into amplifier A6 in the circuit of FIG. 40g, level shifting occurs to defeat the post pseudo-sync pulse, the waveform for which is also shown in FIG. 40b. FIG. 40h identifies the position of the PPS and level shifting.

Finally, narrowing the post pseudo-sync pulse to defeat its effect is done by slicing sync. As shown in FIG. 41a, amplifier A7 receives video VID2 with a notched-out color subcarrier due to a notch filter R100, inductor L100, and capacitor C100. Amplifier A7 output slices both normal sync and post pseudo-sync by setting $V_{bb2}$ to approximately −10 IRE. By using AND gate U7, and the PPS from gate U10 (FIG. 39a), gate U7 outputs a pulse that is inverted but identical to the original post pseudo sync pulse at logic levels. One shot U8 is timed for greater than 90% of the pulse period of the post pseudo-sync pulse and then controls switch SW224 to truncate the leading edge of the post pseudo-sync pulse by greater than 90%. The result is the waveform as seen in FIG. 41b "VIDEO OUT DD" which shows a very narrow post pseudo-sync pulse, so as to cause no response in any video device (i.e., VCR or TV set). Also by summing the output of gate U7 (FIG. 41a) into amplifier A6 of FIG. 40g via resistor R6, this results in an output that is level shifted past pseudo sync, as seen in FIG. 40h. This method can partially or fully cancel the post pseudo sync pulse amplitudes as well, which results in attenuated post pseudo sync.

Method And Apparatus For Reducing Effects of Basic Anticopy Process Signals

The following describes a method and apparatus in which the basic anti-copy process signals consisting of pseudo sync and AGC (i.e. basic anticopy process) added pulses (as described above) are reduced in effectiveness, without altering these added pulses. Unlike the above described previous methods for altering the added pulses via amplitude attenuation, level shifting or pulse narrowing to offset the added pulses' effect, the present method reduces the effects of added pulses by further adding other pulses that counteract the gain reduction caused by the AGC and pseudo-sync pulses.

U.S. Pat. No. 4,631,603 describes how the AGC circuit in a VCR measures the incoming video signal amplitude using a sync and back porch sample. By adding extra sync pulses with a very high level back porch, gain reduction occurs. Because the AGC circuit in a VCR continuously samples the sync amplitude (via a sync sample and a back porch sample) the present method negates some of the anticopy signals by moving all the back porch levels from blanking, to below blanking level (i.e. about −20 IRE units for NTSC video). It is also possible with the present method to add extra pseudo-sync pulses in the area at the bottom of the TV field (end of field) where anticopy signals containing AGC and pseudo-sync pulses are not present. These "extra" pseudo-sync pulses are followed by pulses below blanking level.

Figure 42A:
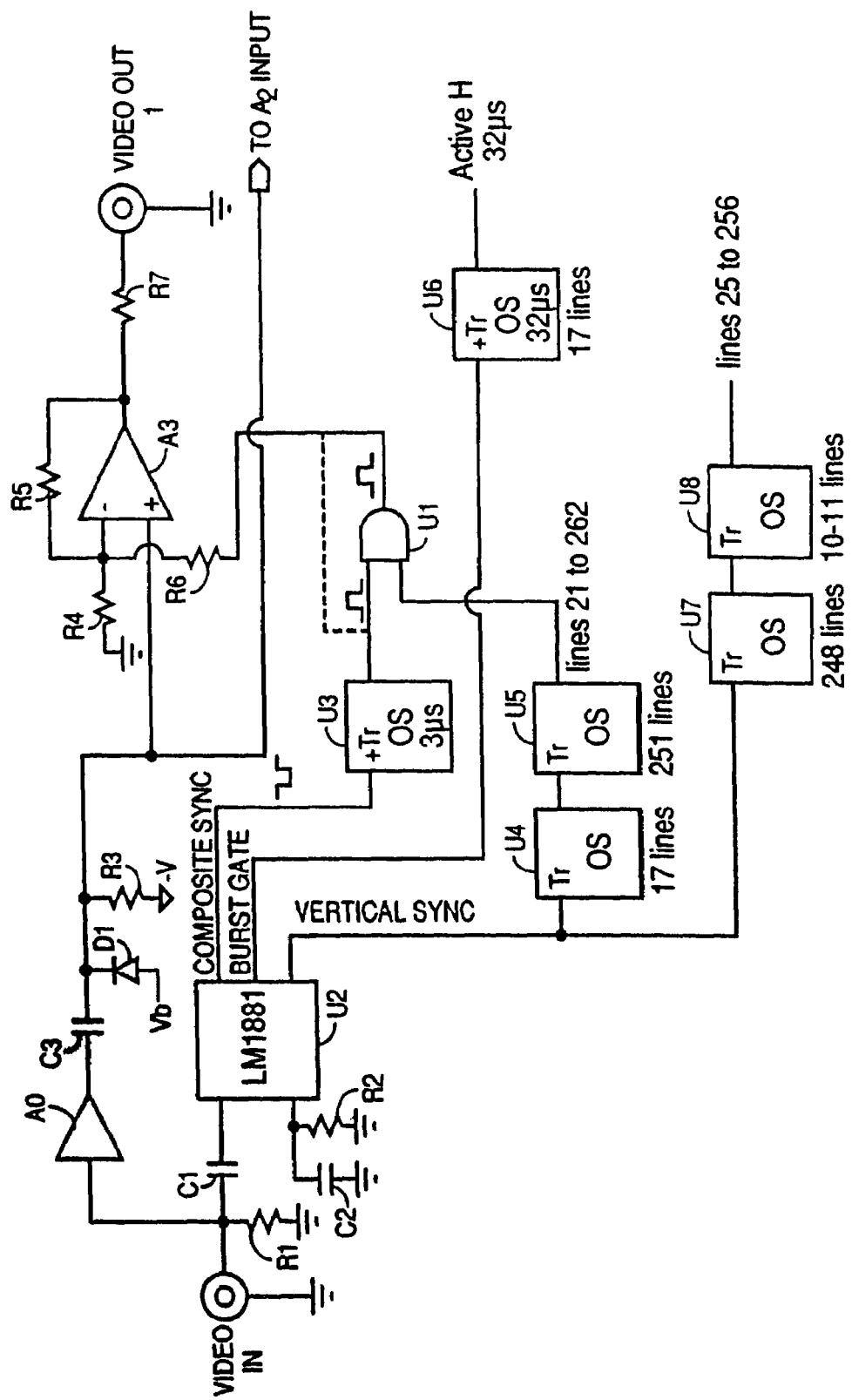
FIGS. 42a, 42b show a.circuit for defeat of the prior art basic anti-copy process.

Referring to FIG. 42a, the basic anti-copy protected video ("video in") is coupled to a sync separator U2 (part number LM 1881 or equivalent). The composite sync from sync separator U2 triggers the trailing edge of sync to a 3 μs one shot U3.

Vertical sync from sync separator U2 triggers one shots U4 and U5 to form an active field pulse provided as an input to AND gate U1 which "ands" the active field pulse and the output of one-shot U3. The output of gate U1 is then a 3 μs backporch pulse during the active TV field. (Alternatively, one-shots U4 and U5 are not necessary and one-shot U3 output goes directly to resistor R6, eliminating U1, U4 and U5). Resistor R6 is a negative summing resistor that subtracts a level from the back porch of the video input. Input amplifier AO buffers the video input and couples to capacitor C3, diode D1, resistor R3 and voltage Vb that forms a sync tip DC restoration circuit. The output of feedback amplifier A3 is supplied to resistor R7; this output has a lowered back porch. (See FIGS. 43a to 43g showing signals at various locations in FIG. 42a, as labelled).

The circuit of FIG. 42b receives the video out 1 signal from resistor R7 of the circuit of FIG. 42a and replaces the last 10 or 11 lines of each TV field with TV lines containing pseudo sync pulses paired with subsequent AGC pulses below blanking level, i.e. −10 IRE to −30 IRE. The video from the node of diode D1 of FIG. 42a contains video that is DC restored to 0 volts for 0 IRE blanking level. Amplifier A2 of FIG. 42b amplifies this video and couples it to horizontal lock oscillator U11 (using pin 1 of oscillator CA 31541, where the sync tip from amplifier A2 is at 7V). The output of oscillator U11 is a 32H phase lock loop and outputs a signal of about 503 KHz frequency. This 503 KHz output signal is amplified for logic levels by amplifier A2 and input to binary divider U10.

Summing amplifier A4 outputs a square wave signal of approximately 2 μs on and 2 μs off of amplitude −20 IRE to −40 IRE. Voltage Vbb and resistor R9 set the proper DC offset voltage, whereas resistors R10 and R11 set the proper amplitude. In FIG. 42a one-shot U6 generates an active line pulse of 32 μs duration from the beginning of the active horizontal line; one shots U7 and U8 are triggered by the vertical sync pulse to turn high during the last 11 lines of the active TV field. AND gate U9 of FIG. 42b thus gates in a 4 μs period square wave of levels of −20 IRE to −40 IRE during the last 11 horizontal active lines of the TV field (where the pseudo sync and AGC pulses are not generally located). Amplifier A5 and resistor R12 output a modified anticopy signal with lowered backporch pulses and new pseudo-sync and lowered negative AGC pulses.

Figure 42B:
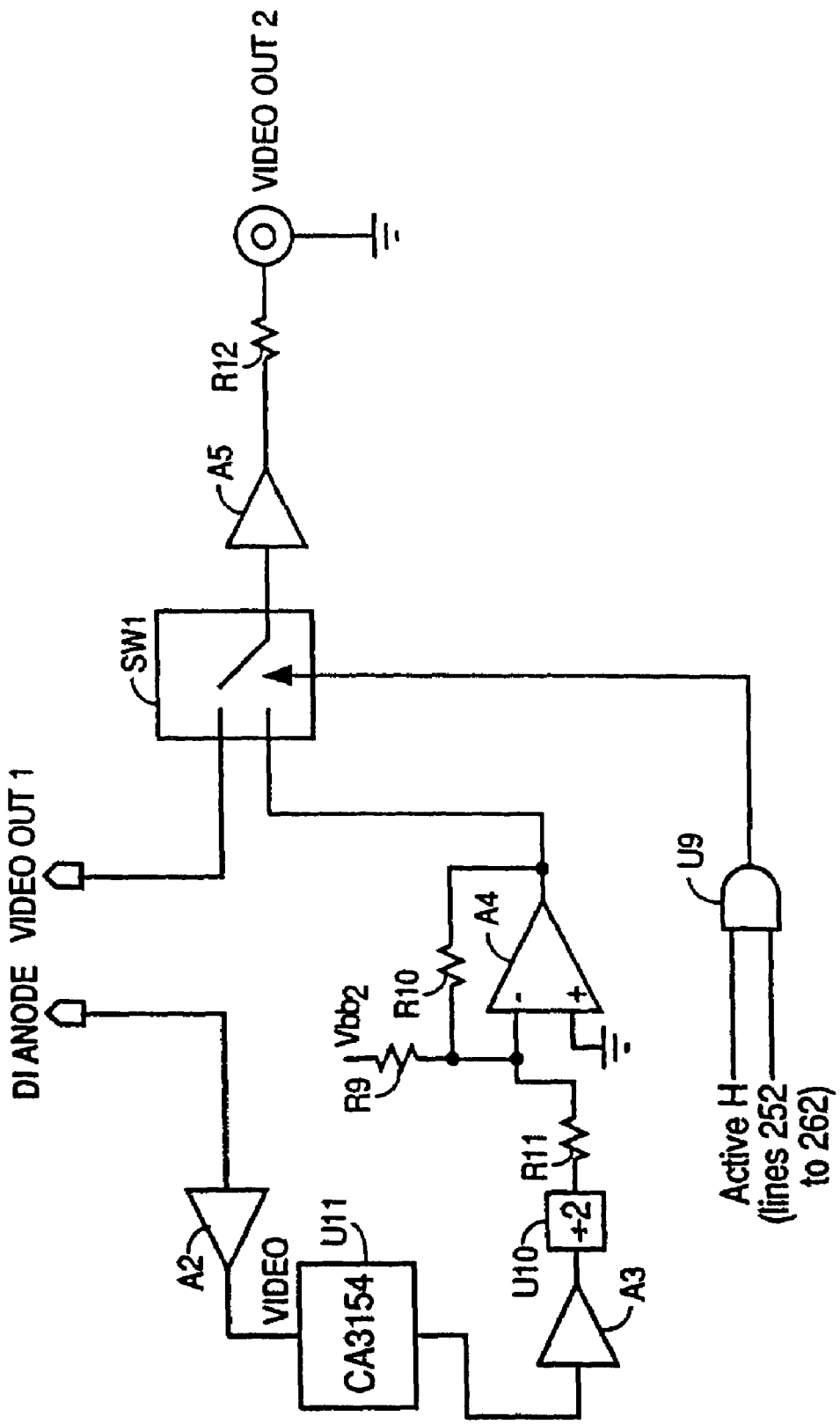

The modified video signal provided by the circuit of FIGS. 42a and 42b causes the AGC amplifier in a VCR to measure incorrectly. As a result based on its measurements of the pseudo sync pulses (and with lowered back porch) paired with AGC pulses of reduced level, it appears to the VCR that a low level video signal is present, and thus the VCR increases the gain of its AGC amplifier. This offsets the reduction of the gain in the AGC VCR amplifier via the basic anticopy process. The added pseudo-sync pulses in the EOF locations each has in one embodiment at least about 2 μsec of blanking level (0 IRE) following the trailing edge of each added pseudo-sync pulse to defeat the EOF (vertical) modification. This is accomplished by a switch or waveform replacement circuit as described variously above. This is useful if the high state of the EOF modification has an amplitude greater than 10 to 20 IRE. In the absence of the blanking level under these conditions, the EOF modification effect may be reduced but the prior art basic anticopy process effect increased, thus increasing the EOL modification and preventing defeat of the overall anticopy process.

The above description of the invention is illustrative and not limiting; other modifications in accordance with the invention will be apparent to one of ordinary skill in the art in light of this disclosure and are intended to fall within the scope of the appended claims.

The invention claimed is:

1. Apparatus for providing a copy protected video signal, comprising:
    an input terminal which receives a video signal;
    processing circuitry which is coupled to the input terminal and modifies the video signal to include therein selected copy protection signals, which cause a reduced amplitude in a recording of the copy protected video signal; and
    circuitry which adds a pulse having a selected negative amplitude to a selected position in a back porch region following a horizontal sync pulse, wherein the copy protection of the video signal is enhanced by the added negative pulse.

2. The apparatus of claim 1, wherein the negative pulse is added to selected active horizontal scan lines of the video signal.

3. The apparatus of claim 1, wherein the amplitude of the negative pulse is in the range of −10 to −20 IRE units, the negative pulse has a width in the range of 1 to 2 microseconds, and is positioned in the range of 1 to 2 microseconds after a color burst signal.

4. The apparatus of claim 1, wherein the amplitude of the negative pulse is in the range of −10 to −20 IRE units.

5. The apparatus of claim 1, wherein the negative pulse has a width in the range of 1 to 2 microseconds.

6. The apparatus of claim 1, where in the negative pulse is positioned in the range of 1 to 2 microseconds after a color burst signal in the back porch region.

* * * * *